United States Patent [19]
Mizuuchi et al.

[11] Patent Number: 5,652,674
[45] Date of Patent: Jul. 29, 1997

[54] METHOD FOR MANUFACTURING DOMAIN-INVERTED REGION, OPTICAL WAVELENGTH CONVERSION DEVICE UTILIZING SUCH DOMAIN-INVERTED REGION AND METHOD FOR FABRICATING SUCH DEVICE

[75] Inventors: Kiminori Mizuuchi, Neyagawa; Kazuhisa Yamamoto, Settsu, both of Japan

[73] Assignee: Matsushita Electric Industrial Co., Ltd., Kadoma, Japan

[21] Appl. No.: 521,322

[22] Filed: Aug. 30, 1995

[30] Foreign Application Priority Data

Aug. 31, 1994 [JP] Japan ................................. 6-206748
Dec. 12, 1994 [JP] Japan ................................. 6-307410

[51] Int. Cl.$^6$ ................................................. G02F 1/35
[52] U.S. Cl. ................................................. 359/326
[58] Field of Search ........................... 359/326–332; 385/122; 372/21–22

[56] References Cited

U.S. PATENT DOCUMENTS

| | | | |
|---|---|---|---|
| 5,113,469 | 5/1992 | Hatakoshi et al. | 385/122 |
| 5,193,023 | 3/1993 | Yamada et al. | 359/245 |
| 5,249,250 | 9/1993 | Yamada et al. | 385/122 |
| 5,274,727 | 12/1993 | Ito et al. | 385/122 |
| 5,323,262 | 6/1994 | Mizuuchi et al. | 359/332 |
| 5,333,231 | 7/1994 | Fukuda et al. | 385/122 |
| 5,380,410 | 1/1995 | Sawaki et al. | 361/225 |
| 5,415,743 | 5/1995 | Harada | 385/122 X |
| 5,424,867 | 6/1995 | Nihei et al. | 359/326 |
| 5,506,722 | 4/1996 | Mizuuchi et al. | 359/332 |
| 5,521,750 | 5/1996 | Onoe et al. | 359/332 |
| 5,568,308 | 10/1996 | Harada | 359/326 |

FOREIGN PATENT DOCUMENTS

| | | |
|---|---|---|
| 0 409 104 | 1/1991 | European Pat. Off. |
| 0 486 769 | 5/1992 | European Pat. Off. |
| 0 532 969 | 3/1993 | European Pat. Off. |
| 0 592 226 | 4/1994 | European Pat. Off. |
| 0 687 941 | 12/1995 | European Pat. Off. |
| 3-121428 | 5/1991 | Japan |
| 4-19719 | 1/1992 | Japan |
| 4-264534 | 9/1992 | Japan |

OTHER PUBLICATIONS

M. Yamada et al., "First-Order Quasi-Phase Matched LiNbO$_3$ Waveguide Periodically Poled by Applying an External Field for Efficient Blue Second-Harmonic Generation", *Appl. Phys. Lett.*, vol. 62, No. 5, pp. 435–436, Feb., 1993.

(List continued on next page.)

*Primary Examiner*—John D. Lee
*Attorney, Agent, or Firm*—Ratner & Prestia

[57] ABSTRACT

A comb-shaped electrode and a planar electrode are formed on a surface and a bottom face of a substrate. Then, a DC voltage on which a pulse voltage is superimposed is applied to the electrodes using a DC power source and a pulse power source so as to apply a DC electric field on which a pulse electric field is superimposed to the substrate. As a result, periodic domain-inverted regions are formed by applying even a small pulse electric field. Since the applied electric field is highly uniform in a face of the substrate, the domain-inverted regions having a uniform periodic structure are formed. Alternatively, after the comb-shaped electrode is covered with an insulating film, the pulse voltage is applied to the electrodes using the pulse power source so as to apply the pulse electric field to the substrate. As a result, since movement of free charges in the surface of a crystal is restrained so as to inhibit the spread of domain inversion in a horizontal direction, a uniform short-periodic domain-inverted structure is formed. According to the present invention, deep short-periodic domain-inverted regions are uniformly formed over a large area of the substrate. As a result, an optical wavelength conversion device having a short wavelength with high efficiency can be manufactured.

78 Claims, 30 Drawing Sheets

OTHER PUBLICATIONS

W. K. Burns et al., "Second Harmonic Generation in Field Poled, Quasi–Phase–Matched, Bulk LiNbO$_3$", *IEEE Photonics Technology Letters*, vol. 6, No. 2, pp. 252–254, Feb., 1994.

J. Webjörn et al., "Quasi–Phase–Matched Blue Light Generation in Bulk Lithium Niobate, Electrically Poled Via Periodic Liquid Electrodes", *Electronics Letters*, vol. 30 No. 11, pp. 894–895, May, 1994.

K. Mizuuchi et al., "Harmonic Blue Light Generation in Bulk Periodically Poled LiTaO$_3$", *Applied Physics Letters*, vol. 66, No. 22, pp. 2943–2945 (May 1995).

EPO Search Report dated Apr. 23, 1996.

European Search Report dated Jun. 28, 1996.

200

FIG.10A After application of electric field
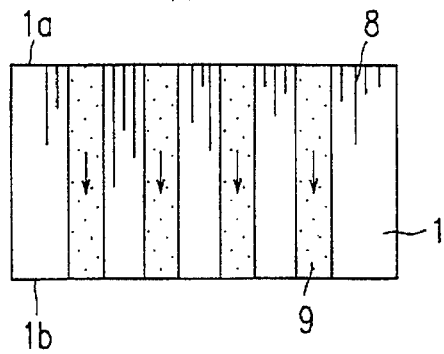
FIG.10B 450°C
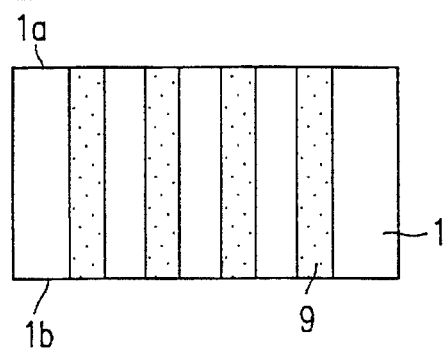
FIG.10C 500°C
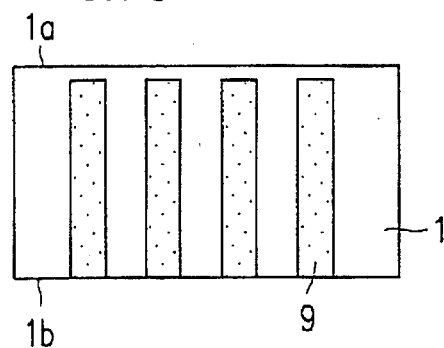
FIG.10D 550°C
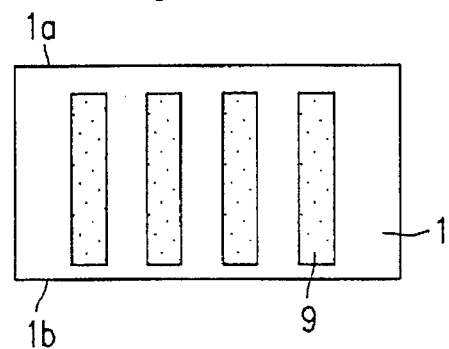

1300

1300a

_5,652,674_

METHOD FOR MANUFACTURING DOMAIN-INVERTED REGION, OPTICAL WAVELENGTH CONVERSION DEVICE UTILIZING SUCH DOMAIN-INVERTED REGION AND METHOD FOR FABRICATING SUCH DEVICE

BACKGROUND OF THE INVENTION

1. Field of the Invention

The present invention relates to: a method for manufacturing a domain-inverted region which makes use of an application of an electric field; a wavelength conversion device manufactured by such a method for use in the industrial fields of optical information processing and applied optic measurement control which utilizes a coherent light source and has the domain-inverted region; and a method for manufacturing such a device.

2. Description of the Related Art

The use of a domain inversion phenomenon for forcibly inverting a domain in a ferroelectric crystal makes it possible to form a periodic domain-inverted region (structure) in the ferroelectric crystal substrate. The thus formed domain-inverted region is employed in optical frequency modulators which utilize surface acoustic waves and also in optical wavelength conversion devices utilizing the inversion of a non-linear domain. In particular, by periodically inverting the non-linear domains of non-linear optical materials, an optical wavelength conversion device exhibiting an extremely high conversion efficiency can be manufactured. By using the optical wavelength conversion device thus manufactured to convert a light beam such as that produced by a semiconductor laser, a small-size short wavelength light source which can be applied to various fields such as printing, optical information processing, applied optic measurement control and the like, is realized.

As a conventional method for forming a periodic domain-inverted region, the following methods have been reported: a method utilizing Ti thermal diffusion; a method for adding $SiO_2$ and then thermally treating it; and a method for performing a proton exchange treatment and a thermal treatment. On the other hand, methods for forming a periodic domain-inverted region, which utilize the inversion of spontaneous polarization of a ferroelectric crystal due to an electric field, have been also reported. For example, a method for irradiating a −C face of a substrate with an electronic beam, and a method for irradiating a +C face of a substrate with positive ions and the like, are employed methods utilizing an electric field. In either case, a deep domain-inverted region having a depth of several hundreds μm is formed by the electric field which is formed by emitted charged particles.

As another conventional method for manufacturing a domain-inverted region, a method for forming a comb-shaped electrode on $LiNbO_3$ or $LiTaO_3$ and then applying a pulsed electric field to the comb-shaped electrode has been reported (Japanese Laid-Open Patent Publication Nos. 3-121428 and 4-19719).

With reference to FIG. 30, a conventional method for manufacturing an optical wavelength conversion device is explained.

A conventional optical wavelength conversion device 50 utilizing a $LiNbO_3$ substrate 55 as shown in FIG. 30 is manufactured as follows. First, a periodic comb-shaped electrode 51 is formed on a +C face 55a of the $LiNbO_3$ substrate 55, and a planar electrode 52 is formed on a −C face 55b. Then, the +C face 55a is grounded, and a pulse voltage typically having a pulse width of 100 μs is applied onto the −C face 55b by a pulse power source 56. The electric field required to invert a domain is about 20 kV/mm or higher. In application of such an electric field, crystals of the substrate 55 are likely to be destroyed by applying the electric field if the substrate 55 is thick. However, the destruction of crystals due to application of the electric field can be avoided by setting a thickness of the substrate 55 to be about 200 μm, which in turn makes it possible to form a domain-inverted region at room temperature.

Furthermore, a short-periodic domain-inverted structure having a period in the range of 3 to 4 μm is required to realize an optical wavelength conversion device 50 of high efficiency. If the domain-inverted region is formed by applying an electric field, a domain of a portion directly below an electrode is inverted, and then a domain-inverted region spreads out in a direction parallel to the surface of the substrate 55. Therefore, it is difficult to shorten the period of a domain-inverted structure. In order to solve this problem, a short-time pulse having a pulse width of about 100 μs is applied to an electrode so as to shorten a voltage application time period, thereby forming a short-periodic domain inverted structure.

As described above, in the conventional methods, a domain-inverted region can be formed with application of an electric field at room temperature by thinning the substrate 55, and a period of the domain-inverted structure can be shortened by shortening a voltage application time period.

Furthermore, a method for manufacturing an optical wavelength conversion device which utilizes a conventional method for forming a domain-inverted region is disclosed in, for example: M. Yamada, N. Nada, M. Saitoh, and K. Watanabe: "First-order quasi-phase matched $LiNbO_3$ waveguide periodically poled by applying an external field for efficient blue second-harmonic generation", Appl. Phys. Lett., 62, pp.435–436 (Feb. 1993). In the disclosed method, after periodic domain inverted regions are formed, an optical waveguide is formed so as to perpendicularly cross the periodic domain inverted regions, thereby manufacturing an optical waveguide conversion device. In the manufactured optical waveguide conversion device, a secondary harmonic wave of 20.7 mW is obtained as an output in the case where an interaction length is 3 mm and a power of an incident light beam is 196 mW.

Furthermore, a method for manufacturing a domain-inverted region which employs the combination of a proton exchange and application of an electric field is disclosed in, for example, Japanese Laid-Open Patent Publication No. 4-264534. According to this method, after the entire surface of a substrate is subjected to a proton exchange treatment so as to form a proton-exchanged layer, a comb-shaped electrode is formed on the surface of the proton-exchanged layer and a planar electrode is formed on the bottom face of the substrate. A domain-inverted region is formed by applying a voltage between the electrodes. A proton exchange treatment facilitates the formation of a domain-inverted region. Therefore, it is possible to form a highly uniform periodic domain-inverted structure.

In the conventional methods for manufacturing a domain-inverted region as described above, it is necessary to apply a high (several kV) pulse voltage and a short pulse width (100 μs or less). Since it is difficult to form such a high short-pulse voltage, it is hard to sufficiently ensure reproducibility, reliability and uniformity in application of a voltage.

Moreover, if a high short-pulse voltage is applied to a substrate, electric field distribution becomes ununiform in the substrate planes. Therefore, there arises a problem that uniformity in the planes of the formed domain-inverted structure is deteriorated. Furthermore, since it is difficult to form a uniform domain-inverted structure over a wide area, there also arises a problem that domain-inverted structures cannot be mass-produced utilizing large substrates.

Furthermore, if the applied voltage is ununiform, the substrate can crack, resulting in a decrease in production yield of devices. As described above, in order to prevent the crystals of the substrate from being destroyed even when a high voltage pulse is applied, a thin film substrate can be solely used. However, since it is difficult to handle such a thin film substrate, operability is low.

A short-periodic domain-inverted region is required to realize a highly efficient optical wavelength conversion device. In a conventional method for manufacturing a domain-inverted region which employs application of an electric field, a domain-inverted region spreads out from regions under stripe-shaped electrodes constituting a comb-shaped electrode. As a result, since the adjacent domain-inverted regions come into contact with each other, it becomes difficult to form a short-periodic domain-inverted region.

SUMMARY OF THE INVENTION

A method for manufacturing a domain-inverted region of this invention, includes the steps of: forming a first electrode and a second electrode which are separated in a domain direction of a ferroelectric crystal substrate; applying a DC voltage between the first electrode and the second electrode; and inverting a domain of a predetermined region in the ferroelectric crystal substrate by applying a combined voltage of the DC voltage and a pulse voltage, the combined voltage obtainable by superimposing the pulse voltage on the DC voltage.

In one embodiment of the invention, a level of the DC voltage is smaller than a voltage level at which domain inversion occurs, and a level of the combined voltage is substantially equal to or larger than the voltage level at which the domain inversion occurs.

In another embodiment of the invention, at least one of the first electrode and the second electrode is a comb-shaped electrode.

In still another embodiment of the invention, the comb-shaped electrode is formed on a +C face of the ferroelectric crystal substrate.

In still another embodiment of the invention, the domain direction of the ferroelectric crystal substrate is perpendicular to a surface of the substrate.

In still another embodiment of the invention, the ferroelectric crystal substrate is made of a material selected from a group consisting of $LiNb_{(1-x)}Ta_xO_3$ ($0 \leq x \leq 1$) and $KTiOPO_4$.

In still another embodiment of the invention, the method further includes the steps of: removing the first electrode and the second electrode and thermally treating the ferroelectric crystal substrate at 580° C. or lower.

In still another embodiment of the invention, the method further includes the step of: deteriorating ferroelectricity of the ferroelectric crystal substrate in a periphery of at least one of the first electrode and the second electrode prior to the step of applying the voltage.

According to another aspect of the invention, a method for manufacturing a domain-inverted region, includes the steps of: forming a first electrode and a second electrode which are separated from each other in a domain direction of a ferroelectric crystal substrate; deteriorating ferroelectricity of the ferroelectric crystal substrate in a periphery of at least one of the first electrode and the second electrodeco; and inverting a domain of a predetermined region in the ferroelectric crystal substrate by applying a predetermined voltage between the first electrode and the second electrode.

In still another embodiment of the invention, at least one of the first electrode and the second electrode is a comb-shaped electrode, and the ferroelectricity is deteriorated in a gap between electrode branches of the comb-shaped electrode.

In still another embodiment of the invention, the step of deteriorating the ferroelectricity employs a proton exchange treatment.

In still another embodiment of the invention, the ferroelectric crystal substrate is a C plate substrate which is cut along a face perpendicular to a C axis of a crystal, and the first electrode and the second electrode are a comb-shaped electrode formed on a first face of the C plate substrate and a planar electrode formed on a second face of the C plate substrate, respectively.

In still another embodiment of the invention, a nucleus for domain inversion is generated in a vicinity of the first surface.

In still another embodiment of the invention, a width of each stripe-shaped electrode branch included in the comb-shaped electrode is equal to or smaller than a half of an interval between the stripe-shaped electrode branches.

In still another embodiment of the invention, the method further includes the step of removing a vicinity of at least one of the first face and the second face of the C plate substrate to a predetermined depth.

In still another embodiment of the invention, the C plate substrate is made of a material selected from a group consisting of $LiNb_{(1-x)}Ta_xO_3$ ($0 \leq x \leq 1$) and $KTiOPO_4$, and the first face is a +C face and the second face is −C face.

In still another embodiment of the invention, the step of deteriorating the ferroelectricity employs a proton exchange treatment.

In still another embodiment, the method further includes the steps of: removing the first electrode and the second electrode; and annealing the ferroelectric crystal substrate at 500° C. or lower.

In still another embodiment of the invention, the insulating film is a dielectric film.

In still another embodiment of the invention, the predetermined voltage is a pulse voltage.

In still another embodiment of the invention, the predetermined voltage is a combined voltage obtainable by superimposing a pulse voltage on a DC voltage.

In still another embodiment of the invention, at least one of the first electrode and the second electrode is a comb-shaped electrode.

In still another embodiment of the invention, the ferroelectric crystal substrate is made of a material selected from a group consisting of $LiNb_{(1-x)}Ta_xO_3$ ($0 \leq x \leq 1$) and $KTiOPO_4$.

In still another embodiment of the invention, a resistivity of the insulating film is larger than $10^{15}$ Ω/cm.

In still another embodiment of the invention, the ferroelectric crystal substrate is a C plate substrate which is cut along a face perpendicular to a C axis of a crystal, and the first electrode and the second electrode are the comb-shaped electrode formed on a first face of the C plate substrate and a planar electrode formed on a second face of the C plate substrate, respectively.

In still another embodiment of the invention, a nucleus for domain inversion is generated in a vicinity of the first surface.

In still another embodiment of the invention, a width of each stripe-shaped electrode branch included in the comb-shaped electrode is equal to or smaller than a half of an interval between the stripe-shaped electrode branches.

In still another embodiment of the invention, the C plate substrate is made of a material selected from a group consisting of $LiNb_{(1-x)}Ta_xO_3$ ($0 \leq x \leq 1$) and $KTiOPO_4$, and the first face is a +C face and the second face is −C face.

According to still another aspect of the invention, a method for manufacturing a domain-inverted region, includes the steps of: forming a first electrode and a second electrode which are separated from each other in a domain direction of a ferroelectric crystal substrate; shaving off a surface of the ferroelectric crystal substrate in a vicinity of at least one of the first electrode and the second electrode; and inverting a domain of a predetermined region in the ferroelectric crystal substrate by applying a predetermined voltage between the first electrode and the second electrode.

In one embodiment of the invention, at least one of the first electrode and the second electrode is a comb-shaped electrode, and the surface of the ferroelectric crystal substrate is shaved off in a gap between electrode branches of the comb-shaped electrode.

In another embodiment of the invention, the method further includes the step of covering at least one of the first electrode and the second electrode with an insulating film.

In still another embodiment of the invention, the predetermined voltage is a pulse voltage.

In still another embodiment of the invention, the predetermined voltage is a combined voltage obtainable by superimposing a pulse voltage on a DC voltage.

In still another embodiment of the invention, the ferroelectric crystal substrate is made of a material selected from a group consisting of $LiNb_{(1-x)}Ta_xO_3$ ($0 \leq x \leq 1$) and $KTiOPO_4$.

In still another embodiment of the invention, at least one of the first electrode and the second electrode is a comb-shaped electrode, and a width of each stripe-shaped electrode branch included in the comb-shaped electrode is equal to or smaller than half of an interval between the stripe-shaped electrode branches.

In still another embodiment of the invention, the ferroelectric crystal substrate is a C plate substrate which is cut along a face perpendicular to a C axis of a crystal, the first electrode and the second electrode are a comb-shaped electrode formed on a first face of the C plate substrate and a planar electrode formed on a second face of the C plate, respectively, and a surface of the ferroelectric crystal substrate is shaved off in a gap between electrode branches of the comb-shaped electrode.

In still another embodiment of the invention, a nucleus for domain inversion is generated in a vicinity of the first face.

In still another embodiment of the invention, the C plate substrate is made of a material selected from a group consisting of $LiNb_{(1-x)}Ta_xO_3$ ($0 \leq x \leq 1$) and $KTiOPO_4$, and the first face is a +C face and the second face is −C face.

According to still another aspect of the invention, a method for manufacturing a domain-inverted region of, includes the steps of: forming a first electrode and a second electrode which are separated from each other in a domain direction of a ferroelectric crystal substrate; and inverting a domain of a predetermined region in the ferroelectric crystal substrate by applying a predetermined magnetic field between the first electrode and the second electrode.

In one embodiment of the invention, the predetermined magnetic field is a pulse magnetic field.

In another embodiment of the invention, the ferroelectric crystal substrate is a C plate substrate which is cut along a face perpendicular to a C axis of a crystal.

In still another embodiment of the invention, the ferroelectric crystal substrate is made of a material selected from a group consisting of $LiNb_{(1-x)}Ta_xO_3$ ($0 \leq x \leq 1$) and $KTiOPO_4$.

In still another embodiment of the invention, the method includes the step of covering at least one of the first electrode and the second electrode with an insulating film.

In still another embodiment of the invention, at least one of the first electrode and the second electrode is a comb-shaped electrode.

In still another embodiment of the invention, the method further includes the step of deteriorating ferroelectricity of the ferroelectric crystal substrate in a gap between electrode branches of the comb-shaped electrode.

In still another embodiment of the invention, the method further includes the step of shaving off a surface of the ferroelectric crystal substrate in a gap between electrode branches of the comb-shaped electrode.

In still another embodiment of the invention, the ferroelectric crystal substrate is a C plate substrate which is cut along a face perpendicular to a C axis of a crystal, and the first electrode and the second electrode are a comb-shaped electrode formed on a first face of the C plate substrate and a planar electrode formed on a second face of the C plate, respectively.

In still another embodiment of the invention, a nucleus for domain inversion is generated in a vicinity of the first face.

In still another embodiment of the invention, a width of each stripe-shaped electrode branch included in the comb-shaped electrode is equal to or smaller than half of an interval between the stripe-shaped electrode branches.

In still another embodiment of the invention, the method further includes the step of shaving off a surface of the ferroelectric crystal substrate in a vicinity of at least one of the comb-shaped electrode and the planar electrode.

In still another embodiment of the invention, the method further includes the step of deteriorating ferroelectricity of the ferroelectric crystal substrate in a gap of electrode branches of the comb-shaped electrode.

In still another embodiment of the invention, the method further includes the step of shaving off a surface of the ferroelectric crystal substrate in a gap of electrode branches of the comb-shaped electrode.

In still another embodiment of the invention, the method further includes the step of covering at least one of the comb-shaped electrode and the planar electrode with an insulating film.

In still another embodiment of the invention, the C plate substrate is made of a material selected from a group consisting of $LiNb_{(1-x)}Ta_xO_3$ ($0 \leq x \leq 1$) and $KTiOPO_4$, and the first face is a +C face and the second face is −C face.

According to still another aspect of the invention, a method for manufacturing a domain-inverted region, includes the steps of: forming a comb-shaped electrode on a first face and a planar electrode on a second face of a ferroelectric crystal substrate serving as a C plate substrate which is cut along a face perpendicular to a C axis of a crystal; attaching an optical substrate to at least one of the first face and the second face; and inverting a domain of a predetermined region in the ferroelectric crystal substrate by applying a predetermined voltage between the comb-shaped electrode and the planar electrode.

In one embodiment of the invention, the method further includes the step of polishing the ferroelectric crystal substrate after the optical substrate is adhered to the ferroelectric crystal substrate, wherein the planar electrode is formed on the polished face.

In another embodiment of the invention, the predetermined voltage is a pulse voltage.

In still another embodiment of the invention, the predetermined voltage is a combined voltage obtainable by superimposing a pulse voltage on a DC voltage.

In still another embodiment of the invention, the ferroelectric crystal substrate is made of a material selected from a group consisting of $LiNb_{(1-x)}Ta_xO_3$ ($0 \leq x \leq 1$) and $KTiOPO_4$.

In still another embodiment of the invention, a width of each stripe-shaped electrode branch included in the comb-shaped electrode is equal to or smaller than half of an interval between the stripe-shaped electrode branches.

In still another embodiment of the invention, a nucleus for domain inversion is generated in a vicinity of the first face.

In still another embodiment of the invention, the method further includes the step of deteriorating ferroelectricity of the ferroelectric crystal substrate in a gap between electrode branches of the comb-shaped electrode.

In still another embodiment of the invention, the method further includes the step of shaving off a surface of the ferroelectric crystal substrate in a gap between electrode branches of the comb-shaped electrode.

In still another embodiment of the invention, the method further includes the step of covering at least one of the comb-shaped electrode and the planar electrode with an insulating film.

According to still another aspect of the invention, a method for manufacturing a domain-inverted region, includes the steps of: growing a ferroelectric crystal on a surface of a substrate; forming a first electrode and a second electrode which are separated from each other in a domain direction of the ferroelectric crystal; and inverting a domain of a predetermined region in the ferroelectric crystal by applying a predetermined voltage between the first electrode and the second electrode.

In one embodiment of the invention, the predetermined voltage is a pulse voltage.

In another embodiment of the invention, the predetermined voltage is a combined voltage obtainable by superimposing a pulse voltage on a DC voltage.

In still another embodiment of the invention, ferroelectric crystal substrate is made of a material selected from a group consisting of $LiNb_{(1-x)}Ta_xO_3$ ($0 \leq x \leq 1$) and $KTiOPO_4$.

In still another embodiment of the invention, the ferroelectric crystal grows in a C axis direction, and a comb-shaped electrode and a planar electrode are formed on a surface of the ferroelectric crystal and a bottom face of an optical substrate as the first electrode and the second electrode.

In still another embodiment of the invention, a nucleus for domain inversion is generated in a vicinity of a surface of the ferroelectric crystal.

According to still another aspect of the invention, a method for manufacturing a domain-inverted region, includes the steps of: forming a first electrode and a second electrode which are separated from each other in a domain direction of a ferroelectric crystal substrate; inverting a domain throughout the ferroelectric crystal substrate by applying a first voltage which is opposite to the domain direction between the first electrode and the second electrode; and reinverting the domain in at least part of the ferroelectric crystal substrate by applying a second voltage which is opposite to the inverted domain direction between the first electrode and the second electrode.

In one embodiment of the invention, the first voltage and the second voltage are applied at room temperature.

In still another embodiment of the invention, the predetermined voltage is a pulse voltage.

In still another embodiment of the invention, the predetermined voltage is a combined voltage obtainable by superimposing a pulse voltage on a DC voltage.

In still another embodiment of the invention, the ferroelectric crystal is made of a material selected from a group consisting of $LiNb_{(1-x)}Ta_xO_3$ ($0 \leq x \leq 1$) and $KTiOPO_4$.

In still another embodiment of the invention, the method further includes the step of covering at least one of the first electrode and the second electrode with an insulating film.

According to still another aspect of the invention, a method for manufacturing a domain-inverted region, includes the steps of: forming planar electrodes on a first face and a second face of a ferroelectric crystal substrate serving as a C plate substrate which is cut along a face perpendicular to a C axis of a crystal; inverting a domain throughout the ferroelectric crystal substrate by applying a predetermined voltage between the planar electrodes; forming a comb-shaped electrode after removing the planar electrode on the second face; and reinverting the domain at least in part of the ferroelectric crystal substrate by applying a predetermined voltage between the comb-shaped electrode and the planar electrode.

In one embodiment of the invention, a width of each stripe-shaped electrode branch included in the comb-shaped electrode is equal to or smaller than half of an interval between the stripe-shaped electrode branches.

In another embodiment of the invention, a nucleus for domain inversion is generated in a vicinity of the first face.

In still another embodiment of the invention, the method further includes the step of deteriorating ferroelectricity of the ferroelectric crystal substrate in a gap between electrode branches of the comb-shaped electrode.

In still another embodiment of the invention, the method further includes the step of shaving off a surface of the ferroelectric crystal substrate in a gap between electrode branches of the comb-shaped electrode.

In still another embodiment of the invention, the method further includes the step of covering at least one of the comb-shaped electrode and the planar electrode with an insulating film.

According to still another aspect of the invention, a method for manufacturing an optical wavelength conversion device, includes the steps of: forming a first electrode and a second electrode which are separated from each other in a domain direction of a ferroelectric crystal substrate; inverting a domain of a predetermined region of the ferroelectric crystal substrate by applying a predetermined voltage between the first electrode and the second electrode; and forming an optical waveguide.

In one embodiment of the invention, the optical waveguide is formed by proton exchange.

In another embodiment of the invention, the predetermined voltage is a pulse voltage.

In still another embodiment of the invention, the predetermined voltage is a combined voltage obtainable by superimposing a pulse voltage on a DC voltage.

In still another embodiment of the invention, the ferroelectric crystal is made of a material selected from a group consisting of $LiNb_{(1-x)}Ta_xO_3$ ($0 \leq x \leq 1$) and $KTiOPO_4$.

In still, another embodiment of the invention, at least one of the first electrode and the second electrode is a comb-shaped electrode.

In still another embodiment of the invention, the method further includes the step of covering at least one of the first electrode and the second electrode with an insulating film.

In still another embodiment of the invention, the ferroelectric crystal substrate is a C plate substrate which is cut along a face perpendicular to a C axis of a crystal, and the first electrode and the second electrode are a comb-shaped electrode formed on a first face and a planar electrode formed on a second face of the C plate substrate.

In still another embodiment of the invention, a nucleus for domain inversion is generated in a vicinity of the first face.

In still another embodiment of the invention, a width of each stripe-shaped electrode branch included in the comb-shaped electrode is equal to or smaller than half of an interval between the stripe-shaped electrode branches.

In still another embodiment of the invention, the method further includes the step of deteriorating ferroelectricity of the ferroelectric crystal substrate in a gap between electrode branches of the comb-shaped electrode.

In still another embodiment of the invention, the method further includes the step of shaving off a surface of the ferroelectric crystal substrate in a gap between electrode branches of the comb-shaped electrode.

In still another embodiment of the invention, the optical waveguide is formed in a direction perpendicular to the domain direction of the ferroelectric crystal.

In still another embodiment of the invention, the step of forming the optical waveguide further includes the step of partially removing a surface of the formed optical waveguide.

In still another embodiment of the invention, further includes the step of forming a slab waveguide on a surface of the ferroelectric crystal substrate prior to the step of forming the electrodes, wherein the step of forming the optical waveguide includes the step of processing the formed optical waveguide in a ridge shape.

In still another embodiment of the invention, the method further includes the step of forming a slab waveguide on a surface of the ferroelectric crystal substrate prior to the step of forming the electrodes, wherein the step of forming the optical waveguide includes the step of depositing a stripe-shaped dielectric film on a surface of the slab waveguide.

An optical wavelength conversion device of this invention includes: a ferroelectric crystal substrate; and a domain-inverted region formed in a periodic form in the ferroelectric crystal substrate, wherein a predetermined region positioned between the domain-inverted regions of the ferroelectric crystal substrate is subjected to a treatment for restraining domain inversion from spreading out in a horizontal direction.

One embodiment of the invention, ferroelectricity is deteriorated in the predetermined region.

In another embodiment of the invention, the predetermined region is subjected to a proton exchange treatment.

In still another embodiment of the invention, a groove is formed in the predetermined region.

In still another embodiment of the invention, the ferroelectric crystal is made of a material selected from a group consisting of $LiNb_{(1-x)}Ta_xO_3$ ($0 \leq x \leq 1$) and $KTiOPO_4$.

In still another embodiment of the invention, the device further includes an optical waveguide.

According to another aspect of the invention, an optical wavelength conversion device includes: a ferroelectric crystal substrate; a domain-inverted region formed in a periodic form in the ferroelectric crystal substrate; and an insulating film formed on a surface of the ferroelectric crystal substrate.

In one embodiment of the invention, the ferroelectric crystal is made of a material selected from a group consisting of $LiNb_{(1-x)}Ta_xO_3$ ($0 \leq x \leq 1$) and $KTiOPO_4$.

In another embodiment of the invention, the device further includes an optical waveguide.

According to still another aspect of the invention, an optical wavelength conversion device includes a ferroelectric crystal substrate; a domain-inverted region formed in a periodic form in the ferroelectric crystal substrate; and an optical substrate attached to one of a surface and a bottom face of the ferroelectric crystal substrate.

In one embodiment of the invention, the ferroelectric crystal is made of a material selected from a group consisting of $LiNb_{(1-x)}Ta_xO_3$ ($0 \leq x \leq 1$) and $KTiOPO_4$.

In another embodiment of the invention, the device further includes an optical waveguide.

According to still another aspect of the invention, an optical wavelength conversion device includes: a crystal substrate; a ferroelectric crystal grown on the crystal substrate; and a domain-inverted region formed in a periodic formed in the ferroelectric crystal.

In one embodiment of the invention, the ferroelectric crystal is made of a material selected from a group consisting of $LiNb_{(1-x)}Ta_xO_3$ ($0 \leq x \leq 1$) and $KTiOPO_4$.

In another embodiment of the invention, the device further includes an optical waveguide.

According to still another aspect of the invention, an optical waveguide conversion device includes: a ferroelectric crystal substrate; a domain-inverted region formed in a periodic form in the ferroelectric crystal substrate; and an optical waveguide formed on a surface of the ferroelectric crystal substrate.

In one embodiment of the invention, the optical waveguide is a ridge-shaped optical waveguide.

In another embodiment of the invention, the optical waveguide includes a slab-shaped optical waveguide and a stripe-shaped dielectric film formed on the slab-shaped optical waveguide.

In still another embodiment of the invention, the ferroelectric crystal is made of a material selected from a group consisting of $LiNb_{(1-x)}Ta_xO_3$ ($0 \leq x \leq 1$) and $KTiOPO_4$.

In still another embodiment of the invention, the optical waveguide is a proton-exchanged waveguide formed by proton exchange.

According to still another aspect of the invention, an optical wavelength conversion device includes: a ferroelectric crystal substrate; a domain-inverted region formed in a periodic form in the ferroelectric crystal substrate; and a light entering face and a light outgoing face respectively formed on end faces of the ferroelectric crystal substrate, wherein the domain-inverted region is not parallel to the light entering face and has a certain angle with respect to the light entering face.

In one embodiment of the invention, the ferroelectric crystal is made of a material selected from a group consisting of $LiNb_{(1-x)}Ta_xO_3$ ($0 \leq x \leq 1$) and $KTiOPO_4$.

In another embodiment of the invention, the device further includes anti-reflection films formed on the light entering face and the light outgoing face, respectively.

In still another embodiment of the invention, the angle is 10 degrees or more.

In still another embodiment of the invention, the angle is 30 degrees or more.

In still another embodiment of the invention, the light outgoing face is parallel to the domain-inverted region, and a reflective film is formed on the light outgoing face.

Thus, the invention described herein makes possible the advantages of: (1) providing a method for manufacturing a domain-inverted region, which is capable of forming a domain-inverted region by applying an electric field with small pulse electric field intensity; (2) providing an optical wavelength conversion device utilizing such a domain-inverted region; and (3) providing a method for manufacturing such an optical wavelength conversion device.

These and other advantages of the present invention will become apparent to those skilled in the art upon reading and understanding the following detailed description with reference to the accompanying figures.

BRIEF DESCRIPTION OF THE DRAWINGS

FIGS. 10A to 10D are cross-sectional views showing the relationship between an annealing temperature and the shape of a domain-inverted region.

DESCRIPTION OF THE PREFERRED EMBODIMENTS

Before describing embodiments of the present invention, domain inversion of a ferroelectric crystal will first be described.

The ferroelectric crystal has the deviated electric charge caused by spontaneous polarization within its crystal. The direction of the spontaneous polarization in the ferroelectric crystal can be changed by applying an electric field in a direction opposite to that of the spontaneous direction.

The direction of the spontaneous polarization varies depending on the kind of crystal (material). Since crystals such as $LiTaO_3$ or $LiNbO_3$ have spontaneous polarization in a C axis direction alone, the polarization occurs in only two directions, i.e., a +direction along the C axis or a −direction along the C axis opposite to the +direction in these crystals. When an electric field is applied thereto, the polarization of these crystals causes them to be rotated at 180 degrees. Thus, the crystal is aligned in a direction opposite to the immediately former direction. This phenomenon is called "domain inversion". An electric field which is required to cause the inversion of a domain is called an inverting electric field, and has a value in the range of about 20 to 30 kV/mm at room temperature in crystals such as $LiNbO_3$ or $LiTaO_3$.

The process for providing a crystal with a single domain direction in the ferroelectric crystal is referred to as "singlarization of direction of domain". In order to achieve the singlarization of direction of domain, a method for applying an electric field at a high temperature after crystal growth is generally conducted.

EXAMPLE 1

Figure 1A:
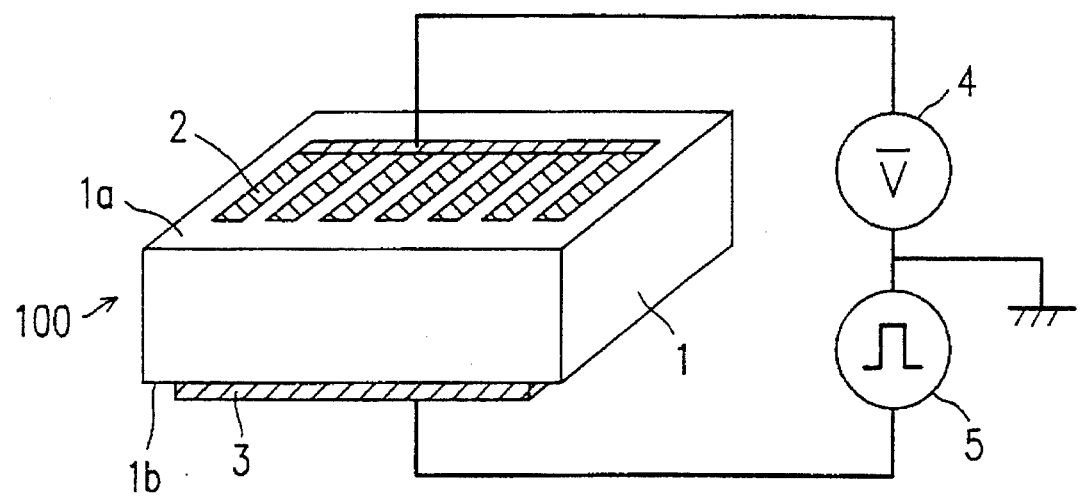
FIG. 1A is a perspective view illustrating a method for forming a domain-inverted region according to an embodiment of the present invention.

FIG. 1A is a schematic perspective view for describing a method for forming a domain inversion region according to Example 1.

In order to manufacture an optical waveguide conversion device 100 utilizing an $LiTaO_3$ substrate 1 as shown in FIG. 1A, a periodic comb-shaped electrode 2 on a +C face 1a, and a planar electrode 3 is formed on a −C face 1b of the $LiTaO_3$ substrate 1. Next, a DC power source 4 and a pulse power source 5 are connected to the comb-shaped electrode 2 on the +C face 1a and the planar electrode 3 on the −C face 1b, respectively. With such a configuration, it is possible to apply a DC voltage having a predetermined voltage level, on which a pulse voltage is superimposed if necessary, to the $LiTaO_3$ substrate 1.

In order to avoid the occurrence of discharge during application of a voltage, the substrate 1 is placed in an insulating solution or a vacuum ($10^{-6}$ Torr or lower) and then a DC voltage is applied thereto. When domain inversion occurs, a current (referred to as "inversion current") which is in proportion to the intensity of spontaneous polarization and the area of the electrodes flows between the comb-shaped electrode 2 and the planar electrode 3.

First, the relationship between a DC electric field Ecw and a pulse electric field Epp to be applied and the domain inversion phenomenon will be described below.

First, an example, in which a domain-inverted region is attempted to be formed by applying a pulse voltage alone utilizing a pulse power source 5, will be described. In this case, with the configuration shown in FIG. 1A, a pulse voltage is applied to the $LiTaO_3$ substrate 1 by the pulse power source 5 via the planar electrode 3. The DC power source 4 is not used and the comb-shaped electrode 2 is grounded.

A pulse voltage having a pulse width of about 100 μs is applied to the substrate 1 having a thickness of 0.2 mm. Then, a domain is inverted by applying an electric field of about 20 kV/mm or more (indicating that a voltage of 20 kV is applied for 1 mm). Furthermore, in the case where the similar operation is conducted for the substrate 1 having a thickness of 0.3 mm, the domain inversion is caused by applying an electric field of 20 kV/mm or more. However, the substrate 1 is likely to be cracked, resulting in a low yield.

Next, the formation of a periodic domain-inverted region with a period of 3 μm is attempted while setting a thickness of the substrate 1 to a constant thickness, i.e., 0.2 mm and an area of the planar electrode 3 to 10 mm×10 mm. In the case where the area of the planar electrode 3 is increased, however, many cracks are found even in the substrate 1 having the thickness of 0.2 mm. The problems arise in that a domain-inverted region is only partially formed, or the shape of the domain-inverted region to be formed is ununiform. These problems are considered to be caused by a partially concentrated applied electric field due to actual ununiformity in the thickness and the shape of the planar electrode 3, to which the pulse voltage is applied. In addition, the uniformity of the periodic structure in the formed domain-inverted region is also deteriorated.

The size of the domain-inverted region should be about 3 mm×3 mm or less in order to uniformize the shape of the periodic domain-inverted region. In the case where the domain-inverted region is formed by applying a pulse voltage alone, there arise problems in that it is difficult to form a sufficiently large domain-inverted region and uniformity in a face of the thus formed domain-inverted region is poor and the like when the thickness of the substrate is 0.3 mm or more.

Next, an example, in which the domain-inverted region is attempted to be formed by applying a DC voltage alone using the DC power source 4, will be described. In this case, with the configuration shown in FIG. 1A, a DC voltage is applied to the $LiTaO_3$ substrate 1 by the DC power source 4 via the comb-shaped electrode 2. The pulse power source 5 is not used, and the planar electrode 3 is grounded.

When a DC voltage is applied to the substrate 1 having a thickness of 0.2 mm, a DC electric field is applied to the substrate. Then, an inversion current flows at the time when a voltage corresponding to electric field intensity of about 20 kV/mm or more is applied. As a result, a domain is inverted. Furthermore, domain inversion characteristics with respect to the thickness of the substrate 1 are measured. With the substrate 1 having a thickness of 0.5 mm or less, it is possible to form a domain-inverted region. When the thickness exceeds 0.5 mm however, cracks occur in the substrate 1, rendering the formation of the domain-inverted region difficult. The reason why the cracks occur in the substrate 1 is considered to be as follows. The voltage intensity required to form a domain-inverted region increases as the thickness of the substrate 1 increases. Therefore, when a domain-inverted region is intended to be formed in a thick substrate, a voltage exceeding a breakdown voltage of crystal of the substrate 1 is applied to the substrate 1. As a result, cracks occur.

When a DC voltage is applied, however, it is possible to apply an electric field having high intensity since uniformity of the electric field which to be applied to the substrate 1 within the face is high.

Regarding the above-mentioned formation of a periodic domain-inverted region by applying a DC voltage, a periodic domain-inverted region is attempted to be formed by applying a DC voltage of about 20 kV/mm under various conditions as described below. More specifically, a periodic domain-inverted region is formed under the following conditions: a period of the comb-shaped electrode 2 in the range of 2 to 10 µm; a thickness of the substrate 1 in the range of 0.2 mm to 0.5 mm; and a voltage application time period in the range of 0.5 to 10 seconds. As a result, a periodic domain-inverted structure with a period of 5 µm or less is not formed in either case. This result shows that it is difficult to form a periodic structure with a short period by applying a DC voltage alone since a domain-inverted region formed directly below the comb-shaped electrode 2 spreads out in a horizontal direction with high speed.

As described above, in the case where only one of a DC voltage (electric field) and a pulse voltage (electric field) is applied, it is difficult to uniformly form a short-periodic domain-inverted structure over a large area. According to the present invention, however, applying a DC voltage (electric field), on which a pulse voltage (electric field) is superimposed, to the substrate, the objective of the present invention as described above can be achieved.

Figure 1B:
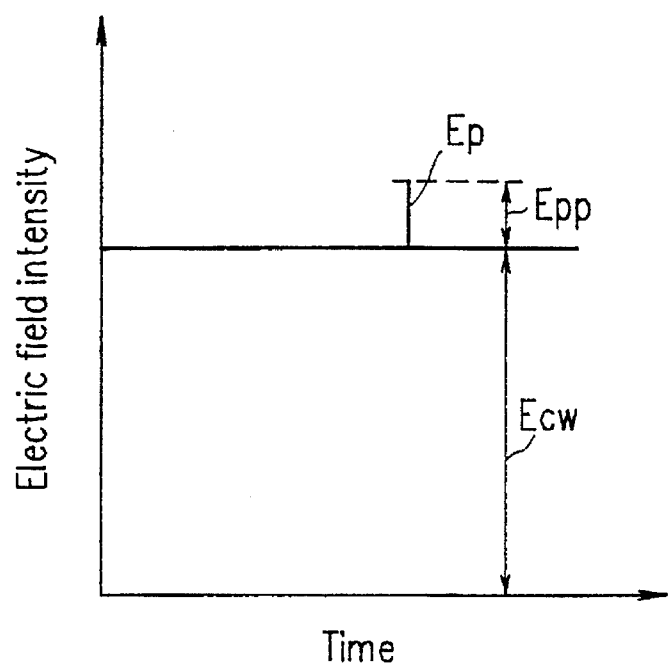
FIG. 1B is a schematic graph showing change in intensity of an electric field applied to a substrate for forming domain-inverted regions with elapse of time.

FIG. 1B shows change in the intensity of the electric field applied to the substrate 1 by voltage application according to the present embodiment with elapse of time. In the following description, an electric field applied by a DC voltage from a DC power source 4 is denoted as Ecw, an electric field applied by a pulse voltage (in this case, a single pulse) from a pulse voltage 5 is denoted as Epp. In the present invention, as shown in FIG. 1B, the DC electric field Ecw on which the pulse electric field Epp is superimposed is applied to the substrate 1.

A pulse electric field Epp typically has a pulse width of 100 µs or less. In the following description, a pulse width is 0.5 ms. In a pulse voltage which is actually applied to the substrate, a change in voltage with a predetermined amplitude is not immediately effected at its rising and falling edges and requires a certain time period. In FIG. 1B, the above points are omitted and the pulse electric field Epp is depicted as an impulse waveform Ep for simplification of the description.

Domain inversion characteristics are measured using values of Ecw and Epp as parameters. A voltage at which domain inversion occurs is also measured throughout the measurement of a inversion current. As a result, it is clarified that a domain is inverted when the sum of Ecw and Epp is about 20 kV/mm or more, regardless of a value of Epp or Ecw.

When the domain-inverted regions are formed by applying an electric field, the reinversion phenomenon of domains should be paid attention to. According to a method for manufacturing a domain-inverted region according to Example 1, however, the conventional problems caused by the domain reinversion phenomenon can be solved. This will be described below with reference to FIGS. 2A to 2E and 3.

When the domain-inverted regions are formed by conventional application of a pulse voltage, the domain-inverted regions are not successfully formed in the substrate in some cases even if a pulse width, a rising speed, and a falling speed of the applied pulse voltage are adjusted. In order to examine why this phenomenon is caused, the present inventors measure an inversion current which flows when domain inversion occurs. FIGS. 2A to 2D show the examination results.

Figure 2A:
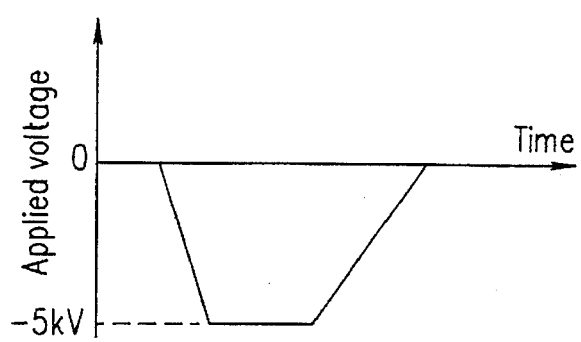
FIG. 2A shows a waveform of a voltage applied to a substrate according to a conventional method.
Figure 2B:
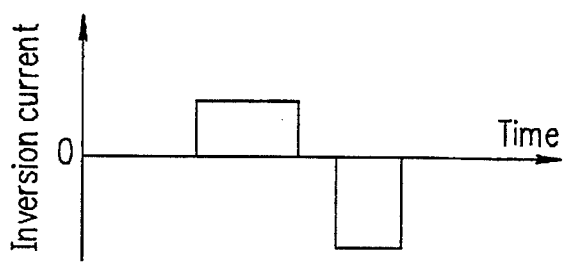
FIG. 2B shows a waveform of an inversion current flowing with the application of the voltage shown in FIG. 2A.

FIGS. 2A and 2B show waveforms of voltages applied to the substrate and waveforms of inversion currents which flow with the application of the voltages according to the conventional method. As shown in FIG. 2A, a pulse voltage (in this case, depicted as a negative pulse voltage) is applied to a substrate. When a voltage exceeding an inversion voltage is applied to the substrate, an inversion current flows as shown in FIG. 2B, thereby causing domain inversion. However, while the applied voltage is decreased to be zero after completion of the application of the pulse voltage, a current having a direction opposite to that of the inversion current flows. The current is denoted as a reinversion current which flows when the inverted domain is reinverted to return to its original state. As described above, by the conventional method for applying a pulse voltage (electric field) alone, the domain-inverted regions may not be formed because of the influences of the reinversion phenomenon of the domain in some cases. The reinversion phenomenon shows that the domain-inverted regions are unstable immediately after the completion.

Figure 3:
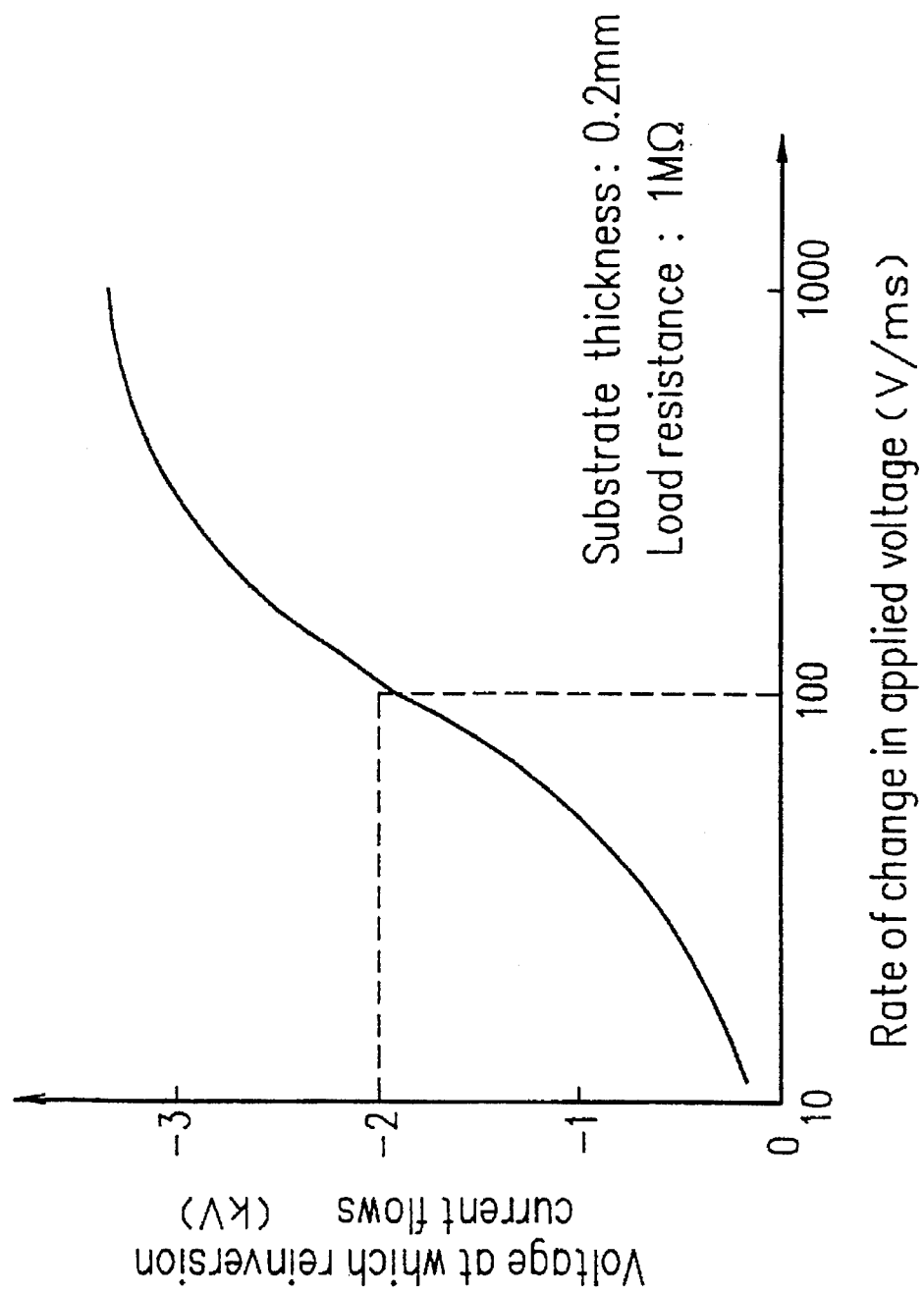
FIG. 3 is a graph showing the relationship between a rate of change in an applied pulse voltage and a voltage value with which a reinverted current flows.

A voltage value, at which domains are reinverted to allow a reinversion current to flow, depends on a rate of change in the voltage when the applied pulse voltage is returned to a zero level. The relationship thereof is shown in FIG. 3. This graph shows the case where a pulse voltage of −5 kV is applied to an LiTaO₃ substrate having a thickness of 0.2 mm. While in an actual case, the relationship changes depending on a load resistivity of a power source, the graph of FIG. 3 shows the relationship in the case where a load resistivity is 1 MΩ. According to FIG. 3, as a rate of change in the pulse voltage increases, a voltage value at which a reinversion current begins to flow, increases because of occurrence of reinversion of domains to gradually get closer to a reinversion voltage value.

Figure 2C:
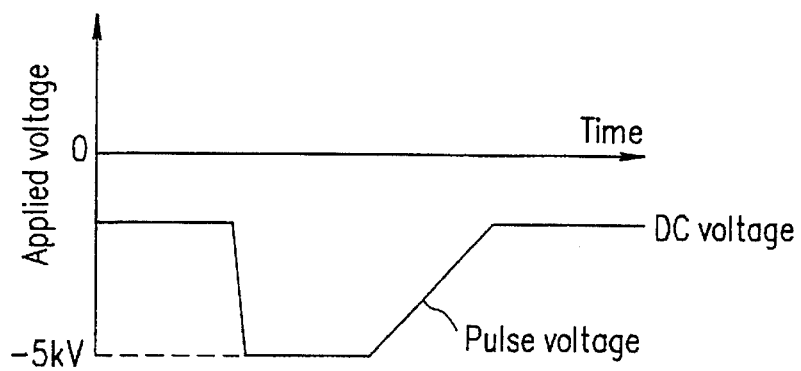
FIG. 2C shows a waveform of a voltage applied to a substrate according to the present invention.
Figure 2D:
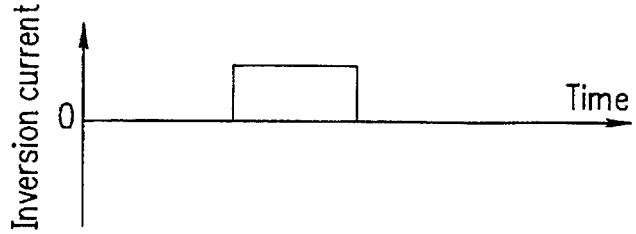
FIG. 2D shows a waveform of an inversion current flowing with the application of the voltage shown in FIG. 2C.

On the other hand, according to a method of Example 1, a voltage which is obtained by superimposing a pulse voltage on a DC voltage is applied to the substrate as shown in FIG. 2C. At this time, a DC voltage is set at such a value that domain inversion does not occur and a reinversion current does not flow. As a result, when the applied voltage is decreased from a pulse voltage value toward a zero level, the formed domain-inverted regions can be maintained without allowing a reinversion current to flow as shown in FIG. 2D. It is sufficient to apply a DC voltage after the domain inversion at a predetermined voltage level as described above for at least a predetermined time period, for example, several seconds.

For example, in the case where the LiTaO₃ substrate having a thickness of 0.2 mm is used as described above, it is sufficient to apply a voltage of −5 kV at maximum while setting a DC current at −2 kV and a pulse voltage at −3 kV. It is sufficient to set a rate of change of the applied voltage toward a zero level after the formation of domain-inverted regions at 100 V/second. Furthermore, a pulse width of the pulse voltage can be optimized by evaluating a total amount of charges flowing into the substrate based on the waveform of an inversion current. By carrying out the process of Example 1 based on these conditions, domain-inverted regions can be uniformly formed over the entire substrate.

Although the LiTaO$_3$ substrate is used in the above description, the same result can be obtained with an LiNbO$_3$ substrate.

Figure 2E:
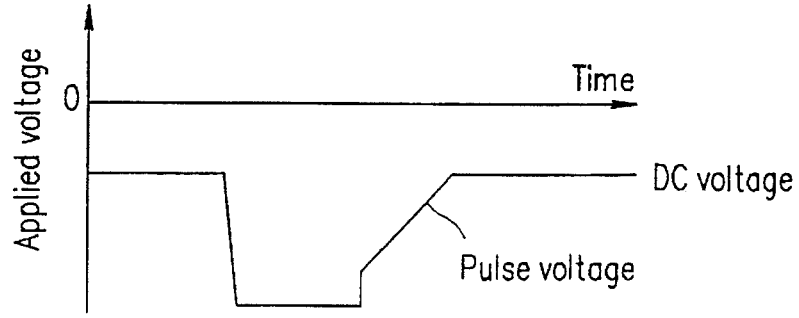
FIG. 2E shows an example of a waveform of another applied voltage according to the present invention.

An inversion current flows only when a voltage exceeding an inversion voltage is applied to the substrate. In order to precisely control the shape (area) of the domain-inverted regions to be formed, a total amount of the inversion current should be controlled. Such control can be performed by precisely controlling an inversion current and a time period in which an applied voltage exceeds an inversion voltage value. In order to perform this control, for example, as shown in FIG. 2E, it is sufficient to change an applied voltage from a pulse voltage value to a zero level in such a way that the applied voltage is first decreased in a stepwise manner to an inversion voltage level or lower and then gradually to a zero level.

Figure 4A:
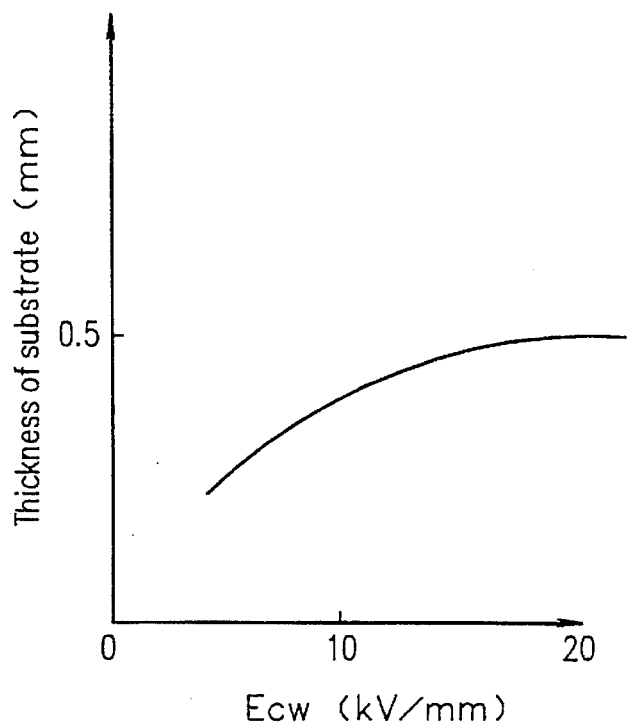
FIG. 4A is a graph showing the relationship between intensity of a DC electric field applied to a substrate and a thickness of the substrate with which a domain-inverted region can be formed.

When the relationship between a value of Ecw and a thickness of the substrate 1 with which a domain-inverted region can be formed is evaluated while constantly setting the sum of Ecw+Epp to 21 kV/mm, the results shown in FIG. 4A are obtained. More specifically, by increasing a value of Ecw, a domain-inverted region can be formed even in the thick substrate 1 without causing cracks of the substrate 1. For example, in the case where Ecw is 5 kV/mm or more, a domain-inverted region can be formed in the substrate 1 having a thickness of 0.3 mm, and in the case where Ecw is 10 kV/mm or more, a domain-inverted region can be formed in the substrate 1 having a thickness of 0.4 mm or more.

When a value of Ecw increases, uniformity within the face in the domain-inverted region to be formed improves. It is when Ecw is set to a value slightly smaller than a value at which domain inversion actually occurs (i.e., inversion electric field) that a domain-inverted region having the best uniformity can be formed. Although a specific value varies slightly depending on the substrate, it is sufficient to set a value of Ecw to 19.9 kV in the case where an inversion electric value is about 20 kV/mm. By setting Ecw to the value as described above, a domain-inverted region can be formed over a large area, that is, 20 mm×20 mm or more.

Next, shortening of the period of a domain-inverted region to be formed will be examined in the case where the domain-inverted region is formed by applying a DC voltage (electric field) on which a pulse voltage (electric field) is superimposed.

The domain-inverted region to be formed by applying an electric field spreads out in a horizontal direction after being generated directly below the electrode. Therefore, even when a short-periodic domain-inverted region is intended to be formed, the adjacent domain-inverted regions come into contact with each other. As a result, a periodic-structure is not formed. Thus, influences of the shape of the applied voltage on the spread of the domain-inverted region in a horizontal direction will be examined below.

Figure 4B:
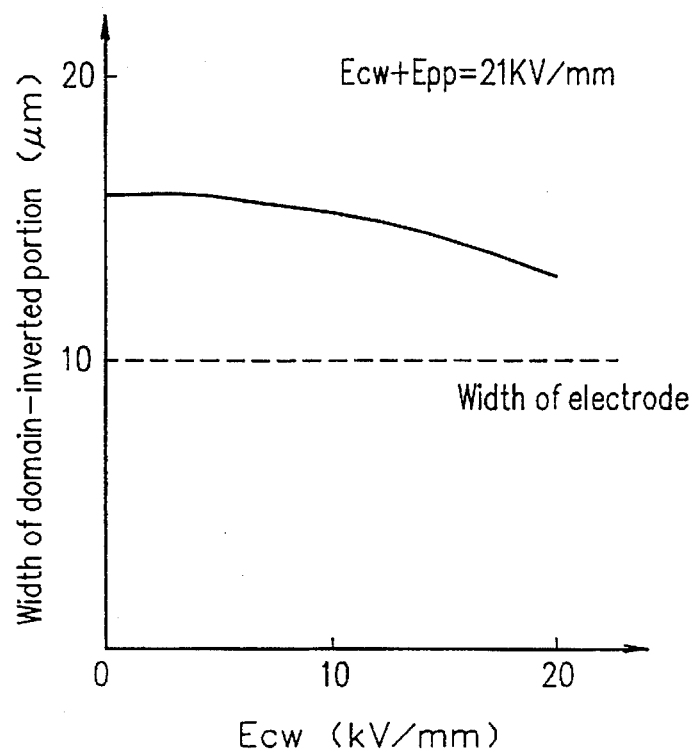
FIG. 4B is a graph showing the relationship between intensity of a DC electric field applied to a substrate and a width of a domain-inverted region.

With the configuration shown in FIG. 1A, the comb-shaped electrode 2 having a width of 10 μm and the planar electrode 3 are formed on the +C face 1a and the -C face 1b of the substrate 1, respectively. A DC voltage on which a pulse voltage is superimposed is applied between the electrodes 2 and 3. When a value of Ecw is changed as a parameter while maintaining a pulse width at 5 μm and the sum of Ecw and Epp at 21 kV/mm, the relationship as shown in FIG. 4B is obtained between a width of the domain-inverted region and Ecw. When the applied DC electric field Ecw becomes larger, the domain-inverted region is less likely to spread out in the horizontal direction. The width of the domain-inverted region which is formed in the case where Ecw is 5 kV/mm or less does not differ from the width of the domain-inverted region which is formed by applying a pulse voltage alone.

As described above, by applying a DC voltage on which a pulse voltage is superimposed to the substrate 1, it is possible to form a domain-inverted region with application of a pulse electric field of several kV/mm, which conventionally requires application of a large pulse electric field of about 20 kV/mm. At the same time, a domain-inverted region to be formed is easily uniformized and the period thereof is easily shortened. In particular, application of a DC electric field of 5 kV/mm or more and reduction of the DC electric field after completion of the application of the pulse electric field are effective in forming a uniform short-periodic domain-inverted region.

In Example 1, although the electric field is applied between the electrodes 2 and 3, a similar domain-inverted region can be formed by applying a magnetic field instead of an electric field. For example, by applying a strong magnetic field of 10 kH or more in a +Z direction, it is possible to form a domain-inverted region as the one which is formed by applying an electric field. It is possible to form a short-periodic domain-inverted region by shortening the application time period of a magnetic field so as to shape the magnetic field into a pulse form.

Moreover, although a single pulse is superimposed as a pulse electric field in Example 1, the similar effect can be obtained even when a plurality of pulses are superimposed instead. In the case where a signal pulse is superimposed, the shape of the domain-inverted region to be formed can be controlled by an amplitude and a pulse width of a pulse voltage to be applied. On the other hand, a plurality of pulses are superimposed, it is possible to control the shape of the domain-inverted region to be formed by the number of pulse electric fields to be applied. Thus, this method using a plurality of pulse electric fields is effective for improving the uniformity in the face of the domain-inverted region.

The reason why the comb-shaped electrode 2 is formed on the +C face 1a of the substrate 1 is because domain-inverted nuclei are formed on the +C face 1a. Even if a periodic domain-inverted structure is intended to be formed by forming the comb-shaped electrode 2 on the -C face 1b, it is difficult to form a short-periodic domain-inverted structure since the domain-inverted region rapidly spreads out in a horizontal direction (direction parallel to the surface of the substrate 1).

EXAMPLE 2

Figure 5A:
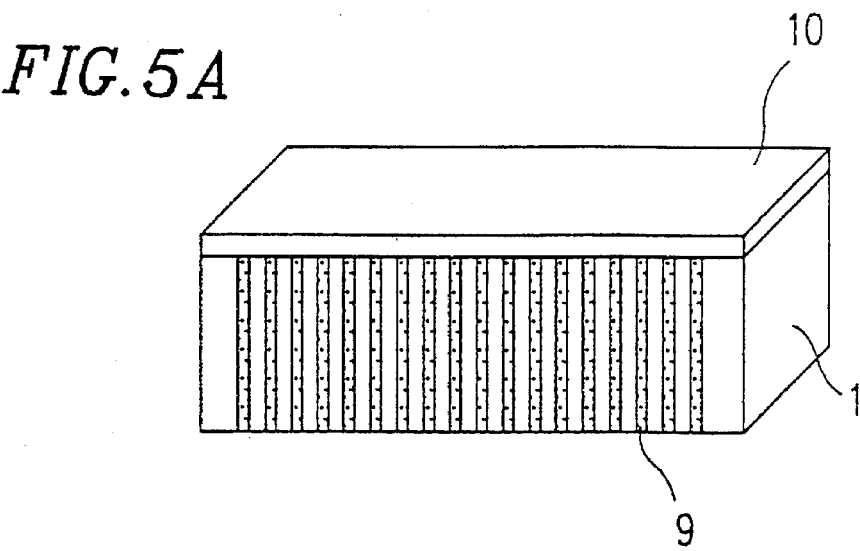
FIGS. 5A to 5C are perspective views showing the steps of forming an optical wavelength conversion device according to an embodiment of the present invention.
Figure 5B:
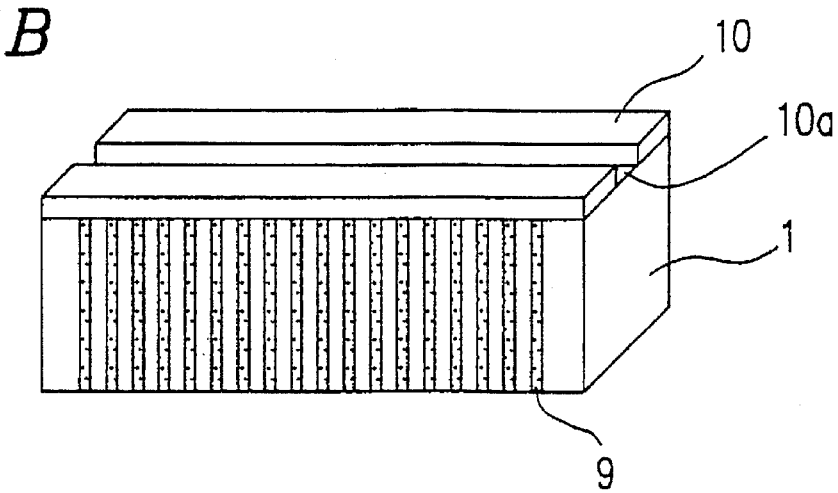
Figure 5C:
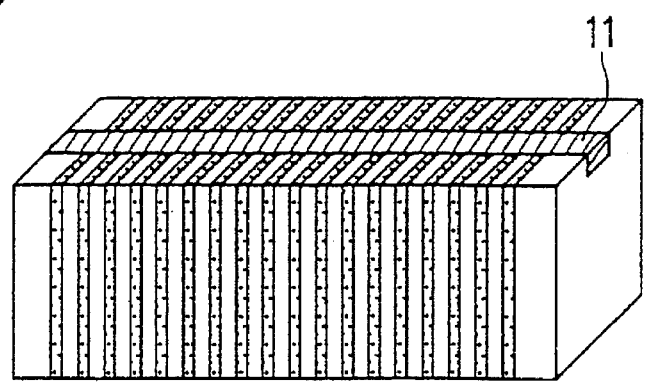

In Example 2, a method for manufacturing an optical wavelength conversion device having a stripe-shaped optical waveguide, utilizing a domain-inverted region which is manufactured according to Example 1 will be described. FIGS. 5A to 5C are perspective views illustrating an optical wavelength conversion device 200 according to Example 2.

As described in Example 1, a comb-shaped electrode and a planar electrode are formed on the +C face and the -C face of the LiTaO$_3$ substrate 1 having a thickness of 0.3 mm, respectively. Then, by applying the DC voltage Ecw on which the pulse voltage is superimposed, periodic domain-inverted regions 9 are formed. As the applied voltage, a pulse width is set to 0.5 ms and a pulse voltage level is set so as to obtain a DC electric field Ecw=19.5 kV/mm and a pulse electric field Epp=1.5 kV. Furthermore, a current detection function is added to a DC power source so as to detect an inversion current, thereby reducing a DC electric field to 1.5 kV/mm or lower simultaneously with the formation of domain inversion by superimposing a pulse voltage. As the result of the above process, as shown in FIG. 5A, the domain-inverted regions 9 having a period of 3.5 μm is formed over the region of 10 mm×10 mm in size.

A stripe-shaped optical waveguide is formed so as to perpendicularly cross the thus formed periodic domain-inverted regions 9, thereby manufacturing an optical waveguide type optical wavelength conversion device. However, a refractive index of a region in which a domain is inverted is generally larger than that of the substrate 1. Therefore, in the periodic domain-inverted regions 9 manufactured by applying an electric field as described above, a refractive index periodically changes, resulting in remarkable increase in a propagation loss of the optical waveguide to be formed.

In order to solve the above problem, before the optical waveguide is formed, the substrate 1 is subjected to annealing in an oxygen atmosphere so as to reduce the difference in the refractive index of the domain-inverted regions 9 in such a way that refractive index distribution is uniformized.

A refractive index is measured while annealing temperature is varied in the range of 300° C. to 600° C. As a result, it is clarified that the change in the refractive index is remarkably reduced by performing annealing at 400° C. or more. However, when a domain-inverted region is annealed at a higher temperature, i.e., 580° C. or higher, the domain-inverted region once formed is reduced. In particular, if the annealing at such a high temperature is continuously performed for 60 seconds or more, a domain-inverted region is almost completely eliminated.

From the above result, it is preferable that an anneal temperature is 580° C. or lower. Moreover, by setting a cooling speed to 5° C./second or lower when a temperature is lowered after the annealing, the change in the refractive index is further lowered so as to obtain uniform refractive index distribution.

After forming a periodic domain-inverted region according to Example 1, annealing is performed under the above conditions. Thereafter, the optical waveguide conversion device 200 having a stripe-shaped optical waveguide is manufactured in the steps shown in FIGS. 5A to 5C.

In the case where the optical waveguide is formed after the domain-inverted regions 9 are formed, it is preferred to form the optical waveguide in a low temperature process so as not to affect the periodic domain-inverted structure which is already formed. For example, the Curie temperature of LiTaO$_3$ is about 600° C., and it is desirable that the process is carried out at the Curie temperature or lower. Therefore, in the present invention, a proton exchange treatment, with which the optical waveguide can be manufactured at a low temperature, is conducted.

With the proton exchange treatment, metal ions in a substrate and protons in acid are exchanged with each other by thermally treating the substrate immersed in the acid, whereby a layer having a high refractive index can be formed. For example, in the case of the LiTaO$_3$ substrate, Li and proton are exchanged with each other. Since non-linearlity of the region which is subjected to a proton exchange treatment is lowered to about a half of the original non-linearlity of the substrate, it is necessary to recover the non-linearlity by performing annealing after the proton exchange treatment.

Specifically, as shown in FIG. 5A, a Ta (tantalum) mask layer 10 is deposited onto the surface of the substrate 1 in which the periodic domain-inverted regions 9 are formed by sputtering. A thickness of the Ta mask layer 10 is typically in the range of 10 nm to 500 nm; preferably in the range of 20 nm to 100 nm, for example, 40 nm. Subsequently, as shown in FIG. 5B, by performing patterning by a photolithography method and subsequent dry etching, a stripe-shaped opening 10a corresponding to the stripe-shaped optical waveguide is formed. Thereafter, a proton exchange treatment is performed through the opening 10a of the Ta mask layer 10 by thermally treating the substrate 1 in pyrophoric acid for 16 minutes at 260° C., thereby forming proton-exchange waveguide 11 as shown in FIG. 5C. Thereafter, the Ta mask layer 10 is removed, and then a thermal treatment is conducted to 420° C. for 60 minutes for the purpose of lowering the waveguide loss and recovering the non-linearlity of the waveguide, thereby completing the stripe-shaped optical waveguide 11.

Figure 6:
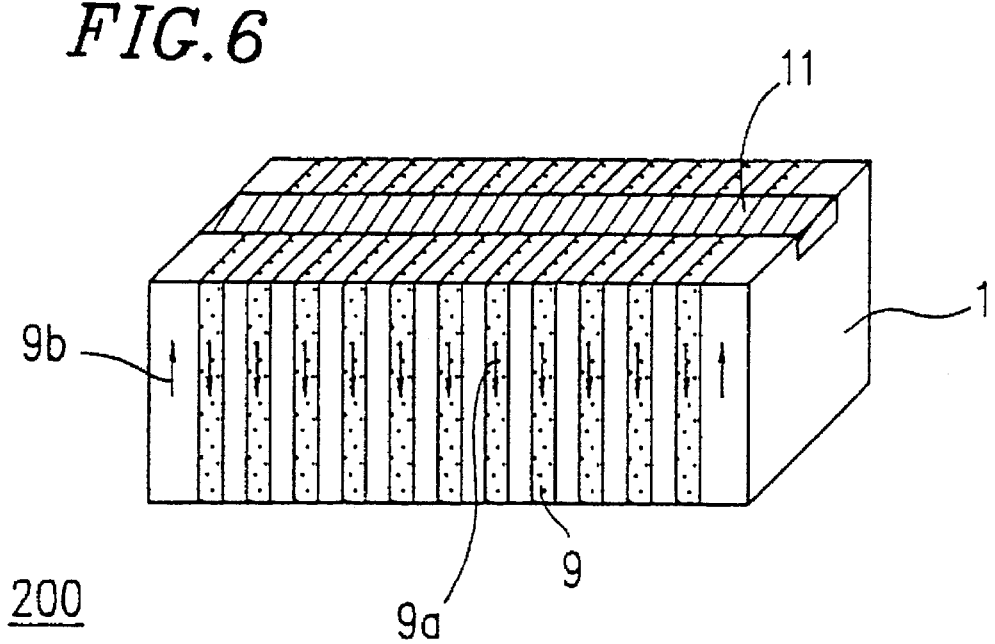
FIG. 6 is a perspective view showing an optical wavelength conversion device manufactured by the steps shown in FIGS. 5A to 5C.

The perspective view of the optical waveguide conversion device 200 to be manufactured is shown in FIG. 6. In the optical waveguide conversion device 200 shown in FIG. 6, a device length and a function length are 10 mm each, and a period of the domain-inverted region 9 is 3.5 μm. The optical waveguide 11 has a width of 4 μm and a depth of 3 μm. As indicated with arrows 9a and 9b in FIG. 6, the direction of the domains in the domain-inverted regions 9 and that of the other regions are opposite to each other.

According to Example 2, the domain-inverted region can be uniform formed over a large area, whereby operation characteristics of the optical wavelength conversion device 200 to be manufactured are improved. In particular, a light beam propagating through the optical waveguide 11 can be sufficiently superimposed on the domain-inverted regions 9 which are vertically deeply formed. As a result, the optical wavelength conversion device with high efficiency can be manufactured.

In the above description of Example 2, the LiTaO$_3$ substrate is used as the substrate 1. Alternatively, a KTP (KTiOPO$_4$) substrate, a KNbO$_3$ substrate, an LiNbO$_3$ substrate, or the LiTaO$_3$ substrate or the LiNbO$_3$ substrate which is doped with MgO, Nb, Nd or the like may be used. Alternatively, a similar optical wavelength conversion device can be manufactured with an LiNb$_{(1-x)}$Ta$_x$O$_3$ substrate (0≦X≦1) which is a mixed crystal of LiTaO$_3$ and LiNbO$_3$. Among the above substrates, in particular, the LiNbO$_3$ substrate is effective to manufacture an optical wavelength conversion device with high efficiency since it has a high non-linear optical constant.

In the above description regarding Example 2, the optical waveguide 11 is formed on the +C face 1a of the substrate 1. However, since the domain-inverted region 9 is formed so as to reach the bottom face of the substrate 1, the optical wavelength conversion device having the same performance can be manufactured even when the optical waveguide 11 is formed on the −C face 1b of the substrate 1 instead. In the case where the optical waveguide is formed on the −C face as described above, since the planar electrode alone is formed on the −C face and the pattern of the comb-shaped electrode is not formed thereon, the surface is scarcely roughened. Therefore, the waveguide with low waveguide loss can be manufactured. Thus, an optical wavelength conversion device with high efficiency can be manufactured.

As the optical waveguide, other optical waveguides such as a Ti diffusion waveguide, an Nb diffusion waveguide or an ion implantation waveguide can be used instead of the waveguide formed by proton exchange described above.

For the proton exchange treatment, in addition to pyrophoric acid described above, orthophosphoric acid, benzoic acid, sulfuric acid or the like can be used. The mask for proton exchange is not limited to the Ta mask. Any mask can be used as long as it is made of a material having good anti-acid properties, such as $Ta_2O_5$, Pt or Au.

EXAMPLE 3

In order to form a short-periodic domain-inverted region, the width of the domain-inverted region should be kept to a desired period or less. The domain inversion, which is formed by applying an electric field via the comb-shaped electrode formed on the +C face of the substrate, occurs from the +C face which is directly below the stripe-shaped electrode branches constituting the comb-shaped electrode and grows in the −C axis direction. At the same time, however, domain-inversion spreads out in a width direction of the stripe-shaped electrode branches (that is, a direction parallel to the surface of the substrate). As a result, the width of the domain-inverted region is widened, thereby making it difficult to form a short-periodic domain-inverted structure.

The present inventors examine a method for restraining the domain-inverted region from spreading out in a width direction. As a result, the present inventors consider that the domain-inverted region is inhibited from spreading out in a width direction by preventing domains from being generated in a gap between the stripe-shaped electrode branches on the +C face of the substrate. Thus, as the result of the examination on a method for inhibiting domain inversion from occurring, it is found that domain inversion can be inhibited from occurring in the vicinity of the +C face by deteriorating the ferroelectricity in the vicinity of the +C face of an $LiTaO_3$ crystal or an $LiNbO_3$ crystal. For example, it is clarified that, by performing proton exchange on the surface of the +C face of $LiTaO_3$, a value of the inversion electric field for inverting a domain increases by several kV/mm, whereby the domain inversion can be prevented from occurring.

An attempt to shorten the period of the domain-inverted region by using the above-mentioned result of the inventors' examination will now be described with reference to FIGS. 7A to 7C.

Figure 7A:
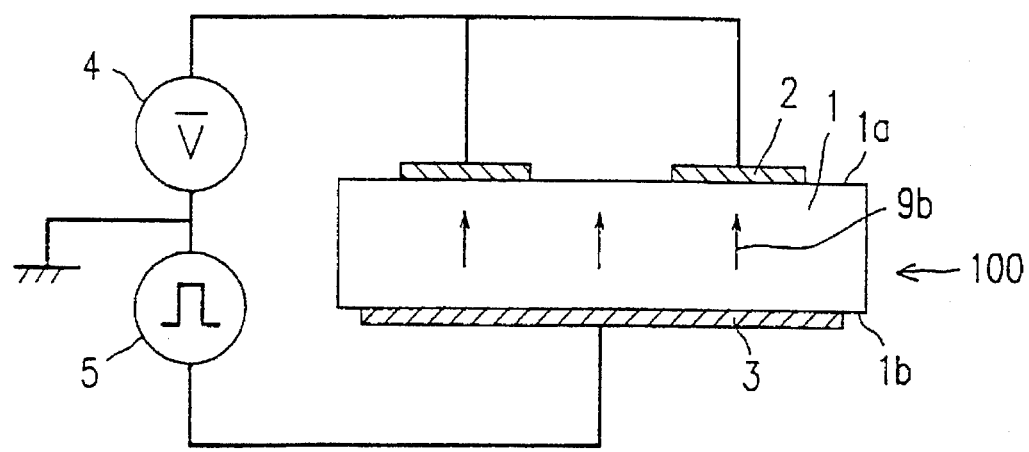
FIGS. 7A to 7C are cross-sectional views showing a method for forming a domain-inverted region according to an embodiment of the present invention.
Figure 7B:
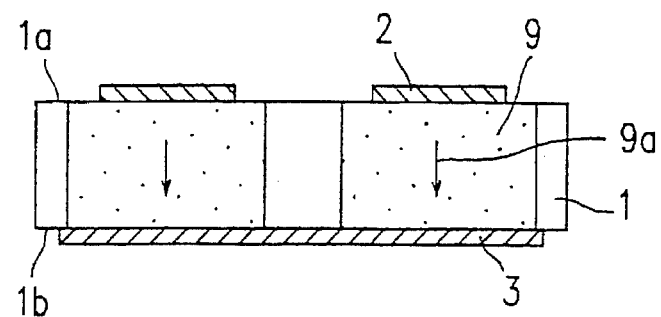

FIG. 7A is a cross-sectional view of the $LiTaO_3$ substrate 1 in the measurement system previously described as FIG. 1A. In FIG. 7A, the same components as those in FIG. 1A are denoted by the same reference numerals.

In the comb-shaped electrode 2 formed on the +C face 1a of the $LiTaO_3$ substrate 1 shown in FIG. 7A, stripe-shaped electrode branches having a width of 10 µm are formed with gaps of 10 µm each therebetween. On the other hand, the planar electrode 3 is formed on the −C face 1b of the substrate 1. At this point of time, domains inside the substrate 1 are upwardly oriented as indicated with arrows 9b in FIG. 7A.

When a voltage is applied between the comb-shaped electrode 2 and the planar electrode 3 so as to apply an electric field to the substrate 1, the domain-inverted regions 9 are formed directly below the electrode branches of the comb-shaped electrode 2 at the time when electric field intensity in the substrate 1 becomes about 20 kV/mm or higher. The domain in the domain-inverted regions 9 are downwardly oriented as indicated with arrows 9a in FIG. 7B. Thus, the direction of the domain is inverted as compared with that before application of the electric field.

However, the domain-inverted regions 9 thus formed spread out in a width direction of the electrode branches (that is, direction parallel to the surface of the substrate 1). If the growth in the width direction proceeds, the adjacent domain-inverted regions 9 may finally come into contact with each other.

Figure 7C:
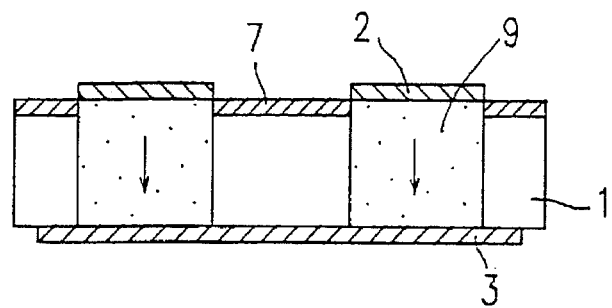

On the other hand, as shown in FIG. 7C, the vicinity of the surface of the +C face 1a between the electrode branches is subjected to a proton exchange treatment, thereby forming proton-exchanged regions 7. In such proton-exchanged regions 7, its ferroelectricity is deteriorated. Therefore, the domain-inverted regions 9 are inhibited from spreading out in a horizontal direction. As a result, as shown in FIG. 7C, the domain inverted regions 9 having the same width as that of the electrode branches are formed only directly below the respective electrode branches.

Figure 8A:
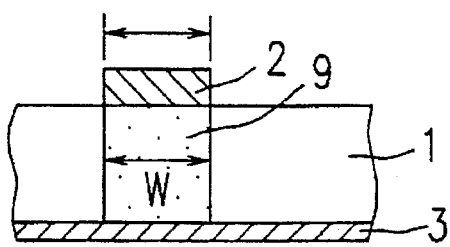
FIG. 8A is a cross-sectional view showing the positional relationship between a comb-shaped electrode and a domain-inverted region.

Furthermore, the influences of the proton exchange treatment on the spread of the domain-inverted regions 9 in a horizontal direction will be described with reference to FIGS. 8A and 8B.

Figure 8B:
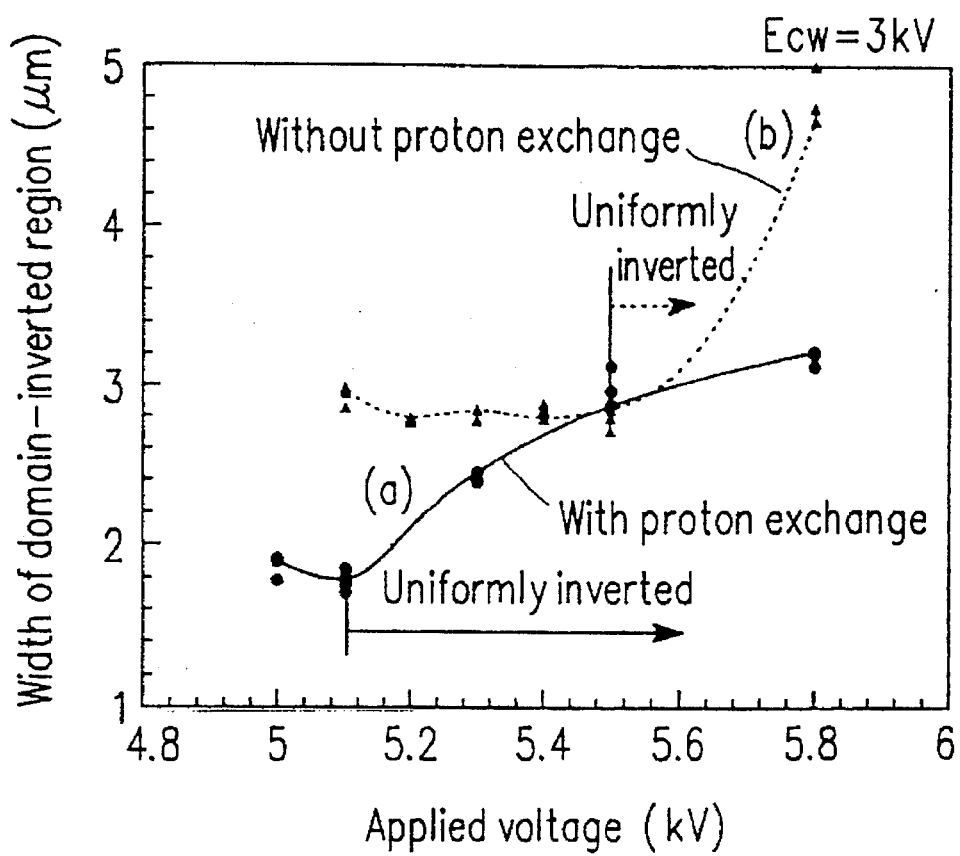
FIG. 8B is a graph showing the relationship between an applied voltage and a width of a domain-inverted region.

In FIG. 8B, the ordinate represents a width W of the formed domain-inverted regions 9. The domain-inverted regions 9 are formed by using the comb-shaped electrode 2 having a width 10 µm as shown in FIG. 8A. In other words, the width W of the domain-inverted region indicated with the ordinate of FIG. 8B represents the degree of the spread of the domain-inverted regions 9.

On the other hand, the abscissa of FIG. 8B represents the voltage applied between the comb-shaped electrode 2 and the planar electrode 3. More specifically, a DC voltage Ecw on which a pulse voltage Epp is superimposed is applied, and a DC component Ecw of the applied voltage is kept constant, i.e., 3 kV. The abscissa of FIG. 8B represents the sum of the DC voltage Ecw and the pulse voltage Epp, i.e., E=Ecw+Epp. In this case, a pulse width of the pulse voltage is 3 ms.

FIG. 8B shows the relationships between the width W of the domain-inverted regions 9 and the applied voltage E, in a sample having the +C face in the gap between the stripe-shaped electrode branches of the comb-shaped electrode 2, which is subjected to a proton exchange treatment (260° C., 20 minutes), and in a sample which is not subjected to such a proton exchange treatment, respectively.

As shown in FIG. 8B, the width W of the domain-inverted region 9, i.e., the spread of the horizontal direction, increases as the applied voltage E increases regardless of the presence of the proton exchange treatment. In the case where a proton exchange treatment is not performed, domain inversion is not uniformly formed with the applied voltage of 5.5 kV or lower. Therefore, the obtained minimum value of W is 2.7 µm, which is the width W of the domain-inverted region when the applied electric filed is 5.5 kV. More specifically, in the sample which is not subjected to a proton exchange treatment, although a width of the stripe-shaped electrode branches of the comb-shaped electrode 2 used for forming the domain-inverted region 9 is 2 µm, the minimum width W of the domain-inverted region 9 actually formed is 2.7 µm.

On the other hand, in the case where a proton exchange treatment is performed, the spread of the domain-inverted regions 9 in the horizontal direction is inhibited. As a result, the domain-inverted region 9 having substantially the same width W as that of the stripe-shaped electrode branches of the comb-shaped electrode 2 can be formed. As described above, it is clarified that the spread of the domain-inverted regions 9 in a horizontal direction can be inhibited by performing a proton exchange treatment.

Figure 9A:
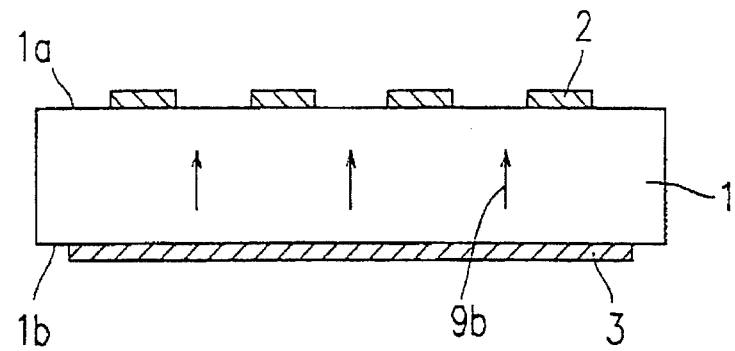
FIGS. 9A to 9C are cross-sectional views showing a method for forming a domain-inverted region according to an embodiment of the present invention.
Figure 9B:
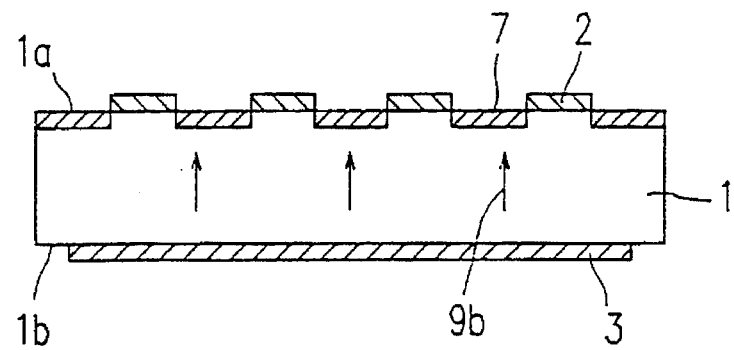
Figure 9C:
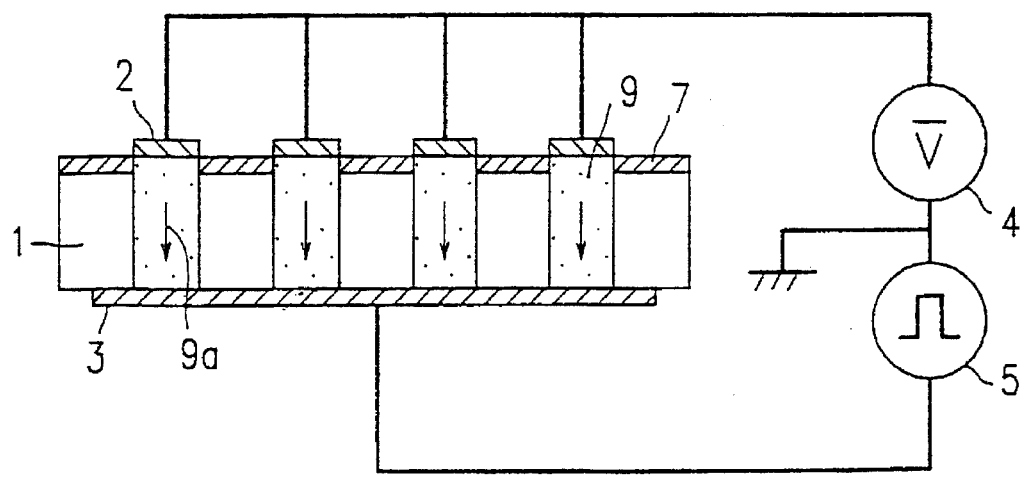

Next, the example in which the above result is applied to the formation of a periodic domain-inverted region will be described with reference to FIGS. 9A to 9C. In FIGS. 9A to 9C, the same components as those in the drawings previously referred to are denoted by the same reference numerals.

First, as shown in FIG. 9A, the comb-shaped electrode 2 and the planar electrode 3 are formed on the +C face $1a$ and the −C face $1b$ of the $LiTaO_3$ substrate serving as a C plate, respectively. As the planar electrode 3, for example, a Ta film having a thickness of about 500 nm can be used. Next, the +C face $1a$ of the gap between the stripe-shaped electrode branches is subjected to a proton exchange treatment by using the comb-shaped electrode 2 as a mask. The proton exchange treatment is typically performed in pyrophoric acid at 260° C. for 30 minutes. By this treatment, as shown in FIG. 9B, the proton-exchanged regions 7 having a depth of about 0.4 µm are formed. Next, as shown in FIG. 9C, the proton-exchanged substrate 1 is placed in an insulating solution or a vacuum. Then, a voltage is applied between the comb-shaped electrode 2 and the planar electrode 3 by using the DC power source 4 and the pulse power source 5 so as to apply an electric field onto the substrate 1. As a specific electric field to be applied, for example, a DC electric field Ecw=18 kV/mm on which a pulse electric field Epp=3 kV/mm is superimposed is used.

According to the steps as described above, the domain-inverted regions 9 having a period of 2 µm to 10 µm can be formed. In the case where the gap between the stripe-shaped electrode branches of the comb-shaped electrode 2 is not subjected to the proton exchange, it is difficult to uniformly form the domain-inverted region having a period of 3 µm or less. On the other hand, the gap between the stripe-shaped branches is subjected to a proton exchange treatment according to Example 3, the short-periodic domain-inverted regions 9 having a period of 2.5 µm or less can be uniformly formed.

Next, influences of the time period of the proton exchange treatment on the formation of the domain-inverted regions 9 will be described.

In the case where a proton exchange treatment is performed using pyrophoric acid at 260° C., the effects for inhibiting the domain-inverted regions 9 from spreading out are exhibited by setting a proton exchange time period to 5 minutes or more. Furthermore, the domain-inverted region 9 having excellent uniformity in the face can be obtained by performing a proton exchange treatment for 10 minutes or more. However, if the proton exchange treatment is conducted over a long period of time, the adjacent proton-exchanged region 7 come into contact with each other, thereby failing to form the periodic domain-inverted structure 9. From the above result, it is effective to perform a proton exchange treatment for 10 minutes or more in such a way that the adjacent proton-exchanged regions 7 do not come into contact with each other.

The deterioration of the ferroelectricity of the substrate 1 caused by the proton exchange treatment means deterioration of the crystal state capable of inverting spontaneous polarization. More specifically, the deterioration of the ferroelectricity indicates the state where spontaneous polarization becomes small, the state where the inversion electric field of the spontaneous polarization increase, or the state where crystal not longer shows ferroelectricity. For example, if a proton exchange treatment is performed, spontaneous polarization becomes extremely small since strain of the crystal structure is reduced.

Alternatively, the same phenomenon can be obtained by a treatment other than the proton exchange. For example, by implanting ions into the surface of the substrate 1, the crystal structure is broken so as to be close to a random structure. As a result, the substrate 1 no longer exhibits spontaneous polarization.

As described above, by changing the crystal structure in the crystal surface in which domain inversion occurs, the domain-inverted regions 9 are inhibited from spreading out. In the case of the $LiTaO_3$ substrate and the $LiNbO_3$ substrate described above, the domain-inverted regions 9 are generated from the +C face $1a$. In some kinds of crystals, the domain inversion may occurs not from the +C face but from the −C face or other faces. In such a case, by deteriorating the ferroelectricity of the face in which the domain inversion occurs, the domain-inverted regions are similarly inhibited from spreading out.

In the above description of Example 3, the proton exchange treatment is used as a method of deteriorating the ferroelectricity of the surface of the substrate. Alternatively, the similar effects can be obtained by ion exchange of Zn, Cd or the like; implantation of proton ions, He ions, Si ions or Au ions; metal diffusion such as Ti diffusion or MgO diffusion.

In the above description of Example 3, the proton exchange treatment is conducted using pyrophoric acid. Alternatively, the same effects as described in Example 3 can be obtained by conducting a proton exchange treatment using orthophosphoric acid, benzoic acid, sulfuric acid or the like. Moreover, although the Ta film is used as a metal film constituting the electrode in Example 3, any other film can be used as long as it has appropriate heat resisting properties. Specifically, a film made of a material such as Ti, Pt, Au or the like can be used.

In the above description of Example 3, the $LiTaO_3$ substrate is used as the substrate 1. Alternatively, an $LiNbO_3$ substrate, or an $LiTaO_3$ substrate or an $LiNbO_3$ substrate being either undoped or doped with MgO, Nb, Nd or the like, can also be used as the substrate 1. Alternatively, a similar optical wavelength conversion device can be manufactured using an $LiNb_{(1-x)}Ta_xO_3$ substrate ($0 \leq X \leq 1$) which is a mixed crystal of $LiTaO_3$ and $LiNbO_3$. With these crystals, a ferroelectricity-deteriorated layer can be easily formed by proton exchange in the same way as described above. Therefore, a periodic domain-inverted region can be easily manufactured by applying an electric field. In particular, $LiNbO_3$ is effective to manufacture a high efficiency optical wavelength conversion device since $LiNbO_3$ has a high non-linear optical constant.

On the other hand, a KTP ($KTiOPO_4$) substrate or a $KNbO_3$ substrate can be used as the substrate 1. Since these substrates have a high non-linear optical constant, they are effective for manufacturing a high-efficiency optical wavelength conversion device. In particular in the case of the KTP substrate, where a crystal surface of the gap between the electrode branches of the comb-shaped electrode is deteriorated, the crystalinity of the surface can be changed by a treatment using Rb ions. By applying an electric field thereafter, a deep domain-inverted regions can be formed.

EXAMPLE 4

In Example 4, a method for manufacturing an optical wavelength conversion device utilizing the periodic domain-inverted region by performing a proton exchange treatment according to Example 3 will be described.

As previously described in Example 2, if an optical waveguide is formed on the formed domain-inverted region, the optical wavelength conversion device having the shape shown in FIG. 5C can be manufactured. However, a proton exchange treatment is periodically performed on the +C face $1a$ of the LiTaO$_3$ substrate 1 in which the periodic domain-inverted regions 9 are formed according to Example 3. Thus, there is a periodic refractive index distribution (a difference in refractive index between the substrate 1 and the domain-inverted regions 9). Therefore, in order to form an optical waveguide of low loss, it is necessary to uniformize the refractive index distribution by annealing.

FIGS. 10A to 10D are cross-sectional views schematically illustrating the influences of a temperature of annealing for the above objective on the shape of the formed domain-inverted regions 9. FIG. 10A shows the state where annealing is not conducted, and FIGS. 10B to 10D show the states where annealing is conducted at 450° C., 500° C. and 550° C., respectively.

Before conducting annealing, as shown in FIG. 10A, needle-like microdomains 8 remain in the vicinity of the surface of the +C face $1a$ of the substrate 1. Such microdomains 8 deteriorate the periodicity of the periodic domain-inverted structure including the domain-inverted regions 9. In order to solve this problem, as shown in FIGS. 10B through 10D, the microdomains 8 are eliminated by conducting annealing.

When an annealing temperature exceeds 500° C., however, the formed periodic domain-inverted regions 9 are eliminated from the vicinity of the +C face $1a$ of the substrate 1 as shown in FIGS. 10C and 10D. As an annealing temperature or an annealing time period is increased, the domain-inverted regions 9 are more deeply eliminated.

When the periodic domain-inverted structure is eliminated from the vicinity of the surface of the substrate 1, a predetermined optical wavelength inversion function cannot be obtained. Therefore, in order to form an optical waveguide of low loss while improving the uniformity of the formed periodic domain-inverted structure, it is desirable that an annealing temperature is set to 500° C. or lower.

According to the above steps, since it is possible to shorten the period of the domain-inverted structure to 2 μm, a phase matching wavelength can be shortened to 740 nm. Therefore, it is possible to generate an ultra-violet ray having a wavelength of 370 nm.

As described above, according to Example 4, since a uniform domain-inverted region can be obtained, characteristics of the optical wavelength conversion device can be intended to be improved. Moreover, by forming the domain-inverted regions to a deep position of the substrate, a high efficiency optical wavelength conversion device can be manufactured. Furthermore, by shortening the period of the domain-inverted regions, a secondary harmonic wave having a short wavelength can be generated.

Although the change in refractive index generated by the proton exchange treatment before application of an electric field is eliminated by annealing, it can be eliminated by other methods.

A thickness of the proton-exchanged layer on the surface of the substrate, which is formed by proton exchange, is merely about 1 μm. By optically polishing the surface of the substrate, the proton-exchanged layer can be easily removed. Specifically, the proton-exchanged layer on the surface of the substrate is removed by polishing the surface of the substrate on a polishing cloth using a polishing solution containing diamond generally used for optically polishing the LiNbO$_3$ substrate, the LiTaO$_3$ substrate or the like. Thereafter, by forming the proton exchange optical waveguide in accordance with the method described above, a high efficiency optical wavelength conversion device can be similarly formed.

Alternatively, the proton-exchanged layer may be removed by wet etching or dry etching.

In the case of wet etching using an etchant, etching is carried out using a solution obtained by mixing, for example, HF and HNO$_3$ at the ratio of 2:1 as an etchant while maintaining a temperature of the etchant to about 60° C. An etching rate of the +C face generally differs from that of the −C face in the case of wet etching. However, since the etching rates are substantially identical with each other after proton exchange, etching is performed without generating unevenness on the domain-inverted surface. Thus, an optical waveguide with low loss can be formed.

In the case of dry etching, etching can be carried out using gases such as CF$_4$, CHF$_3$ or the like. For example, by setting an RF power to about 100 W in a reactive ion etching apparatus, an etching rate of about several tens nm/minute can be obtained. The etching rate of the surface of the substrate after proton exchange is higher than that of the substrate before proton exchange. Thus, a process with higher efficiency can be carried out.

EXAMPLE 5

In Example 5, another method for forming a high-efficiency optical wavelength conversion device will be described.

The efficiency of an optical waveguide conversion device depends on a power density of the light propagating through an optical waveguide. Therefore, if an optical waveguide having large light confinement properties is formed, an optical waveguide conversion device with higher efficiency can be manufactured. In Example 5, a ridge-shaped optical waveguide is used as an optical waveguide for manufacturing an optical wavelength conversion device including an optical waveguide having large light confinement properties.

FIGS. 11A to 11D illustrate a method for forming a ridge-shaped optical waveguide $17a$ on the domain-inverted regions 9. The domain-inverted regions 9 may be formed according to either method previously described in Example 1 or Example 3.

Figure 11A:
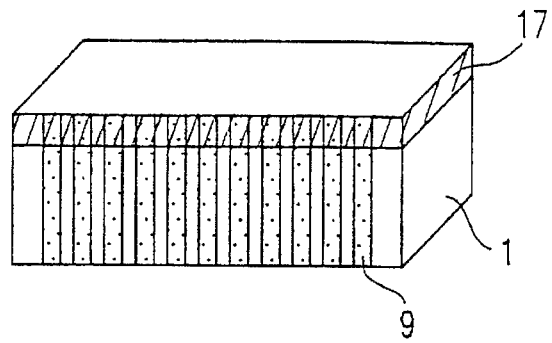
FIGS. 11A to 11D are cross-sectional views showing the steps of forming an optical wavelength conversion device according to an embodiment of the present invention.
Figure 11B:
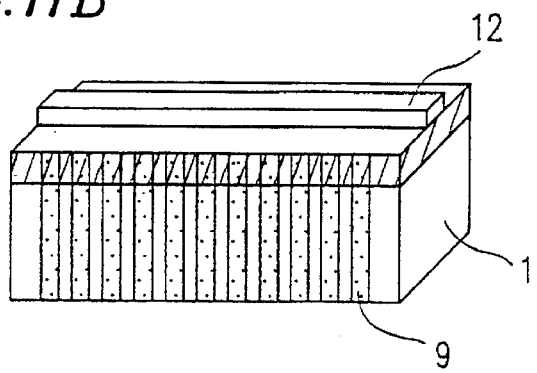
Figure 11C:
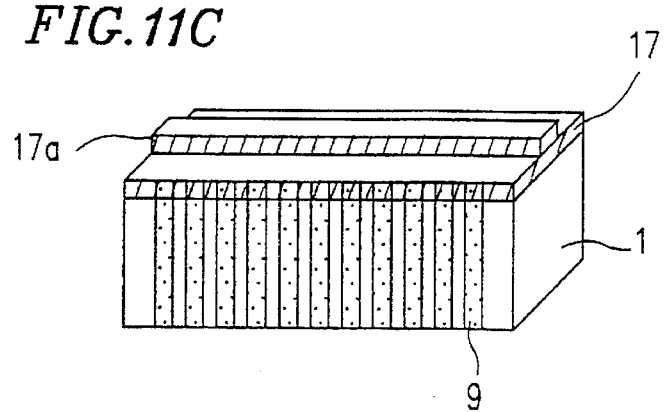
Figure 11D:
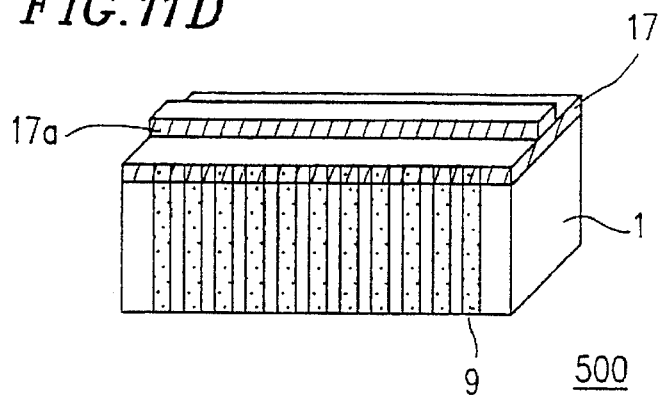

The LiTaO$_3$ substrate 1, in which the periodic domain-inverted regions 9 are formed, is subjected to a proton exchange treatment so as to form a proton-exchanged layer 17 on the surface of the substrate 1 as shown in FIG. 11A. The proton exchange treatment can be carried out by immersing the substrate 1 in pyrophoric acid at 260° C. for 20 minutes. Next, as shown in FIG. 11B, a resist pattern 12 for forming an optical waveguide is formed on the proton-exchanged layer 17 by photolithography. Subsequently, dry etching is conducted in a CHF$_3$ gas atmosphere using the resist pattern 12 as a mask. By this dry etching, the proton-exchanged layer 17 is etched to about 300 nm. Furthermore, by removing the resist pattern 12, the proton-exchanged layer 17 partially having a ridge $17a$ is formed as shown in FIG. 11C. Furthermore, annealing is conducted, for example, at 420° C. for 60 minutes, thereby obtaining an optical wavelength conversion device 500 having the ridge-shaped optical waveguide $17a$ as shown in FIG. 11D.

In the optical wavelength conversion device 500 thus manufactured, it is possible to reduce the conventional thickness of the optical waveguide $17a$, i.e., about 2 μm, to 1.5 μm and the conventional width, i.e., 4 μm, to 3 μm. With such reduction of the optical waveguide in size, it is possible to enhance a power density of the light propagating through the optical waveguide to 1.5 times of a conventional power density. As a result, a conversion efficiency of the optical wavelength conversion device is enhanced to be approximately doubled as compared with a conventional conversion efficiency.

EXAMPLE 6

Figure 12:
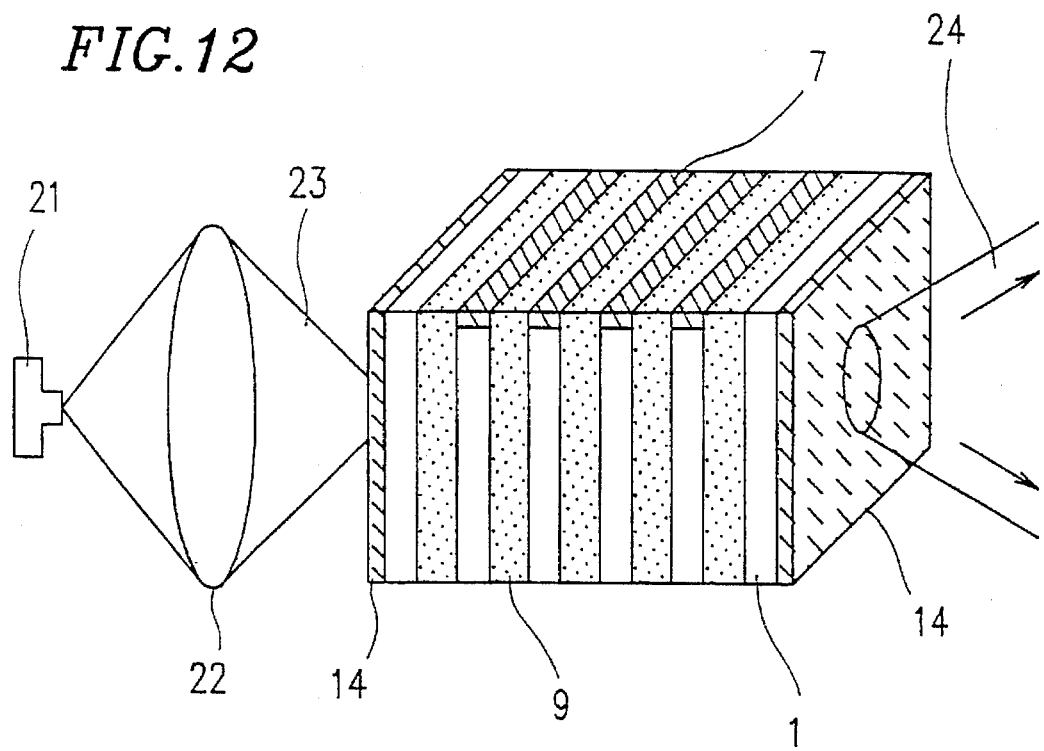
FIG. 12 is a perspective view showing an optical wavelength conversion device according to an embodiment of the present invention.

An optical wavelength conversion device 600 in Example 6 of the present invention will be described with reference to FIG. 12.

In the optical wavelength conversion device 600, the periodic domain-inverted regions 9 are formed in the LiTaO$_3$ substrate 1. In the gap between the domain-inverted regions 9 in the vicinity of the surface of the substrate 1, the proton-exchanged regions 7 are formed. Furthermore, on the both sides of the substrate 1 in which the periodic domain-inverted regions 9 are formed, reflective films 14 are respectively deposited after polishing. The reflective film 14 typically reflects 90% or more of a fundamental wave having a wavelength of 800 nm.

When a light beam (fundamental wave) 23 of a semiconductor laser 21 enters such a optical wavelength conversion device 600 through a light focusing optical system 22, the entering fundamental wave 23 is multiply reflected on the reflective films 14 formed on the both ends of the substrate 1 so as to resonate inside the substrate 1. More specifically, the optical wavelength conversion device 600 functions as a resonator, and converts and outputs the entering fundamental wave 23 with high efficiency to a secondary harmonic wave 24 by increasing in the internal power.

In the optical waveguide conversion device 600, the entering light beam is subjected to wavelength conversion, utilizing the periodic domain-inverted regions 9 formed within the substrate 1 in a bulk state. Since the fundamental wave 23 sufficiently overlap the domain-inverted regions 9, light wavelength conversion with high efficiency can be performed.

The proton-exchanged regions 7 formed in the vicinity of the surface of the substrate 1 between the domain-inverted regions 9 demonstrate a function for preventing the deterioration of the domain-inverted regions 9. In the case where domain inversion is caused by applying an electric field, the crystal of the substrate 1 is extremely strained while the deep domain-inverted regions 9 can be formed. Such strain induces deterioration in the formed domain-inverted regions 9 with elapse of time. For example, the shape of the domain-inverted regions 9 gradually change to induce the change in operation characteristics of the optical wavelength conversion device 600. On the other hand, if the proton-exchanged regions 7 are formed between the domain-inverted regions 9, the shape of the domain-inverted regions 9 is prevented from changing, thereby constituting the stable optical wavelength conversion device 600 having operation characteristics which do not change with elapse of time.

Furthermore, the LiTaO$_3$ substrate 1 has strong pyroelectric effects. Therefore, when the temperature of the substrate 1 changes, pyroelectric charges are accumulated in the surface of the crystal in the substrate 1, thereby generating an electric field. When the electric field is generated, the refractive index changes by electro-optical effects. Thus, the phase matching characteristics of the light wavelength conversion device 600 are affected so as to render an output unstable. With respect to this problem, since the proton-exchanged regions 7 have lower electric resistance than that of the LiTaO$_3$ substrate 1 by about one digit, it is possible to enhance a travelling speed of the charges generated by the pyroelectric effects so as to prevent the electric field from being generated by forming the proton-exchanged regions 7 on the surface of the substrate 1. Thus, the optical wavelength conversion device 600 capable of maintaining stable output characteristics even when an external temperature varies can be configured.

As described above, the optical wavelength conversion device 600 serves as a resonator in Example 6. In order that the optical wavelength conversion device 600 serves as a resonator, the domain-inverted regions 9 should be uniformly formed to a position deeper than a beam diameter of the multiple reflected fundamental wave 23, typically to a depth of several tens of μm or more. Since the uniform periodic domain-inverted regions 9 can be formed to a depth of about several hundreds of μm by application of an electric field, the resonator-type optical wavelength conversion device 600 with high efficiency can be manufactured.

In the above description of Example 6, the bulk-shaped optical wavelength conversion device 600 which performs wavelength conversion utilizing the domain-inverted regions 9 formed within the substrate 1 will be described. However, as described in Example 2, 4, or 5, an optical waveguide can be formed on the surface of the substrate 1 so as to configure an optical waveguide type optical wavelength conversion device. In such a case, as described in correlation with Example 2, annealing for reducing the periodic change in the refractive index which is present between the substrate 1 and the domain-inverted regions 9 is required. In Example 6, however, since the proton-exchanged regions 7 having a refractive index higher than that of the substrate 1 are formed in the gaps between the domain-inverted regions 9 in the vicinity of the surface of the substrate 1, the difference in the refractive index between the domain-inverted regions 9 and the substrate 1 as described above can be reduced. Thus, since an optical waveguide with low loss can be manufactured, the optical wavelength conversion device with high efficiency can be configured.

EXAMPLE 7

A method for forming a domain-inverted region according to Example 7 of the present invention will be described with reference to FIGS. 13A to 13C.

Figure 13A:
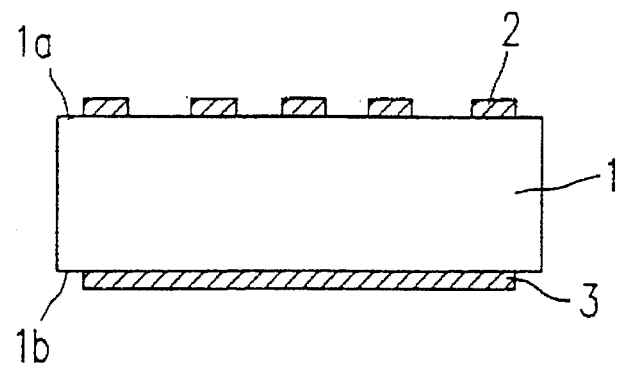
FIGS. 13A to 13C are cross-sectional views showing a method for forming a domain-inverted region according to an embodiment of the present invention.
Figure 13B:
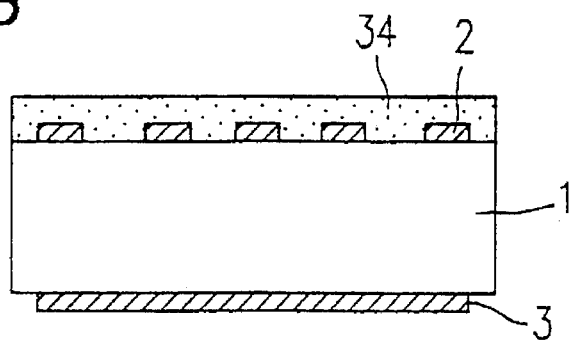
Figure 13C:
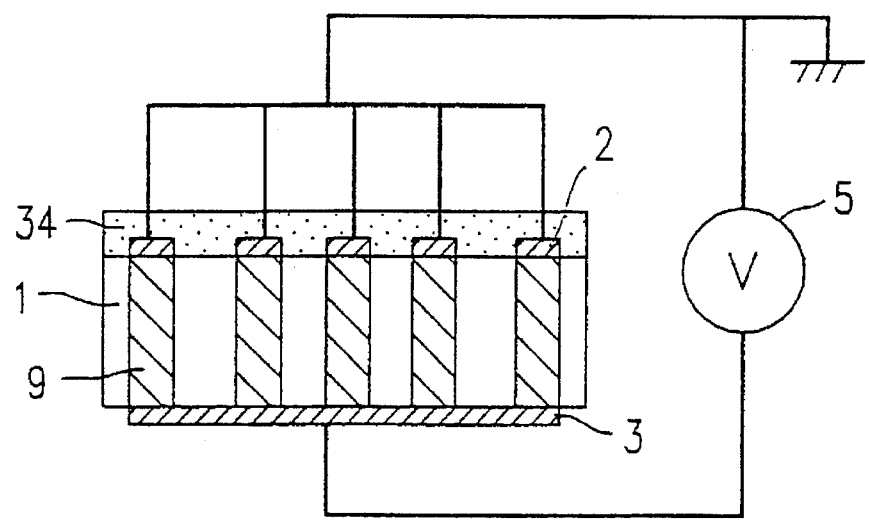

First, as shown in FIG. 13A, the comb-shaped electrode 2 having stripe-shaped electrode branches having a width of 1.2 μm each is formed on the +C face 1a of the LiTaO$_3$ substrate 1 serving as a C plate (a substrate cut along the face perpendicular to the C axis of crystal) having a thickness of, for example, 200 μm. On the other hand, the planar electrode 3 is formed on the −C face 1b of the substrate 1. For example, Ta films having a thickness of about 60 nm can be used for these electrodes 2 and 3. Next, as shown in FIG. 13B, an insulating film 34 made of SiO$_3$ having a thickness of 200 nm is deposited by sputtering so as to cover the comb-shaped electrode 2 formed on the surface of the +C face 1a. Thereafter, a negative pulse voltage (typically, having a pulse width of 3 ms) is applied to the planar electrode 3 while the comb-shaped electrode 2 is grounded. In order to prevent the discharge from being generated, the entire substrate 1 is placed in an insulating solution or a vacuum of 10$^{-6}$ Torr or lower when a voltage is applied.

The spread of the domain-inverted regions 9 thus formed in a horizontal direction will be described with reference to FIGS. 14A to 14C.

Figure 14A:
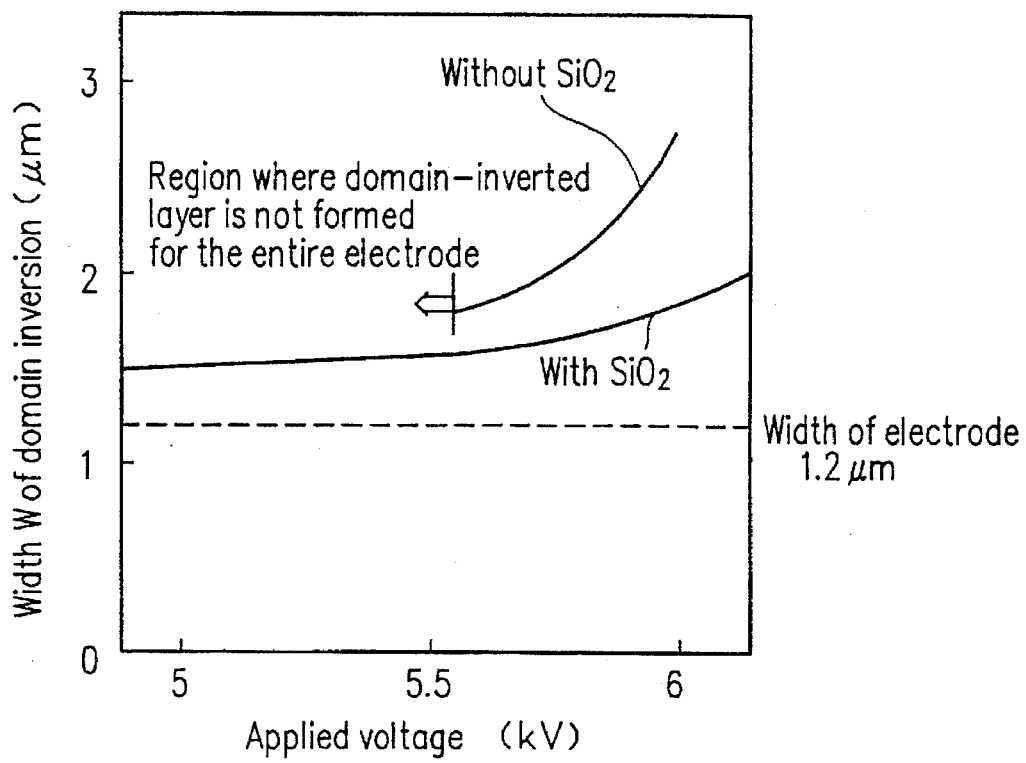
FIG. 14A is a graph showing the relationship between an applied voltage and a width of a domain-inverted region.
Figure 14B:
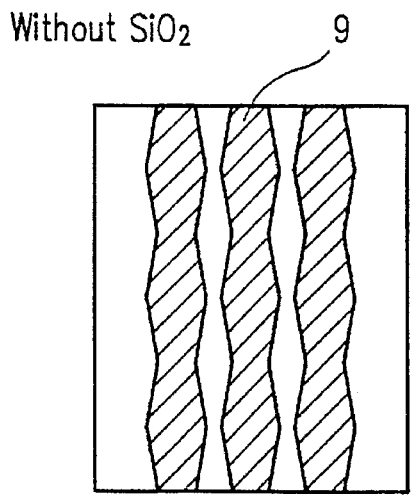
FIGS. 14B and 14C are cross-sectional views schematically showing the shape of domain-inverted regions to be formed.
Figure 14C:
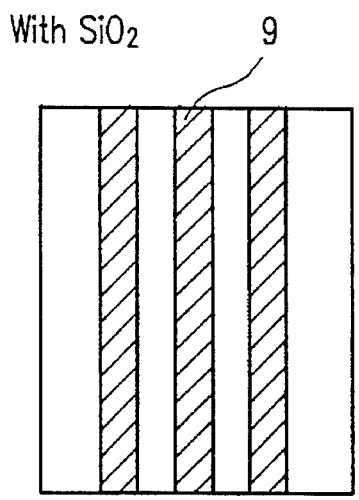

In FIG. 14A, the ordinate represents the width W of the formed domain-inverted regions 9, and the abscissa represents a voltage (absolute value) applied between the comb-shaped electrode 2 and the planar electrode 3. On the other hand, FIGS. 14B and 14C are cross-sectional views showing the shape of the domain-inverted regions to be formed.

FIG. 14A also shows the data in the case where an $SiO_2$ insulating film 34 is not deposited on the comb-shaped electrode 2 for comparison. According to the data, in the case where the $SiO_2$ insulating film 34 is not formed, a width W of the domain-inverted regions 9 to be formed cannot be reduced to 1.7 µm or less. As schematically shown in FIG. 14B, the domain-inverted regions 9, which is obtained in the case where the $SiO_2$ insulating film 34 is not formed, has an ununiform shape, and its width W widely varies within the range of ±30% or more. Furthermore, when an applied voltage is less than 5.5 V, the phenomenon, in which some domains are not inverted in the substrate 1 or only small domains are inverted, is observed. Therefore, in the case where the $SiO_2$ insulating film 34 is not deposited on the comb-shaped electrode 2, it is necessary to apply a voltage of 5.5 kV or higher for stably forming the domain-inverted regions 9 over a wide area of the substrate.

On the other hand, if the $SiO_2$ insulating film 34 having a thickness of 200 nm is formed on the comb-shaped electrode 2 according to Example 7, the width W of the domain-inverted regions 9 to be formed can be reduced to 1.5 µm which is close to the width of the stripe-shaped electrode branches of the comb-shaped electrode. As shown in FIG. 15C, the domain-inverted regions 9 having a uniform shape are formed, and variation in its width can be inhibited within ±5%. Furthermore, if a voltage of 4.9 kV or more is applied, the domain-inverted regions 9 can be formed over a wide area corresponding to the entire electrode.

As described above, by covering the comb-shaped electrode 2 with the $SiO_2$ insulating film 34, the spread of the domain-inverted regions 9 in a horizontal direction can be inhibited over a wide range of the applied voltage. As a result, it is possible to form the domain-inverted regions 9 having a uniform shape.

Next, the characteristics required for the insulating film 34 formed on the comb-shaped electrode 2 will be described.

First, influences of a resistivity of the insulating film 34 will be examined based on the results of measurement of the widths of the domain-inverted regions which are formed with the comb-shaped electrode 2 covered with insulating films having different resistivities. As a result, when an insulating film having a resistivity of $10^{15}\Omega.cm$ or more, the spread of the domain-inverted regions 9 to be formed can be inhibited to about 1 µm and the variation in the width can be reduced to about ±10%. The more the resistivity of the insulating film is increased, the more the spread of the width of the domain-inverted regions 9 to be formed can be restrained to limit the variation within ±5%. As a result, more uniform domain-inverted regions 9 are formed.

In consideration of the above result, the domain-inverted regions 9 having a period of about 5 µm can be formed using an insulating film having a resistivity of about $10^{15}\Omega.cm$. In the case where the short-periodic domain-inverted regions 9 having a period of 4 µm or less are formed, it is desirable that an insulating film having a resistivity of $10^{16}\Omega.cm$ or more is used.

Next, exemplifying the case where an $SiO_2$ film (having a resistivity of about $10^{17}\Omega.cm$) is deposited on the comb-shaped electrode 2, the relationship between the thickness of the insulating film 34 and the width of the domain-inverted regions 9 to be formed will be described.

The effects for inhibiting the domain-inverted regions 9 from spreading out in a width direction can be obtained in the case where a thickness of the $SiO_2$ film is 20 nm or more. If a thickness of the $SiO_2$ film is set to 100 nm or more, the variation in the width of the domain-inverted regions 9 can be reduced to about ±10%. Furthermore, in the case where the thickness of the $SiO_2$ film is 200 nm or more, the variation in the width of the domain-inverted regions 9 can be reduced to ±5% or less, in addition, the spread thereof can be limited within 0.2 µm. However, even if the thickness of the $SiO_2$ film is set to 200 nm or more, further improvement cannot be obtained.

On the other hand, when the $SiO_2$ film is thin, sufficient effects on inhibition of the spread of the domain-inverted regions 9 in a width direction cannot be obtained due to the influences of the insulating solution (resistivity: $10^{15}\Omega.cm$) which serves as an ambient atmosphere during application of an electric field.

In the above description, although the $SiO_2$ film is used as the insulating film 34, an insulating film consisting of other material can also be used. For example, when the domain-inverted regions are similarly formed in the substrate on which a $Ta_2O_5$ film is formed to 200 nm by sputtering, the same characteristics as those obtained with the $SiO_2$ film can be obtained. However, if a film made of organic polymer is used as an insulating film, the obtained effects are about half those in the case where the $SiO_2$ film or the $Ta_2O_5$ film is used.

Moreover, in the above description, the insulating film 34 is deposited by sputtering. In the sputtering, a material of a film to be deposited has high kinetic energy when it is sputtered from a target to be adhered to the substrate. This greatly affects free charges on the surface of the substrate 1, and therefore, the sputtering is excellent in effects for inhibiting domain inversion. However, the insulating film 34 may be deposited by other methods for depositing a film, for example, EB vapor deposition, CVD, ion beam sputtering and sol-gel methods.

In the above description, the comb-shaped electrode 2 is formed on the +C face 1a of the substrate 1. The formation of the domain-inverted regions in the $LiNbO_3$ substrate or the $LiTaO_3$ substrate initiates from the formation of domain-inverted nuclei in the +C face 1a. Therefore, by forming the comb-shaped electrode 2 on the +C face 1a, the pattern of the comb-shaped electrode 2 can be accurately transferred to the pattern of the domain-inverted regions. On the other hand, even if a comb-shaped electrode is formed on the −C face 1b of the substrate 1, a highly uniform periodic domain-inverted structure is not formed.

In the description of Example 7, the $LiTaO_3$ substrate is used as the substrate 1. Alternatively, a KTP ($KTiOPO_4$) substrate, a $KNbO_3$ substrate, an $LiNbO_3$ substrate, or the $LiTaO_3$ substrate or the $LiNbO_3$ substrate which is doped with MgO, Nb, Nd or the like, can be used as the substrate 1. Alternatively, a similar optical wavelength conversion device can also be manufactured with an $LiNb_{(1-x)}Ta_xO_3$ substrate ($0 \leq X \leq 1$) which is a mixed crystal of $LiTaO_3$ and $LiNbO_3$. In particular, the $LiNbO_3$ substrate is effective for manufacturing an optical wavelength conversion device with high efficiency since the $LiNbO_3$ substrate has a high non-linear optical constant.

EXAMPLE 8

A method for forming domain-inverted regions according to Example 8 of the present invention will be described with reference to FIGS. 15A to 15D.

Figure 15A:
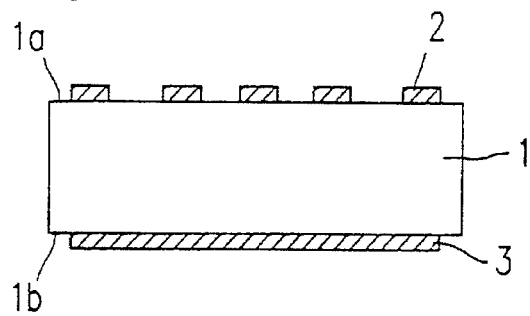
FIGS. 15A to 15D are cross-sectional views showing a method for forming a domain-inverted region according to an embodiment of the present invention.
Figure 15B:
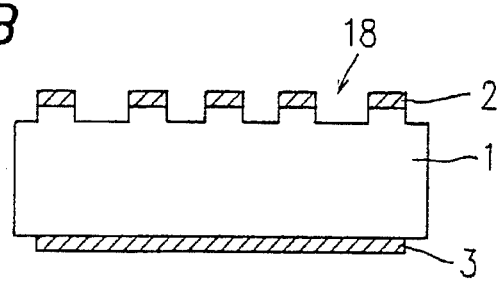
Figure 15C:
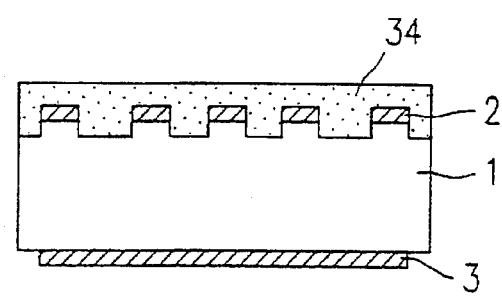
Figure 15D:
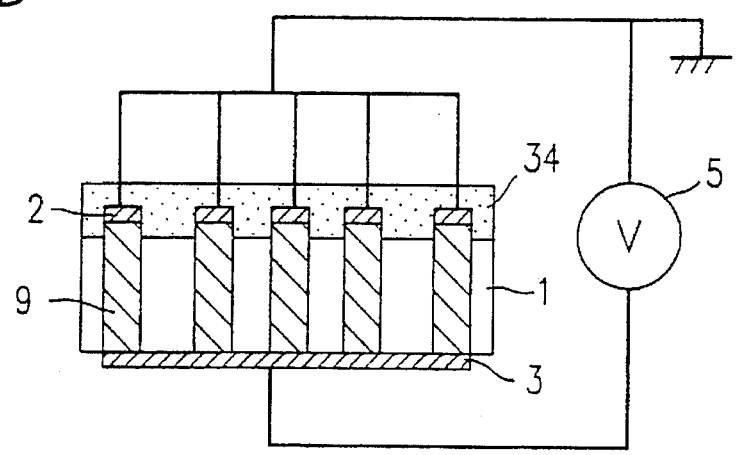

First, as shown in FIG. 15A, the comb-shaped electrode 2 and the planar electrode 3 are formed on the +C face 1a and −C face 1b of the LiTaO$_3$ substrate 1 having a thickness of, for example, 200 μm serving as a C plate (a substrate cut along a face perpendicular to the C axis of crystal), respectively. For example, Ta films having a thickness of 60 nm can be used as these electrodes 2 and 3. The comb-shaped electrode 2 has a period of the stripe-shaped electrode branches of 3.8 μm, each having a width of 1.9 μm.

Next, after a resist having a thickness of 1 μm is deposited on the comb-shaped electrode 2, the part of the surface of the substrate 1 which is not covered with the comb-shaped electrode 2 is etched by resistive ion etching in a CHF$_3$ gas atmosphere. By removing a resist thereafter, grooves 18 are formed on the +C face 1a of the substrate between the stripe-shaped electrode branches of the comb-shaped electrode 2. A depth of removal by etching is set to, for example, 0.1 μm.

Subsequently, the insulating film 34 made of SiO$_2$ having a thickness of 200 nm is deposited by sputtering so as to cover the +C face 1a of the substrate 1 including the comb-shaped electrode 2 and the grooves 18. Then, after the comb-shaped electrode 2 is grounded, a negative pulse voltage (typically having a pulse width of 3 ms and an amplitude of 5.2 kV) is applied to the planar electrode 3. In order to prevent the discharge from being generated, the entire substrate 1 is placed in an insulating solution or a vacuum of 10$^{-6}$ Torr or lower during application of a voltage.

By the above steps, the domain-inverted regions 9 are exclusively formed directly below the electrode branches of the comb-shaped electrode 2, and the pattern of the electrode 2 is perfectly transferred to the domain-inverted regions. In particular, the surface of the substrate 1 in the periphery of the stripe-shaped electrode branches of the comb-shaped electrode 2 is removed by etching so as to form the grooves 18, thereby reducing movement of charges in the surface of the substrate 1. As a result, the spread of the domain-inverted regions 9 in a width direction can be inhibited. Thus, the uniform periodic domain-inverted regions 9 are formed.

EXAMPLE 9

As described in the previous examples, the periodic domain-inverted regions can be formed by applying a voltage in a domain direction of a ferroelectric crystal using a comb-shaped electrode. In some crystals, however, domain inversion cannot be easily caused or it may be difficult to form short-periodic domain-inverted regions even when the domains are successfully inverted. In Example 9 described below, a method for easily forming domain-inverted regions in a crystal, in which domain-inverted regions are hardly formed by a conventional method, will be described.

In order to facilitate the domain inversion in the ferroelectric substrate, the application of a large electric field with a small inversion voltage onto a thin substrate is considered. However, since a thin substrate does not have sufficient strength, it becomes extremely difficult to carry out required fabrication processes such as a process for forming electrodes. Thus, in Example 9, in order to allow the thin substrate to be easily handled, domain-inverted regions are formed in a substrate according to the steps shown in FIGS. 16A to 16E.

Figure 16A:
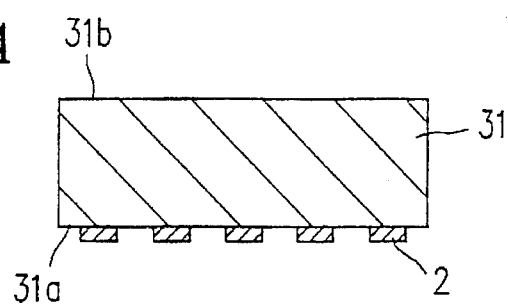
FIGS. 16A to 16E are cross-sectional views showing a method for forming a domain-inverted region according to an embodiment of the present invention.
Figure 16B:
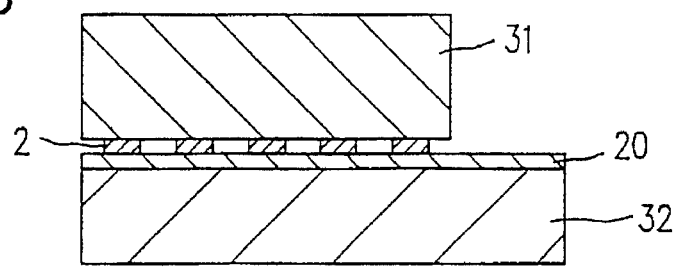
Figure 16C:
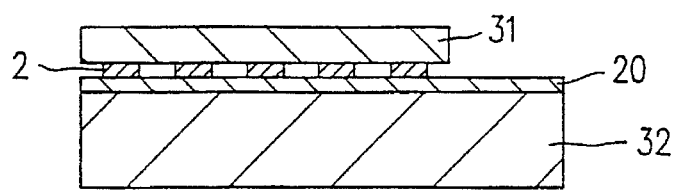
Figure 16D:
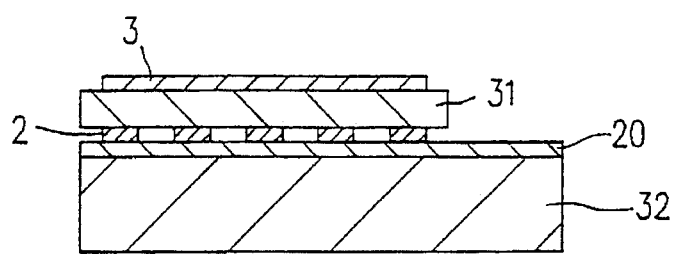
Figure 16E:
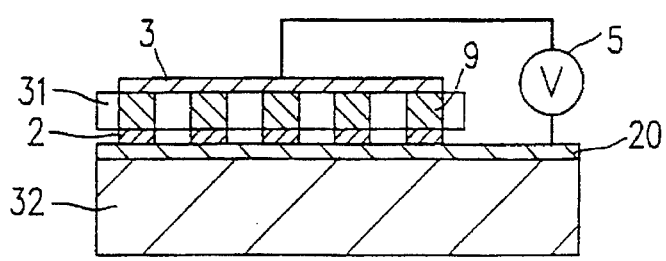

First, as shown in FIG. 16A, the comb-shaped electrode 2 is formed on a +C face 31a of an LiNbO$_3$ substrate 31 doped with MgO having a thickness of 0.5 mm. Next, as shown in FIG. 16B, the MgO-doped LiNbO$_3$ substrate 31 is attached onto an LiNbO$_3$ substrate 32 on which a leading electrode 20 is formed. At this time, the leading electrode 20 of the LiNbO$_3$ substrate 32 and the comb-shaped electrode 2 of the MgO-doped LiNbO$_3$ substrate 31 are electrically connected to each other. Subsequently, the MgO-doped LiNbO$_3$ substrate 31 thus attached is optically polished so as to reduce its thickness to 50 μm as shown in FIG. 16C. Thereafter, as shown in FIG. 16D, the planar electrode 3 is formed on a polished surface of the MgO-doped LiNbO$_3$ substrate 31. Subsequently, as shown in FIG. 16E, the pulse power source 5 is connected between the leading electrode 20 of the LiNbO$_3$ substrate 32 and the planar electrode 3 of the MgO-doped LiNbO$_3$ substrate 31 so as to apply a pulse voltage. By application of the pulse voltage, short-periodic domain-inverted regions 9 are formed in the MgO-doped LiNbO$_3$ substrate 31.

Since the MgO-doped LiNbO$_3$ substrate has a high non-linear optical constant and is excellent in optical damage resisting properties, it is desirable as a material of the wavelength conversion device. With a conventional method, however, it is difficult to form a periodic domain-inverted structure with MgO-doped LiNbO$_3$. On the other hand, according to the method of Example 9 previously described, the domain-inverted regions 9 having a period of 3 μm can be formed on the MgO-doped LiNbO$_3$ substrate 31. In this way, by using the MgO-doped LiNbO$_3$ substrate 31 in which the periodic domain-inverted regions 9 are formed, it is possible to manufacture an optical wavelength conversion device with high efficiency. Thus, it is possible to generate SHG light with high output.

As previously described in Example 8, also in the process of Example 9, it is possible to enhance the uniformity of the periodic structure of the domain-inverted regions to be formed by covering the comb-shaped electrode 2 with an insulating film such as an SiO$_2$ film.

In the case where the optical wavelength conversion device formed according to Example 9 is applied to a pyroelectric sensor, it is possible to enhance a response speed of the pyroelectric sensor by the use of a highly thermally conductive material as the optical substrate.

Furthermore, by utilizing the domain-inverted structure formed as described above, an optical waveguide type optical wavelength conversion device can be manufactured. In such a case, before the series of steps shown in FIGS. 16A to 16E are carried out, an optical waveguide is formed on the +C face 31a of the MgO-doped LiNbO$_3$ substrate 31.

Figure 17:
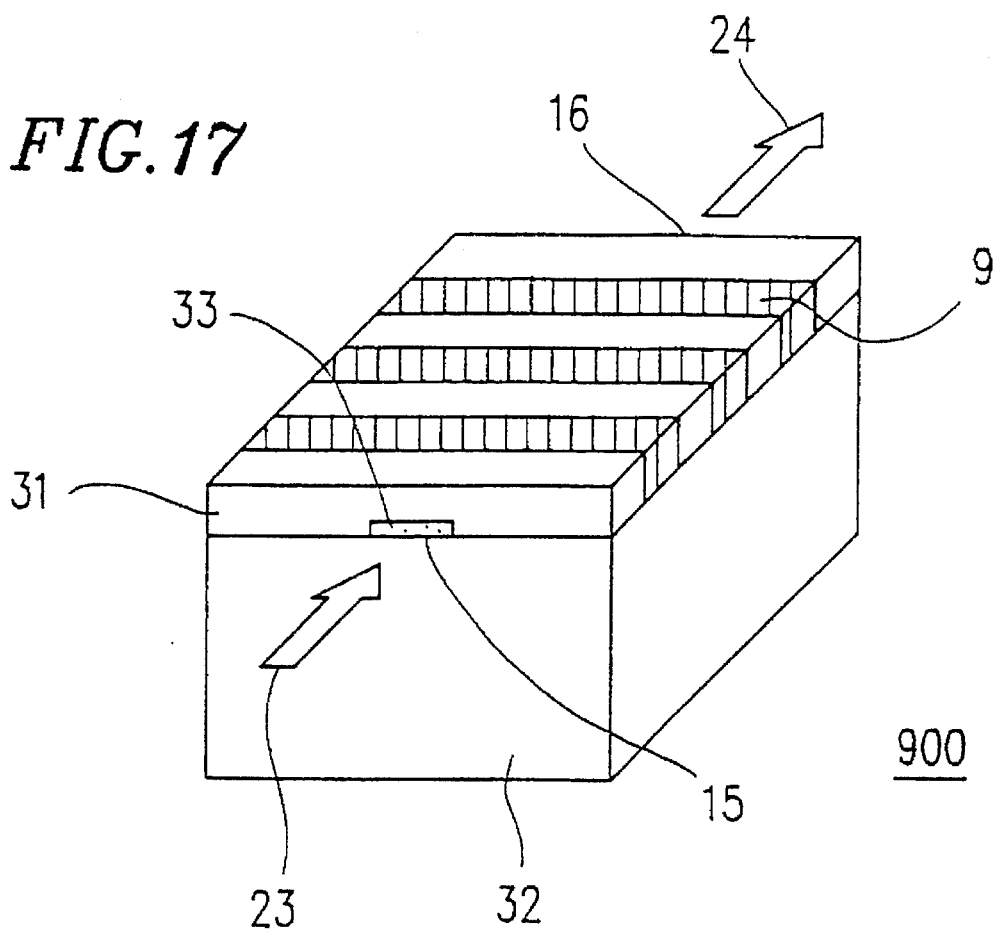
FIG. 17 is a perspective view showing an optical wavelength conversion device which is manufactured utilizing the domain-inverted region obtained by the steps shown in FIGS. 16A to 16E.

The optical waveguide is manufactured, for example, according to the following steps. A Ta film is deposited on the +C face 31a of the substrate 31. Then, a pattern of the stripe-shaped optical waveguide is formed by photolithography and dry etching. Thereafter, the substrate 31 is thermally treated in pyrophoric acid at 230° C. for 8 minutes so as to perform proton exchange, thereby forming a proton exchange waveguide. By further conducting a thermal treatment at 300° C. for 10 minutes, an optical waveguide is formed. Thereafter, the steps shown in FIGS. 16A to 16E are carried out. Then, periodic domain-inverted regions are formed in the optical waveguide. As a result, an optical wavelength conversion device 900 having a stripe-shaped optical waveguide 33 as shown in FIG. 17 is completed.

In the optical wavelength conversion device 900, the fundamental wave 23 which enters the device 900 from a light entering portion 15 solely propagates through the optical waveguide 33. During this process, the fundamental wave 23 is converted to the secondary harmonic wave 24, and outgoes from a light outgoing portion 16. At this time, since the fundamental wave 23 propagates through the optical waveguide 33 alone, a power density of the fundamental wave 23 in the device 900 increases. Moreover, an interaction length between the propagating fundamental wave 23 and the domain-inverted structure 9 also increases. As a result, the wavelength conversion device 900 with high efficiency is realized.

By attaching the LiNbO₃ substrate 31 onto the optical waveguide 33, dust and the like is prevented from being deposited on the optical waveguide 33 so as not to generate waveguide loss. Moreover, by depositing a material having a refractive index closer to that of the substrate, distribution of the refractive indices of the optical waveguide 33 is allowed to have a symmetrical structure. Thus, distribution of the electric field of light propagating through the optical waveguide 33 has a symmetrical structure, resulting in a high coupling efficiency of the fundamental wave 23. In this case, the comb-shaped electrode of the optical waveguide conversion device 900 shown in FIG. 17 should be a transparent electrode so as to reduce loss of the optical waveguide 33.

In the description of Example 9 described above, the MgO-doped LiNbO₃ substrate is used as the ferroelectric substrate 31. Alternatively, an MgO-doped LiTaO₃ substrate, an Nd-doped LiNbO₃ substrate, an Nd-doped LiTaO₃ substrate, a KTP substrate, a KNbO₃ substrate, an LiNbO₃ substrate doped with Nd and MgO, or an LiTaO₃ substrate doped with Nd and MgO may also be used as the ferroelectric substrate 31.

Among the above materials, since the substrate consisting of a crystal doped with Nd is capable of oscillating a laser, a secondary harmonic wave can be generated by converting a wavelength of a fundamental wave simultaneously with generation of the fundamental wave by laser oscillation. Therefore, a short wavelength light source having stable operation characteristics with high efficiency can be manufactured.

Since the KNbO₃ substrate has a high non-linear optical constant and excellent optical damage resisting properties, the optical wavelength conversion device with high output can be formed.

On the other hand, in the above description of Example 9, the LiNbO₃ substrate is used as the substrate 32 to be attached onto the ferroelectric substrate 31. However, a substrate made of other material is also used as long as the substrate is optically planar. In particular, it is preferred to use the substrate 32 made of a material having a thermal expansion coefficient equal to that of the ferroelectric substrate 31 since application of thermal strain to the ferroelectric substrate 31 can be reduced by such a material.

EXAMPLE 10

A thin film crystal made of a ferroelectric material can be formed by using methods such as liquid phase crystal epitaxy, vapor phase crystal epitaxy or laser ablation. If such a ferroelectric thin film crystal is used, domain-inverted regions can be formed even for a material in which periodic domain-inverted regions are hardly formed. Furthermore, by using the thin film as an optical waveguide, an optical waveguide type optical wavelength conversion device with high efficiency can be configured.

Hereinafter, a method for forming the domain-inverted regions 9 in the ferroelectric thin film 30 formed by crystal growth will be described as Example 10 of the present invention.

LiNbO₃ doped with MgO is a highly non-linear material, which is excellent in optical damage resisting properties. According to a conventional method, however, it is difficult to form periodic domain-inverted regions in LiNbO₃ doped with MgO. Therefore, in Example 10, after the MgO-doped LiNbO₃ layer 30 is grown on the LiTaO₃ substrate 31, the periodic domain-inverted regions 9 are formed in the grown MgO-doped LiNbO₃ layer 30.

A method for forming the domain-inverted regions 9 according to Example 10 will be described with reference to FIGS. 18A to 18C.

Figure 18A:
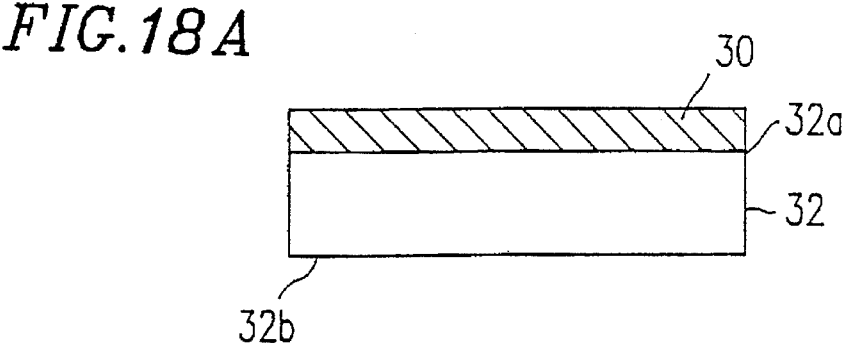
FIGS. 18A to 18C are cross-sectional views showing a method for forming a domain-inverted region according to an embodiment of the present invention.

As shown in FIG. 18A, the LiNbO₃ layer 30 doped with MgO of 5 mol % having a thickness of 2 μm is deposited on a +C face 32a of a LiTaO₃ substrate 32 serving as a C plate (a substrate cut along the face perpendicular to the C axis of crystal) by liquid phase epitaxy. Next, as shown in FIG. 18B, the comb-shaped electrode 2 and the planar electrode 3 are formed on the grown LiNbO₃ layer 30 and a −C face 32b of the LiTaO₃ substrate 32, respectively. For example, Ta films having a thickness of about 60 nm are used for these electrodes 2 and 3. The comb-shaped electrode 2 has the stripe-shaped electrode branches having a period of 3.8 μm and a width of 1.9 μm each. Subsequently, a pulse voltage is applied between the comb-shaped electrode 2 and the planar electrode 3 by the pulse power source 5. By the application of the pulse voltage, the periodic domain-inverted regions 9 are formed in the MgO-doped LiNbO₃ layer 30.

Since the ferroelectric film formed by crystal growth has a low impurity concentration and a changeable crystal structure, an optical wavelength conversion device with high efficiency can be formed. Furthermore, since a thin film can be easily formed, a highly uniform periodic domain-inverted structure is easily formed.

As previously described in Example 8, also in the process of Example 10, uniformity of the periodic structure of the domain-inverted region 9 to be formed can be enhanced by covering the comb-shaped electrode 2 with an insulating film such as SiO₂.

Furthermore, by using the periodic domain-inverted regions 9 which are formed according to Example 10, a method for forming an optical wavelength conversion device 1000 having a ridge-shaped optical waveguide 30a will be described with reference to FIGS. 19A and 19B.

Figure 18B:
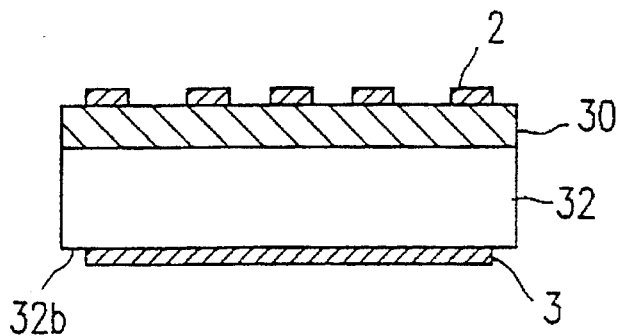
Figure 18C:
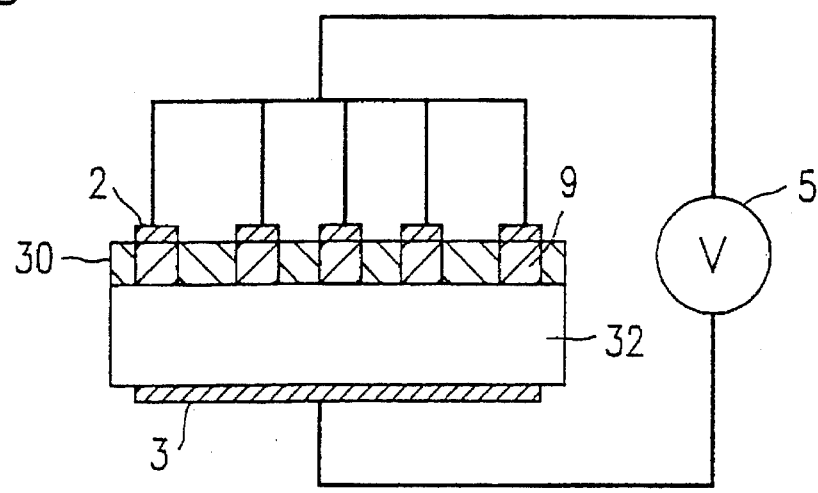
Figure 19A:
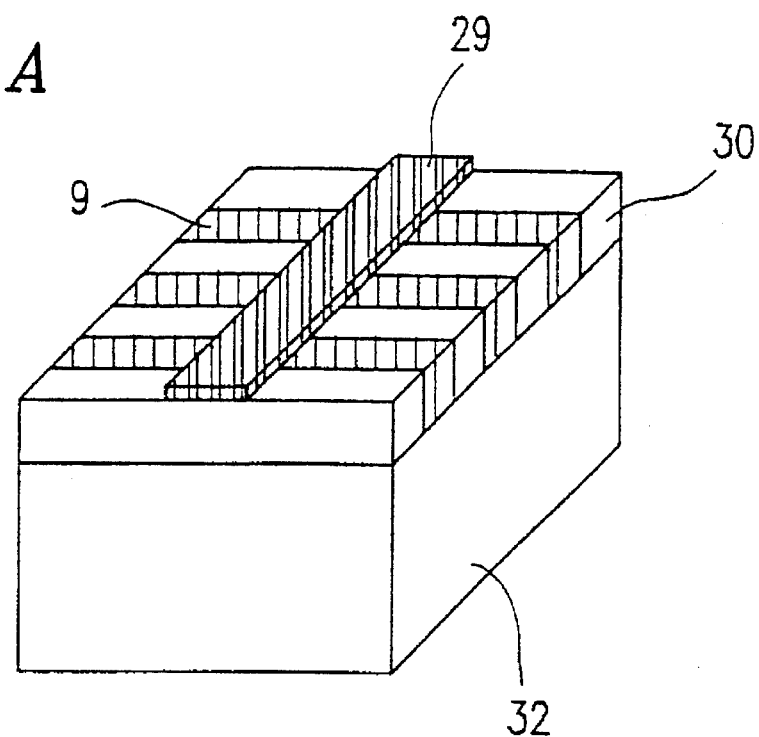
FIGS. 19A and 19B are perspective views showing the steps of forming an optical wavelength conversion device according to an embodiment of the present invention.
Figure 19B:
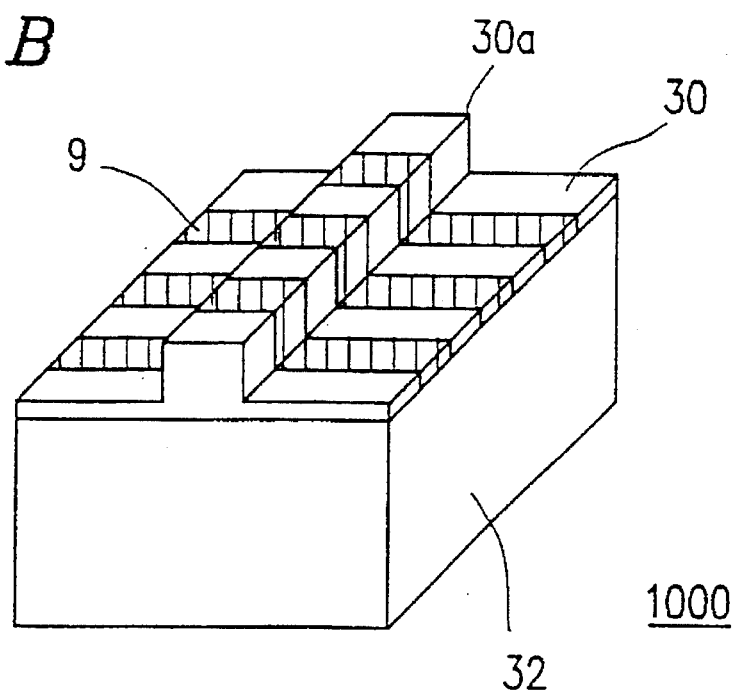

First, a stripe-shaped Ti film 29 as shown in FIG. 19A is formed on the MgO-doped LiNbO₃ layer 30 in which the periodic domain-inverted regions 9 are formed by the steps shown in FIGS. 18A to 18C. Next, utilizing the Ti film 29 as a mask, the MgO-doped LiNbO₃ layer 30 is etched by an ECR etching apparatus. Thereafter, by removing the Ti film 29, a stripe-shaped portion 30a is formed in the MgO-doped LiNbO₃ layer 30 as shown in FIG. 19B. The stripe-shaped portion 30a of the MgO-doped LiNbO₃ layer 30, which is covered with the Ti film 29 and left unetched has, for example, a width of 6 μm and a height of 0.3 μm. The thickness of the MgO-doped LiNbO₃ layer 30 except the stripe-shaped portion 30a is typically thinned to 10 μm by etching.

Since a refractive index of the MgO-doped LiNbO₃ layer 30 is smaller than that of the LiTaO₃ substrate 32, the stripe-shaped portion 30a of the MgO-doped LiNbO₃ layer 30 thus formed functions as the optical waveguide 30a. Therefore, by the steps shown in FIGS. 19A and 19B, the optical waveguide 30a having the periodic domain-inverted regions 9 which are formed by the steps shown in FIGS. 7A to 7C is formed.

Furthermore, the optical wavelength conversion device 1000 is formed by optically polishing the both ends of the formed optical waveguide 30a. Since MgO-doped LiNbO₃ is a material having a high non-linear optical constant, the optical wavelength conversion device 1000 thus formed is allowed to convert a wavelength with high efficiency. Furthermore, since MgO-doped LiNbO₃ is excellent in optical damage resisting properties, it is possible to convert a wavelength with high output.

In the above description of Example 10, the ferroelectric thin film 30 formed by liquid phase epitaxy is used. However, the ferroelectric thin film 30 may be grown by other growth methods such as vapor phase epitaxy or laser ablation.

In particular, if the laser ablation is used for forming the ferroelectric thin film 30, a film having a strain super lattice of ferroelectric crystal can be formed on the substrate 32. Since the super lattice thin film has strain larger than that of crystals constituting the thin film, it has a large non-linear constant. In the process of Example 10, by forming the periodic domain-inverted regions 9 after the ferroelectric thin film 30 is deposited by laser ablation, it becomes possible to form the optical wavelength conversion device with high efficiency.

Furthermore, the ferroelectric thin film 30 may be formed by methods other than crystal growth. For example, a ferroelectric crystal is bonded onto the substrate of optical crystal. Then, by polishing and etching the ferroelectric crystal, the thin film crystal can be formed. For the thin film formed by bonding the crystals described above, the periodic domain-inverted regions are formed by the steps shown in FIGS. 18A to 18C, and further the optical waveguide is formed by the steps shown in FIGS. 19A and 19B. By utilizing the bonding of crystals as described above, the periodic domain-inverted regions can be formed even in a material in which crystal is hardly grown, for example, a non-linear material such as KNbO₃, KTP or BBO.

EXAMPLE 11

Figure 20:
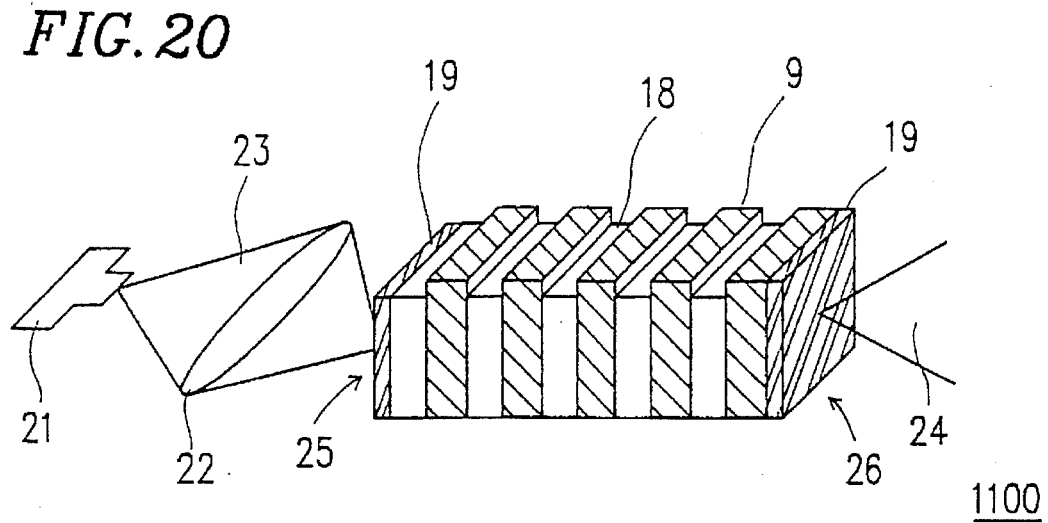
FIG. 20 is a perspective view showing an optical wavelength conversion device according to an embodiment of the present invention.

In Example 11, a method for manufacturing an optical waveguide conversion device using the domain-inverted regions which are formed by the steps described in Example 8 will be described. The configuration of the optical wavelength conversion device to be formed is shown in FIG. 20.

In order to realize a high performance optical wavelength conversion device, it is necessary to form short-periodic domain-inverted regions having a uniform structure along a long distance. For example, in order to generate a blue light beam having a wavelength in a 400 nm band by means of wavelength conversion, utilizing a domain-inverted structure formed in a crystal state such as LiNbO₃, LiTaO₃ or KTP, it is necessary to uniformly form the domain-inverted regions having a period in the range of 3 to 4 µm over a length of about 10 mm. As previously described, the spread of the domain-inverted regions in an electrode width direction should be kept to a value as small as possible for forming the short-periodic domain-inverted regions. At the same time, in order to form the uniform periodic structure, the domain-inverted regions should have a uniform shape. In consideration of the above points, the domain-inverted regions obtained by the manufacturing method shown in Example 8 are extremely effective for manufacturing an optical wavelength conversion device with high efficiency.

A manufacturing method of the optical wavelength conversion device is substantially the same as the method described with reference to FIGS. 15A to 15D.

More specifically, the comb-shaped electrode 2 and the planar electrode 3 are formed on the +C face 1a and the −C face 1b of the LiTaO₃ substrate 1 having a thickness of 0.2 mm, respectively. A period of the comb-shaped electrode 2 is set to 3.8 µm, and the stripe-shaped electrode branches constituting the comb-shaped electrode 2 has a width of 1.9 µm each. On the other hand, the planar electrode 3 is 3 mm×10 mm in size. After the comb-shaped electrode 2 is formed, the surface (+C face 1a) of the substrate 1 in the periphery of each stripe-shaped electrode branch is etched by 100 nm, so as to form the grooves 18. Thereafter, the SiO₂ layer 34 having a thickness of 200 nm is deposited on the comb-shaped electrode 2 on the +C face 1a by sputtering. Then, a pulse voltage is applied between the electrodes 2 and 3. The applied pulse voltage has, for example, a pulse width of about 3 ms and a peak value of 5.1 kV.

By the steps described above, the periodic domain-inverted regions 9 having a width of 1.9 µm and a duty ratio of 50% are uniformly formed along a length of 10 mm. In particular, the domain-inverted regions 9 to be formed reach the bottom of the substrate 1, i.e., the −C face 1b.

Then, as shown in FIG. 20, after a light entering face 25 and a light outgoing face 26 of the substrate 1 are optically polished, the SiO₂ films 19 having a thickness of 145 nm serving as anti-reflection films 19 for the fundamental wave 23 having a wavelength of 850 nm are deposited on the light entering face 25 and the light outgoing face 26. As a result, an optical wavelength conversion device 1100 shown in FIG. 20 is configured.

The optical wavelength conversion device 1100 thus manufactured is supplied with a light beam of a Ti:Al₂O₃ laser serving as the fundamental wave 23, and SHG characteristics thereof are measured. Specifically, the light beam (fundamental wave) 23 emitted from a laser 21 is focused to the light entering face 25 of the optical wavelength conversion device 1100 by the light focusing optical system 22, whereby the light beam enters the optical wavelength conversion device 1100. The entering fundamental wave 23 is subjected to wavelength conversion while propagating through the optical wavelength conversion device 1100, and outgoes from the outgoing face 26 as a secondary harmonic wave (SHG light) having a half wavelength of that of the fundamental wave 23. A conversion efficiency from the fundamental wave 23 to the secondary harmonic wave 24 becomes maximum when a focusing spot diameter is φ37 µm.

Figure 21:
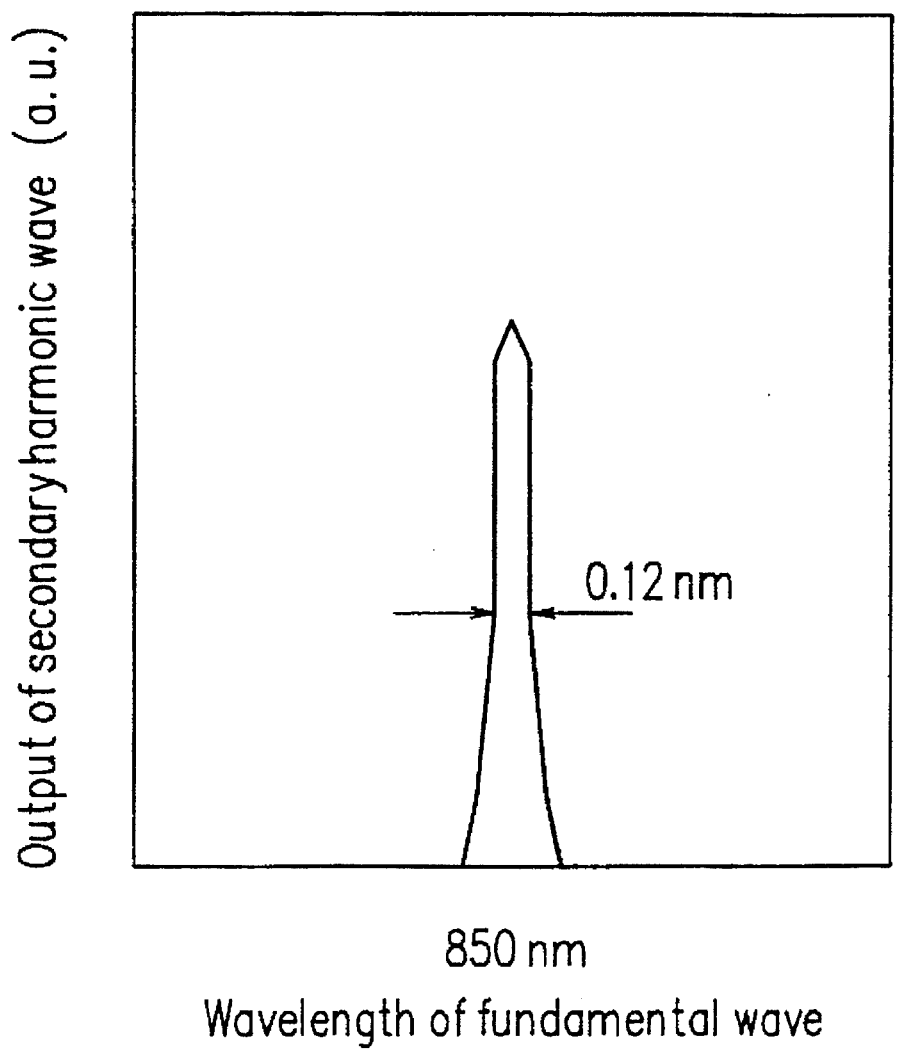
FIG. 21 is a graph showing the relationship between power of a fundamental wave to be input and power of a secondary harmonic wave to be output in an optical wavelength conversion device of the present invention.

FIG. 21 shows the relationship between a wavelength of the fundamental wave 23 to be input (phase matching wavelength) and a power of the secondary harmonic wave 24 to be output (SHG output). The focusing spot diameter of the fundamental wave 23 is kept constant, i.e., φ37 µm. As shown in FIG. 21, the SHG output becomes maximum when a phase matching wavelength is 850 nm. At this point, a full width at half maximum of wavelength tolerance is 0.12 nm. The value is extremely close to a theoretical value of 0.1 nm, which signifies that the periodic domain-inverted structure is uniformly formed along a device length of 10 mm.

Figure 22:
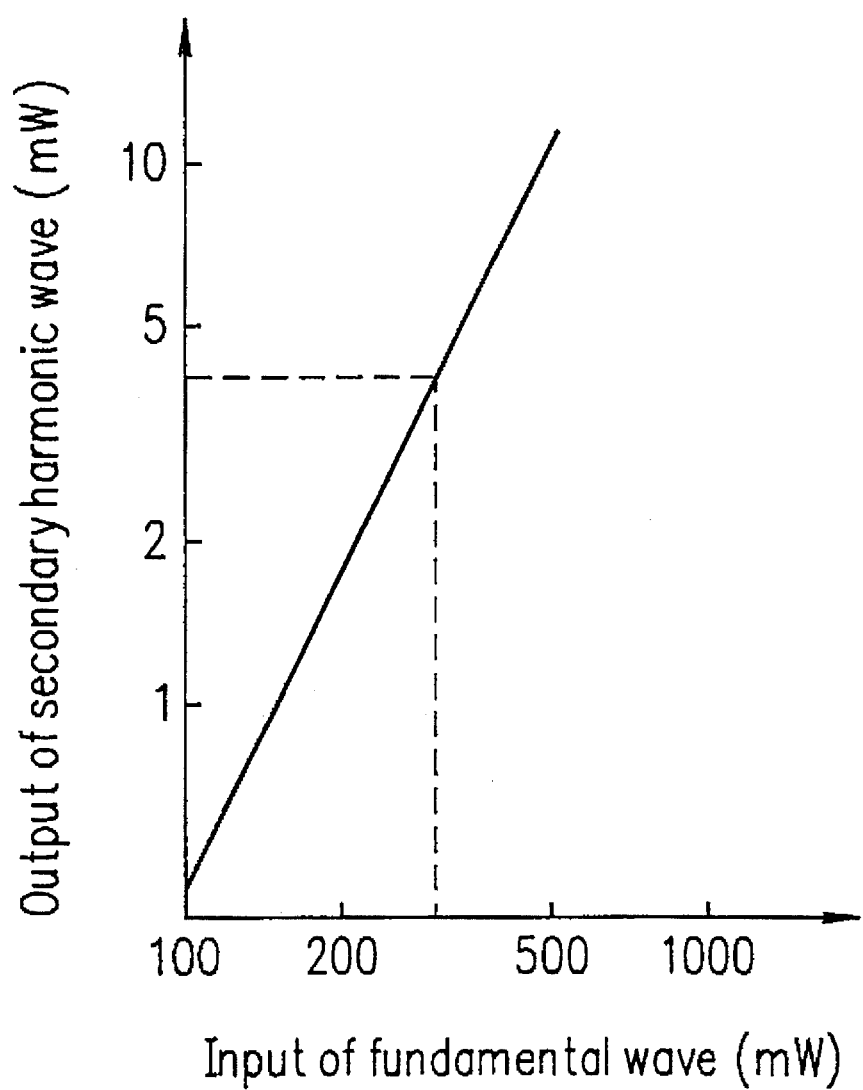
FIG. 22 is a graph showing the relationship between power of a fundamental wave to be input and power of a secondary harmonic wave to be output in an optical wavelength conversion device of the present invention.

Next, FIG. 22 shows the relationship between power of the fundamental wave 23 to be input and SHG output. When the fundamental wave input power is 300 mW, the SHG output of 4.2 mW is obtained. At this point, a conversion efficiency is 1.4%. The value is equal to a theoretical value, which signifies that the formed domain-inverted structure has an ideal shape.

The grooves 18 formed between the domain-inverted regions 9 in the vicinity of the surface of the substrate 1 demonstrate the function for preventing the domain-inverted regions 9 from being deteriorated. In the case where domain inversion is caused by applying an electric field, the crystals of the substrate 1 are greatly strained while the deep domain-inverted regions 9 are advantageously formed. Such strain induces deterioration in the formed domain-inverted regions 9 with elapse of time. For example, the shape of the domain-inverted regions 9 gradually change within several weeks to several months, resulting in change in operation characteristics of the optical wavelength conversion device 900. On the other hand, if the grooves 18 are formed between the domain-inverted regions 9, such change in the shape of the domain-inverted regions 9 are prevented from occurring. Thus, the stable optical wavelength conversion device without change in operation characteristics with elapse of time.

It is preferable that a width W of the stripe-shaped electrode branches constituting the comb-shaped electrode 2 and a period $\Lambda$ of the comb-shaped electrode 2 have the relationship: $W \leq \Lambda/2$. The reason for this will be described below.

Under the voltage application condition where domain-inverted regions are uniformly formed over the entire electrode, a width Wd of the domain-inverted regions formed below the stripe-shaped electrode branches is slightly larger than the width W of the electrode branch. On the other hand, an efficiency of the optical wavelength conversion device becomes maximum when the period $\Lambda$ and the width Wd of the domain-inverted regions satisfy the relationship: $\Lambda/2=Wd$. In order to set a value of Wd to $\Lambda/2$, it is preferable that the width W of the electrode is set to be equal to or smaller than $\Lambda/2$, taking the spread of the domain-inverted regions in a horizontal direction into consideration.

Furthermore, a resonator-type optical wavelength conversion device can be formed according to Example 11. In such a case, in the configuration shown in FIG. 20, after both end faces of the LiTaO$_3$ substrate 1 in which the periodic domain-inverted regions 9 are formed are polished, the reflective films 14 capable of reflecting 99% or more of the fundamental wave 23 having a wavelength of 800 nm are deposited on the end faces instead of the anti-reflection films 19. When the fundamental wave 23 enters such an optical wavelength conversion device, the fundamental wave 23 is multiply reflected at the reflective films 14 formed on both end faces of the substrate 1 so as to resonate within the substrate 1. Specifically, the optical wavelength conversion device functions as a resonator, so that the entering fundamental wave 23 is converted to the secondary harmonic wave 24 with high efficiency owing to increase in the internal power.

In order to make the optical wavelength conversion device function as a resonator as described above, the domain-inverted regions 9 should be uniformly formed to a position deeper than the beam diameter of the multiple reflected fundamental wave 23, typically, to a depth of several tens of $\mu$m or more. Since the uniform domain-inverted regions 9 are formed to a depth of several hundreds of $\mu$m by application of an electric field, the resonator-type optical wavelength conversion device with high efficiency can be manufactured.

EXAMPLE 12

In Example 12, a method for manufacturing an optical wavelength conversion device with high efficiency having a high power density and a long interaction length will be described. Specifically, an optical waveguide is formed in the uniform short-periodic domain-inverted regions which are already formed. More specifically, the periodic domain-inverted regions are first formed in the LiTaO$_3$ substrate by the methods described in the previous examples. Thereafter, an optical waveguide is formed by proton exchange.

As a method for forming such an optical waveguide, for example, the following process is expected to be employed. A Ta mask layer corresponding to a pattern of the optical waveguide to be formed is formed on the +C face of the substrate in which the periodic-domain-inverted regions are formed. Then, the substrate is subjected to a heat treatment in pyrophoric acid at 260° C. for 16 minutes, and subsequently a heat treatment in air at 420° C. for 5 minutes, thereby forming a proton-exchanged waveguide.

Both end faces of the optical waveguide which is formed by the above process are optically polished. Then, output characteristics of SHG light which is output by inputting a fundamental wave to the optical waveguide are measured. With this optical waveguide, however, the obtained conversion efficiency is only about half as much as a theoretical value. Regarding the reason why the conversion efficiency is limited to a low value, it is found that the periodic domain-inverted regions are partially eliminated in the optical waveguide by the inventors' examination. More specifically, it is clarified that the conversion efficiency is lowered because the formed domain-inverted regions are eliminated from the surface to the depth of about 0.6 $\mu$m by the manufacture process of the optical waveguide. Moreover, the elimination of the domain-inverted regions from the surface is similarly observed in an LiNbO$_3$ substrate or a substrate made of mixed crystal of LiNbO$_3$ and LiTaO$_3$.

Figure 23A:
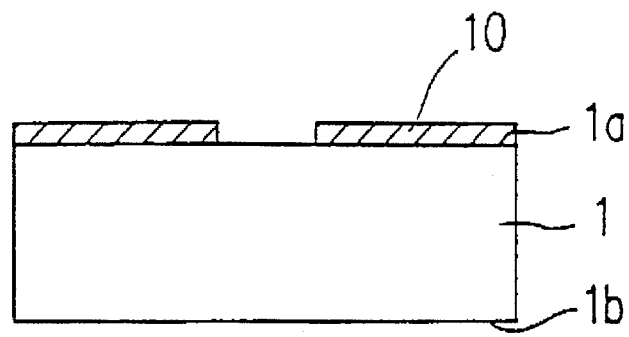
FIGS. 23A to 23C are cross-sectional views showing a method for forming an optical waveguide according to an embodiment of the present invention.
Figure 23B:
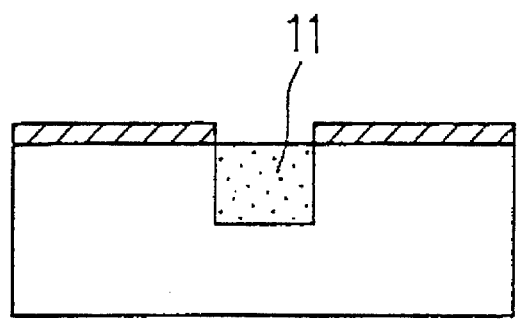
Figure 23C:
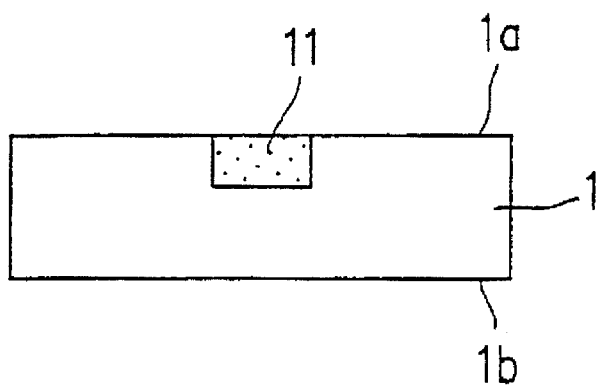

Thus, in order to prevent the influences on the domain-inverted regions due to a manufacture process of the optical waveguide, an optical waveguide 11 is manufactured by the steps shown in FIGS. 23A to 23C in Example 13.

As shown in FIG. 23A, a Ta mask layer 10 corresponding to a pattern of the optical waveguide 11 to be formed is formed on the +C face 1a of the substrate 1 in which the periodic domain-inverted regions (not shown) are formed. Next, as shown in FIG. 23B, the proton exchange waveguide 11 is formed in a portion of the substrate 1 corresponding to an opening of the Ta mask layer 10 by a thermal treatment in pyrophoric acid at 260° C. for 20 minutes and a subsequent thermal treatment in air at 420° C. for 5 minutes. Thereafter, the Ta mask layer 10 is removed by reactive ion etching in a CHF$_3$ gas, and the surface of the substrate 1 is removed by 0.5 $\mu$m by etching. At this point, by similarly removing the surface of the proton exchange optical waveguide 11, the deteriorated portion of the periodic domain-inverted regions present in the vicinity of the surface of the optical waveguide 11 is removed.

The both end faces of the optical waveguide 11 which is formed by the above process are optically polished. Then, output characteristics of SHG light which is output by inputting a fundamental wave to the optical waveguide are measured. As a result, for example, an output of a secondary harmonic wave of 20 mW is obtained for an input of a fundamental wave of 100 mW. The conversion efficiency in this case is equal to a theoretical value. Thus, the optical wavelength conversion device with high efficiency is obtained by the process based on Example 12.

In the above description regarding Example 12, the optical waveguide 11 is formed on the +C face 1a of the substrate 1. However, since the domain-inverted regions are formed so as to reach the bottom face of the substrate 1, that is, the −C face 1b, an optical wavelength conversion device having similar performance can be manufactured even when the optical waveguide 11 is formed on the −C face 1b of the substrate 1. In the case where the optical waveguide 11 is formed on the −C face 1b, since a pattern of the comb-shaped electrode is not formed but the planar electrode alone is formed on the −C face 1b, the surface is scarcely roughened. Therefore, a waveguide of low waveguide loss and an optical waveguide conversion device with high efficiency can be manufactured.

As the optical waveguide, other optical waveguides such as a Ti diffusion waveguide, an Nb diffusion waveguide or an ion implantation waveguide can be used instead of the waveguide which is formed by proton exchange described above.

In order to manufacture an optical waveguide utilizing diffusion, it is necessary to set a diffusion temperature to 1000° C. or higher. However, Curie temperatures of $LiTaO_3$ and $LiNbO_3$ are 600° C. and 1000° C., respectively, which are equal to or lower than the diffusion temperature. Thus, if an optical waveguide is formed by diffusion according to a conventional method after the domain-inverted regions are formed, the formed domain-inverted regions are all eliminated. On the other hand, if the domain-inverted regions are formed after an optical waveguide is formed, the periodic domain-inverted regions can be formed in the formed optical waveguide by diffusion. As a result, it becomes possible to manufacture an optical wavelength conversion device with high efficiency.

For proton exchange, in addition to pyrophoric acid used in Example 12, orthophosphoric acid, benzoic acid, sulfuric acid or the like can be used.

The mask for proton exchange is not limited to the Ta mask. Any other mask made of a material having anti-acid properties such as $Ta_2O_5$, Pt or Au may be used.

EXAMPLE 13

A bulk-type optical wavelength conversion device 1300 having a modified periodic domain-inverted structure will be described as Example 13 of the present invention with reference to FIGS. 24A and 24B.

In a bulk-type optical wavelength conversion device utilizing the substrate in which the periodic domain-inverted regions are formed according to the present invention as a bulk, a domain inversion period for light travelling in the device can be changed by inclining the device at a certain angle with respect to the optical axis of an entering fundamental wave. The use of this advantage makes it possible to adjust the variation in oscillating wavelength of an entering fundamental wave and the variation in phase matching wavelength due to a change in environmental temperature.

The range of the period of the domain-inverted structure which can be changed by adjusting an angle of the device is defined by Snell's law depending on a refractive index of the substrate. Therefore, the period cannot be widely changed.

For example, in the case of the optical wavelength conversion device including a $LiTaO_3$ substrate in which domain-inverted regions are formed so as to be parallel to the end faces thereof, if the substrate is inclined at 12 degrees with respect to the optical axis of an entering fundamental wave, a period of the domain-inverted structure increases only 1.02 times that of the case where the fundamental wave enters the device so as to be perpendicular to a light entering face.

Figure 24A:
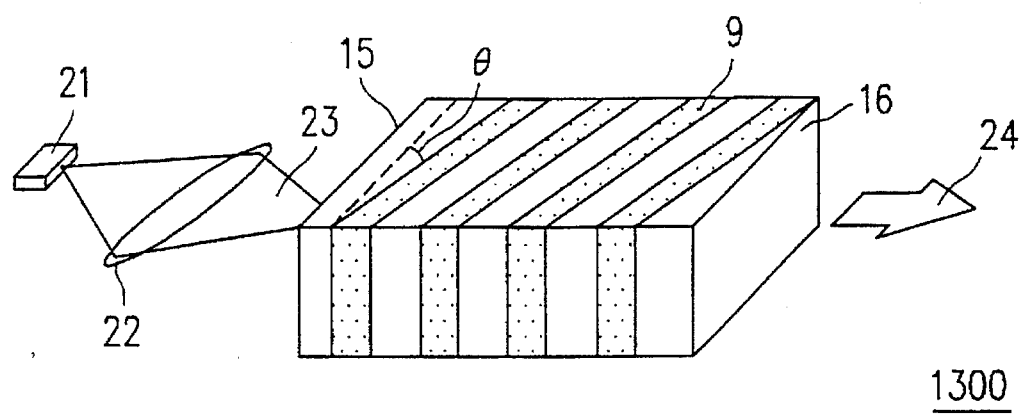
FIG. 24A is a perspective view showing an optical wavelength conversion device according to an embodiment of the present invention.

Thus, as shown in FIG. 24A, in the optical wavelength conversion device 1300 of Example 13, the domain-inverted regions 9, which are inclined at an angle θ with respect to the light entering face 15 and the light outgoing face 16, or at least to the light entering face 15, are formed in the substrate 1. In order to form such domain-inverted regions 9, it is sufficient to incline the comb-shaped electrode 2 at an angle θ with respect to the end faces of the substrate 1 when the comb-shaped electrode 2 is formed on the +C face 1a of the substrate 1 in the manufacture process of the domain-inverted regions 9 in the examples previously described. Since other characteristics of the formation process are substantially the same, the description thereof is herein omitted.

In the optical wavelength conversion device 1300 in which the domain-inverted regions 9 are formed so as to incline at a certain angle θ with respect to the light entering face 15 and the light outgoing face 16, or at least to the light entering face 15 of the substrate 1, it is possible to adjust the phase matching over a larger region when the domain inversion period for light travelling in the device 1300 is changed so as to adjust the phase matching by inclining the device 1300 with respect to the optical axis of the entering fundamental wave 23.

For example, in the case of the optical wavelength conversion device 1300 including the $LiTaO_3$ substrate 1 in which the domain-inverted regions 9 are formed so as to be inclined at 45 degrees with respect to the light entering face 15, when the substrate 1 is inclined at 12 degrees with respect to the optical axis of the fundamental wave 23 which is emitted from the laser 21 to enter the device 1300 via the light focusing optical system 22, the period of the domain-inverted structure increases 1.12 times that of the case where the fundamental wave 23 perpendicularly enters the light entering face 15 of the device 1300. As described above, the possible range of angle adjustment is increased to be five times or more that of the device manufactured according to a conventional method. As a result, tolerance of the phase matching wavelength is increased. Therefore, the optical wavelength conversion device 1300 can be more conveniently used.

Furthermore, by fabricating the optical wavelength conversion device 1300 while inclining the domain-inverted regions 9 with respect to the incident light beam, it becomes possible to expand the tolerance of a phase matching temperature. The reason for this is as follows. Since a focused light beam (fundamental wave) passes across the periodic domain-inverted structure at a certain angle, the phase matching for components having an angle with respect to an optical axis of the focused light beam occurs in a wide extent.

Although the domain-inverted regions 9 are formed so as to be inclined with respect to both of the light entering face 15 and the light outgoing face 16 of the substrate 1 in FIG. 24A, the domain-inverted regions 9 may be formed so as to be parallel to the light outgoing face 16.

Next, in the bulk-type optical wavelength conversion device 1300a, a method for separating a fundamental wave 23a and a harmonic wave 24 going out from the light outgoing face 16 will be described with reference to FIG. 24B.

In the optical wavelength conversion device 1300a, the fundamental wave 23 emitted from the laser 21 to enter the light entering face 15 of the optical wavelength conversion device 1300a via the light focusing optical system 22 is converted into the harmonic wave 24 while propagating through the device 1300a. Thereafter, the converted harmonic wave 24 goes out from the light outgoing face 16, too. At the same time, an unconverted fundamental wave component 23a goes outside from the light outgoing face 16. Therefore, it becomes necessary to separate the unconverted fundamental wave component 23a from the converted harmonic wave 24.

Figure 24B:
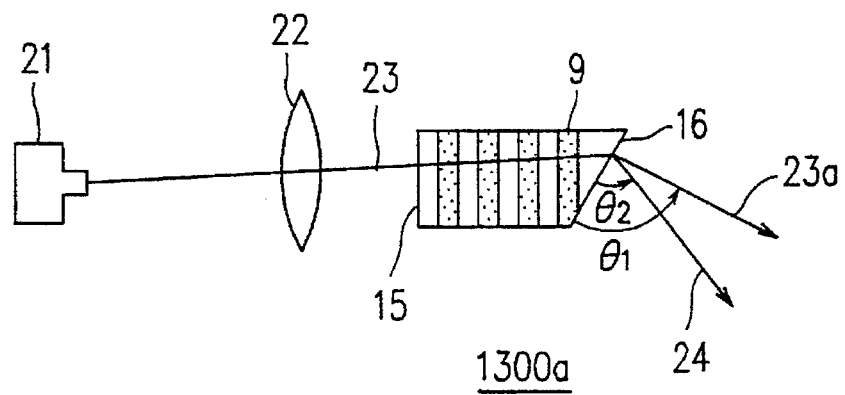
FIG. 24B is a cross-sectional view illustrating the method for separating the converted harmonic wave and the unconverted fundamental wave.

At this time, as shown in FIG. 24B, the light outgoing face 16 of the bulk-type optical wavelength conversion device 1300a, in which the periodic domain-inverted regions 9 are formed, is inclined with respect to the optical axis of the entering fundamental wave 23. Then, refractive indices for the fundamental wave and the harmonic wave differ from each other due to wavelength dispersion of the fundamental wave and the harmonic wave. Therefore, it is possible to output the fundamental wave 23a and the harmonic wave 24 at different outgoing angles (that is, θ1 and θ2). As a result, the fundamental wave 23a and the harmonic wave 24 can be separated from each other. More specifically, since a refractive index $n_f$ for the fundamental wave and a refractive index $n_s$ for the harmonic wave differ from each other, the outgoing angles for the respective waves differ from each other, based on Snell's law.

EXAMPLE 14

In Example 14, the result of the present inventors' examination regarding the influences of the formation process of an optical waveguide on the periodic domain-inverted regions is further described. At the same time, a method for manufacturing an optical wavelength conversion device, which includes a more preferred process of forming an optical waveguide based on the results of the examination, will be described.

A process of forming an optical waveguide by performing a proton exchange treatment on a +C face of an LiTaO$_3$ substrate in which periodic domain-inverted regions have already been formed will be considered. As such a proton exchange treatment, for example, the substrate is thermally treated for 16 minutes while being immersed in pyrophoric acid at 260° C., and subsequently is thermally treated for 5 minutes in air at 420° C. The process is a low temperature process which is conducted at a temperature lower than the Curie temperature (about 600° C.) of the LiTaO$_3$ substrate.

Figure 25:
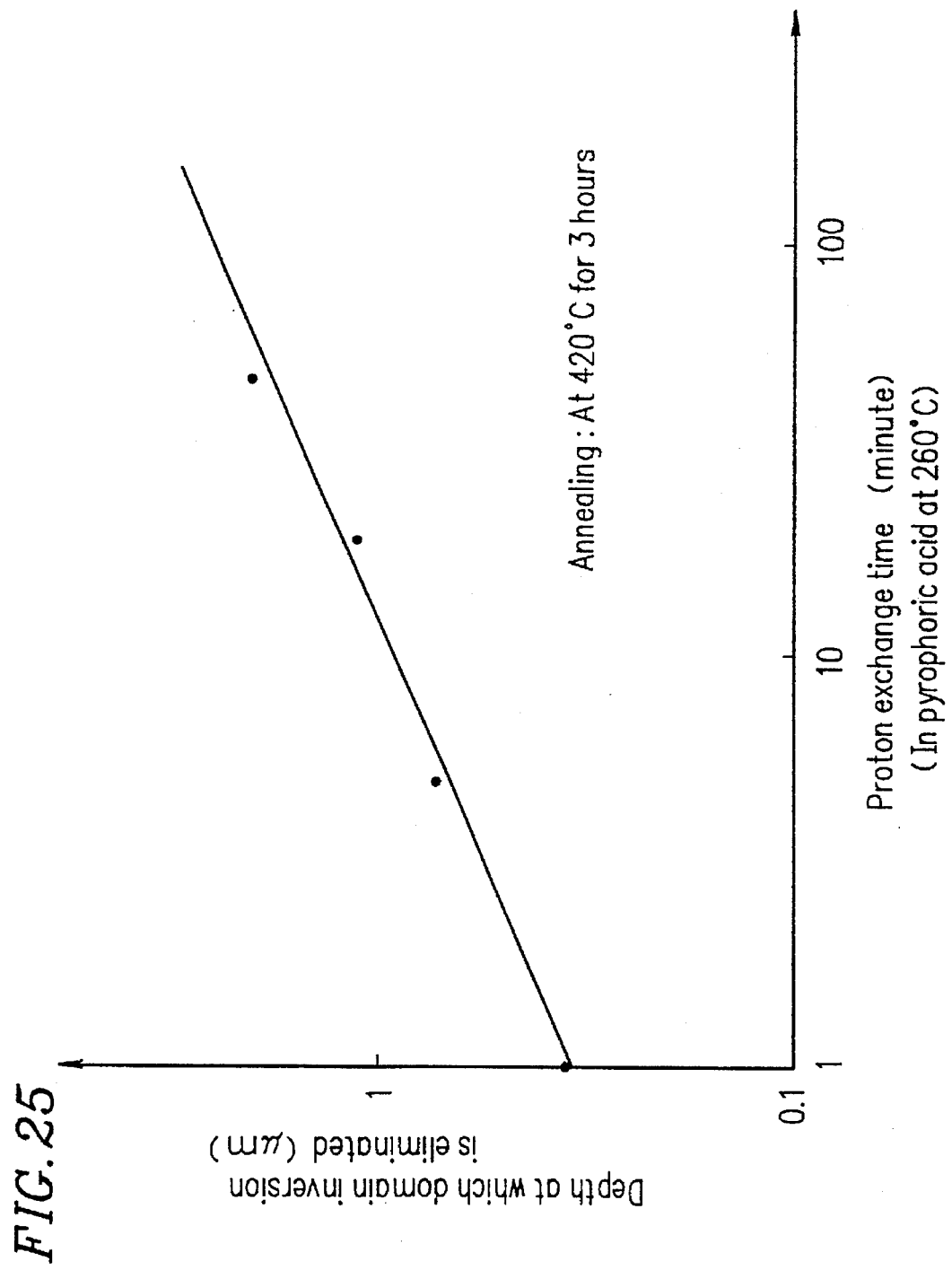
FIG. 25 is a graph showing the relationship between a treatment time of proton exchange which is conducted for forming an optical waveguide and a depth at which domain inversion is eliminated.

If an optical waveguide is formed by the above process, however, the formed periodic domain-inverted regions may be eliminated from the +C face of the substrate in a depth direction. A depth to which the domain-inverted regions are eliminated increases to some extent with elapse of annealing time, and then is kept to be a certain value. In the case where annealing conditions are fixed, the depth mainly depends on the time period of a proton exchange treatment as shown in FIG. 25. Therefore, it is considered that the formed domain-inverted regions are eliminated by thermal diffusion of proton during proton exchange. Even when an annealing temperature is lowered to 300° C., the domain-inverted regions are eliminated in some cases. Therefore, there arises a problem that an optical wavelength conversion device for realizing wavelength conversion with high efficiency cannot be stably manufactured.

Moreover, the domain-inverted regions are eliminated only in the +C face of the substrate. The elimination of the domain-inverted regions accompanying the formation of the optical waveguide is not observed in the −C face.

In order to avoid the influences of the domain-inverted region elimination phenomenon accompanying the execution of the process of manufacturing an optical waveguide, an optical waveguide is formed by proton exchange before the domain-inverted regions are formed so as to manufacture an optical wavelength conversion device.

FIGS. 26A to 26D are perspective views showing the steps of manufacturing an optical wavelength conversion device 1410 having the stripe-shaped buried type optical waveguide 11 according to Example 14.

Figure 26A:
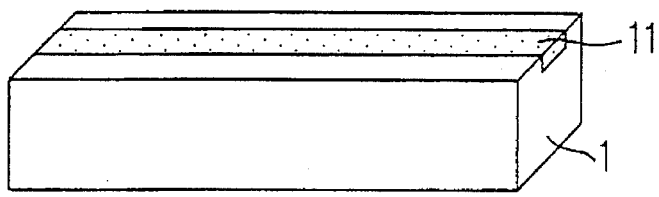
FIGS. 26A to 26D are perspective views showing the steps of forming an optical wavelength conversion device according to an embodiment of the present invention.
Figure 26B:
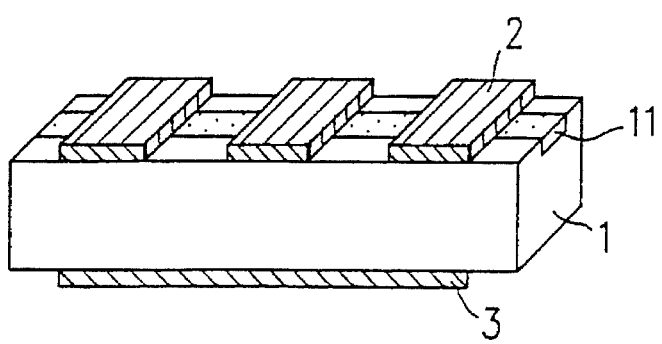
Figure 26C:
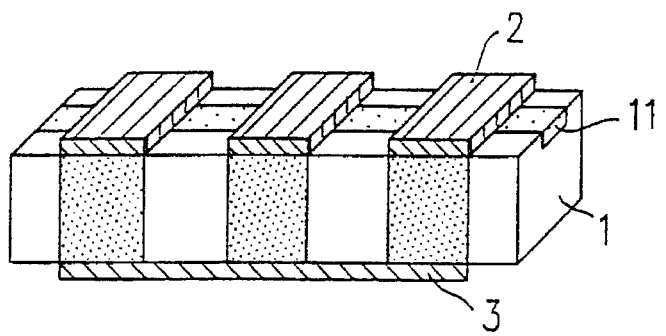
Figure 26D:
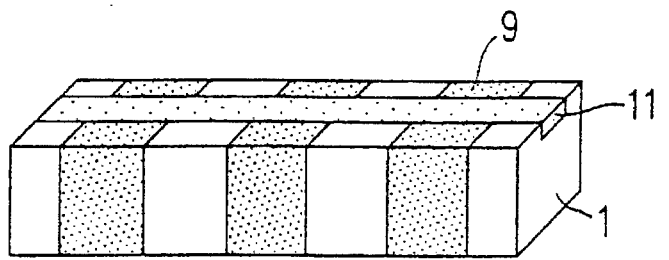

A Ta mask layer (not shown) having an opening corresponding to a pattern of the optical waveguide is deposited on the surface of the substrate 1. Then, the substrate 1 is subjected to a proton exchange treatment by being thermally treated in pyrophoric acid. By this step, the stripe-shaped buried type proton-exchanged optical waveguide 11 as shown in FIG. 26A is formed. Thereafter, the optical waveguide 11 is subjected to annealing so as to reduce the difference in domain inversion characteristics between the proton exchanged portion (the optical waveguide 11) and the other portion. Then, as shown in FIG. 26B, the comb-shaped electrode 2 and the planar electrode 3 are formed on the +C face and the −C face of the substrate 1, respectively. By applying a predetermined electric field to the substrate 1 via the electrodes 2 and 3, the periodic domain-inverted regions 9 as shown in FIG. 26C are formed in the substrate 1. When the comb-shaped electrode 2 and the planar electrode 3 are removed, the optical wavelength conversion device 1410 having a stripe-shaped buried type optical waveguide 11 shown in FIG. 26D is obtained.

FIGS. 27A to 27D are perspective view schematically showing the steps of manufacturing the optical wavelength conversion device 1420 having the ridge-shaped optical waveguide 17a according to Example 14.

Figure 27A:
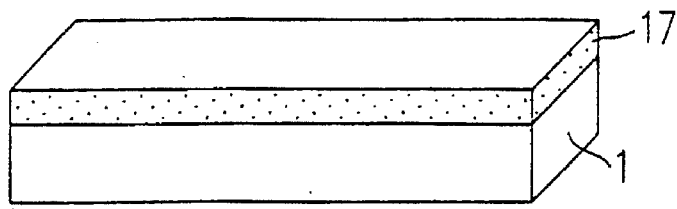
FIGS. 27A to 27D are perspective views showing the steps of forming an optical wavelength conversion device according to an embodiment of the present invention.
Figure 27B:
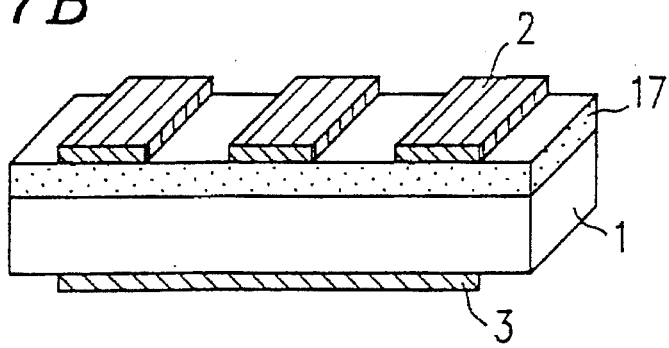
Figure 27C:
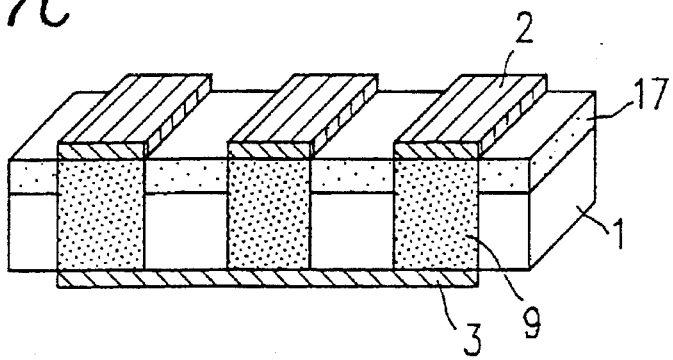
Figure 27D:
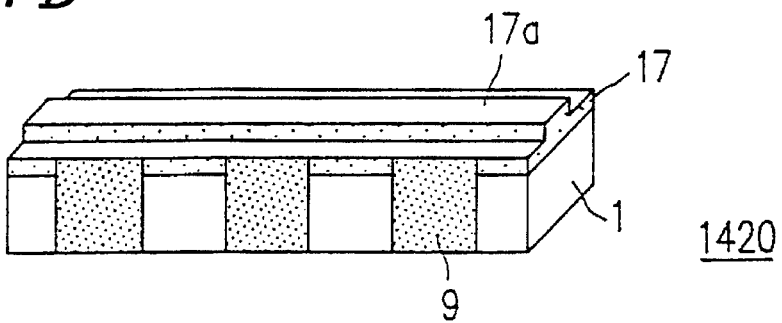

The +C face of the substrate 1 is subjected to proton exchange and annealing so as to form the proton-exchanged layer (slab-shaped optical waveguide) 17 shown in FIG. 27A. Thereafter, as shown in FIG. 27B, the comb-shaped electrode 2 and the planar electrode 3 are formed on the proton-exchanged layer 17 and the bottom face (−C face) of the substrate 1, respectively. Then, by applying a predetermined electric field to the substrate 1 via the electrodes 2 and 3, the periodic domain inverted regions 9 as shown in FIG. 27C are formed in the substrate 1. Thereafter, the comb-shaped electrode 2 and the planar electrode 3 are removed, and the proton-exchanged layer 17 is processed into a striped-shape, thereby forming the ridge-shaped optical waveguide 17a. As a result, an optical wavelength conversion device 1420 having the stripe-shaped ridge-shaped optical waveguide 17a shown in FIG. 27D is obtained.

In the buried type optical waveguide 11, there is a slight difference in proton distribution between the proton exchanged portion (optical waveguide 11) and the other portion. On the other hand, since the proton-exchanged layer 17 is formed over the entire surface of the substrate 1 in the above process of forming the ridge-shaped optical waveguide 17a, ununiform proton distribution in the electrode face is not present when an electric field is applied to form the domain-inverted regions. Therefore, it is possible to form the domain-inverted regions having uniform distribution in the face. Furthermore, since the proton-exchanged layer 17 is present on the side faces of the optical waveguide 17a, the strength against mechanical destruction is improved and its optical damage resisting properties are excellent. As a result, the ridge-shaped optical waveguide 17a has optical damage resisting properties double as those of the buried-type optical waveguide 11.

FIGS. 28A to 28D are perspective views schematically showing the steps of forming an optical wavelength conversion device 1430 according to Example 14. The optical wavelength conversion device 1430 further includes a stripe-shaped high refractive index layer 44 formed on the surface of the proton-exchanged layer (slab-type optical waveguide) 17 as the mounted-type optical waveguide 44.

Figure 28A:
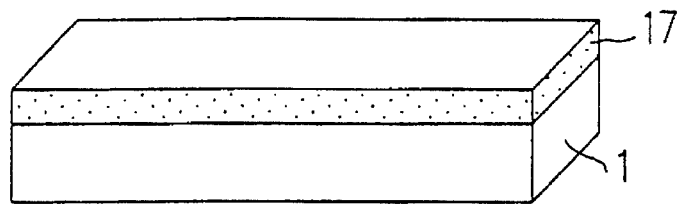
FIGS. 28A to 28D are perspective views showing the steps of forming an optical wavelength conversion device according to an embodiment of the present invention.
Figure 28B:
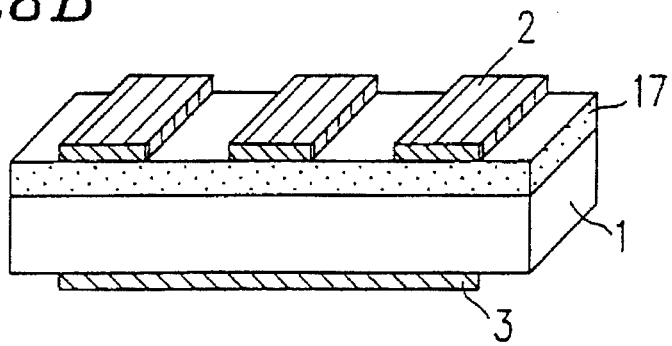
Figure 28C:
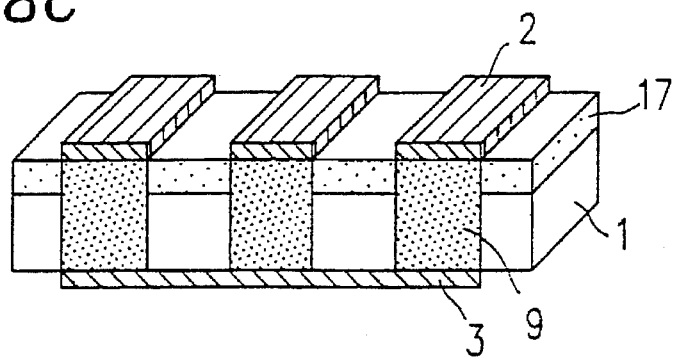
Figure 28D:
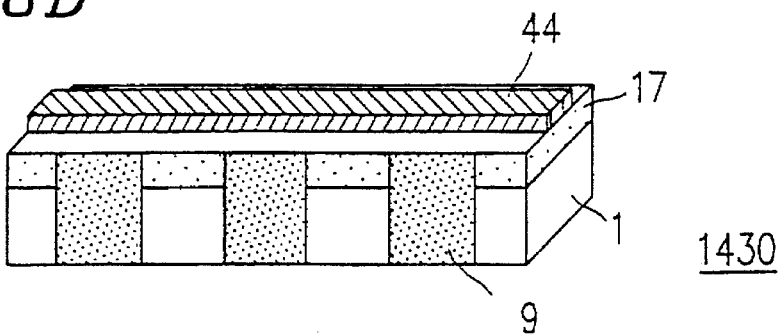

First, the +C face of the substrate 1 is subjected to proton exchange and annealing so as to form the proton-exchanged layer (slab-type optical waveguide) 17 shown in FIG. 28A. Thereafter, as shown in FIG. 28B, the comb-shaped electrode 2 and the planar electrode 3 are formed on the proton-exchanged layer 17 and the bottom face (−C face) of the substrate 1, respectively. Then, by applying a predetermined electric field to the substrate 1 via the electrodes 2 and 3, the periodic domain-inverted regions 9 as shown in FIGS. 28C are formed in the substrate 1. Thereafter, the comb-shaped electrode 2 and the planar electrode 3 are removed, and the stripe-shaped high refractive index layer 44 is formed on the proton-exchanged layer 17. As a result, the optical wavelength conversion device 1430 having the stripe-shaped optical waveguide 44 shown in FIG. 28D is obtained.

Since the optical waveguide 44 in the optical wavelength conversion device 1430 exhibits larger light confinement properties as those of the ridge-shaped optical waveguide 17a, the optical wavelength conversion device with high efficiency can be obtained.

As described above, the periodic domain-inverted structure is prevented from being eliminated by forming the optical waveguide prior to the formation of the domain-inverted regions. As a result, the optical wavelength conversion device which is excellent in optical damage resisting properties and capable of realizing wavelength conversion With high efficiency is obtained.

EXAMPLE 15

With reference to FIGS. 29A to 29D, a method for forming domain-inverted regions in Example 15 which utilizes domain inversion over the entire region and reinversion in part of the region will be described.

Figure 29A:
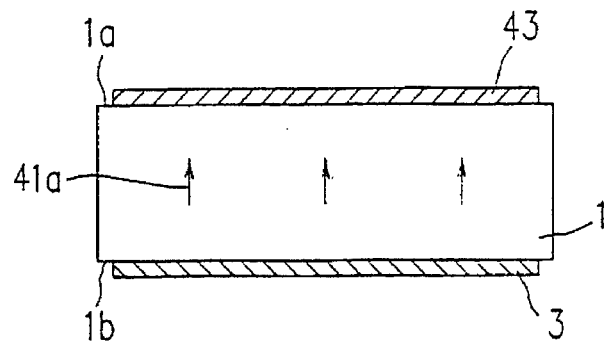
FIGS. 29A to 29D are schematic cross-sectional views showing a method for forming a domain-inverted region according to an embodiment of the present invention.

As shown in FIG. 29A, a planar electrode 43 and the planar electrode 3 are formed on the +C face 1a and the −C face 1b of the LiTaO$_3$ substrate 1, respectively. At this time, domains in the substrate 1 are upwardly orientated in FIG. 29A as indicated with arrows 41a in FIG. 29A.

Figure 29B:
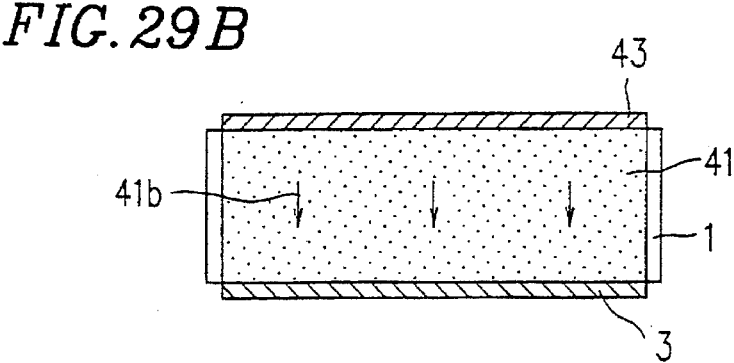
Figure 29C:
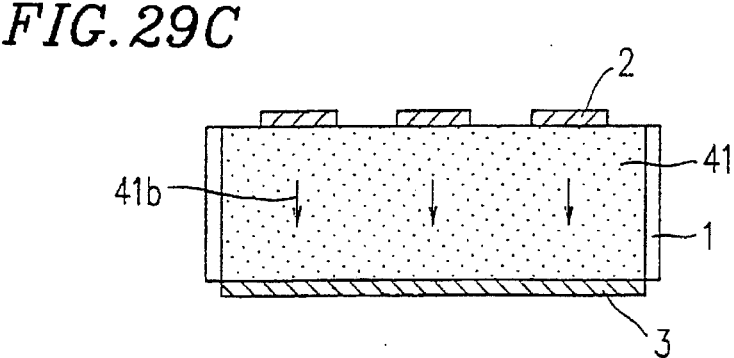

Next, by applying an electric field to the substrate 1 via the electrodes 3 and 43 at room temperature, the domains of almost the entire region in the substrate 1 are inverted. As a result, as shown in FIG. 29B, a domain-inverted region 41 including downwardly orientated domains as indicated with arrows 41b in FIG. 29B is formed as shown in FIG. 29B.

Figure 29D:
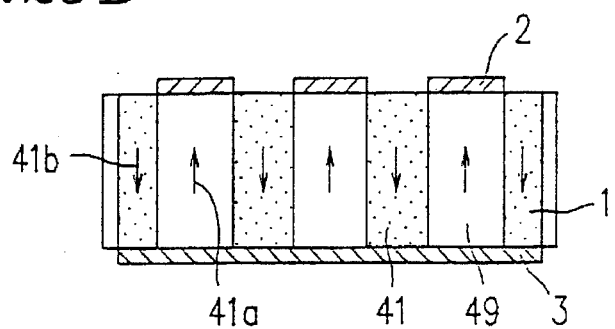
Figure 30:
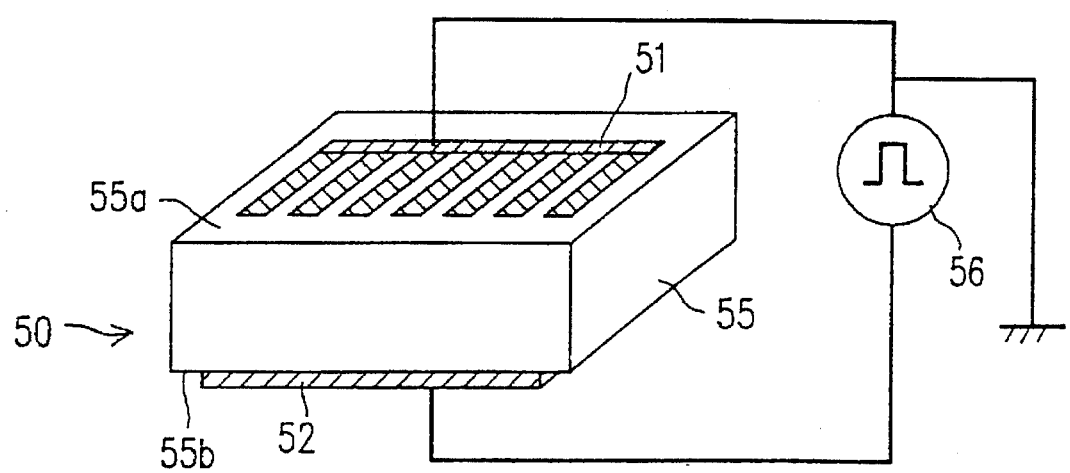
FIG. 30 is a schematic perspective view showing a method for forming a domain-inverted region according to a conventional method.

Then, after the planar electrode 43 on the +C face 1a of the substrate 1 is removed, the comb-shaped electrode 2 is formed in place of the planar electrode 43. By applying a voltage to the comb-shaped electrode 2 and the planar electrode 3 so as to apply a predetermined electric field to the substrate 1, a domain in regions 49 directly below the respective stripe-shaped electrode branches of the comb-shaped electrode 2 is reinverted. As a result, as shown in FIG. 29D, the regions 49 having a domain direction as indicated with the arrows 41a and the regions 41 having the opposite domain direction as indicated with the arrows 41b are alternately formed in a periodic manner.

According to the above methods, the uniform periodic domain-inverted structure is formed even in the vicinity of the −C face 1b by inverting the domains over almost the entire region in the substrate 1 once. In particular, the elimination of the domain-inverted regions, which is generally caused when the optical waveguide is formed using proton exchange and annealing, does not occur on the −C face 1b. Therefore, by forming the optical waveguide on the −C face after the periodic domain-inverted structure is formed according to Example 15, the optical wavelength conversion device with high efficiency can be realized.

According to the present invention, a DC voltage is applied to a substrate in advance so as to form domain-inverted regions. If an applied voltage value is set so that an electric field applied by the DC voltage does not exceed an inversion electric field for inverting spontaneous polarization of the crystal of the substrate, domain inversion due to the electric field does not occur. When a short pulse voltage is superimposed on the DC voltage under such a state, the combination of a short pulse electric field generated by the short pulse voltage and a DC electric field generated by the DC voltage inverts the domains. Since a small value is enough for the superimposing pulse voltage, it is possible to apply a pulse with high reproducibility. Furthermore, since the pulse voltage is small, the uniformity of the electric field to be applied to the substrate is improved.

According to the present invention, the methods described above make it possible to uniformly form the periodic domain-inverted regions over a large area. Hereinafter, the reason for this will be described.

Two electrodes, which are separated from each other in a domain direction of ferroelectric crystals, are formed. When domain inversion is formed by applying a voltage between the two electrodes, the uniformity of the domain-inverted regions to be formed depends on uniformity of distribution of the electric field to be applied. Therefore, according to the present invention, a DC voltage lower than an inversion voltage for inverting the domains of the substrate is previously applied between the electrodes. By superimposing a short pulsed voltage on the applied voltage under such a state, domain inverted regions are manufactured. Since the DC voltage is applied between the electrodes, the electric field between the electrodes exhibits high uniformity. Therefore, a voltage is uniformly applied over a large area. Furthermore, since it is possible to set the intensity of the pulse voltage to be superimposed to a small value, the distribution of the electric field which is applied between the electrodes by the pulse voltage is uniform and the voltage can be easily controlled. Therefore, it is becomes possible to form the domain-inverted regions excellent in uniformity in the face with high reproducibility over a large area.

Next, a method for facilitating the formation of short-periodic domain-inverted regions will be described.

In the domain-inverted regions formed by applying an electric field, the domains are inverted from a +C face of the substrate. Based on this phenomenon, various examinations are made on a method for restraining the domain-inverted regions from spreading out in a horizontal direction. As a result, it is found that domain inversion is restrained from being generated by deteriorating crystalinity (ferroelectricity) in the vicinity of the surface of the +C face of the substrate. Furthermore, when a comb-shaped electrode is formed on the surface (+C face) of the substrate, followed by deteriorating the ferroelectricity in the vicinity of the surface of crystal except the stripe-shaped electrode branches constituting the comb-shaped electrode, the domain-inverted regions formed below the electrode branches are restrained from spreading out in a horizontal direction. As a result, it becomes possible to form short-periodic domain-inverted regions. The reason for this is described below.

After a comb-shaped electrode consisting of stripe-shaped electrode branches and a planar electrode are formed on the +C face and a −C face, respectively, a voltage is applied between the electrodes. Then, domain inversion occurs from the +C face, so that needle-like domain-inverted regions are formed below the electrodes. If the application of the voltage is further continued, however, the inverted regions spread out in a width direction with elapse of time, making it difficult to form the short-periodic domain-inverted regions. Then, a process of forming domain inversion is observed. As a result, it is found that domain inversion is restrained from being caused by deteriorating the crystalinity (in the present invention, ferroelectricity) in the vicinity of the +C face where domain inversion occurs. For example, if the +C face is subjected to proton exchange so as to change a portion in the surface of the substrate into a proton-exchanged region, an inversion voltage required for domain inversion can be increased by several kV/mm or more. As a result, it is possible to restrain the domain inversion from being caused. Therefore, by deteriorating the ferroelectricity in the vicinity of the surface of the +C face of crystal between the stripe-shaped electrodes constituting the comb-shaped electrode, the domain inversion can be restrained from spreading out to any region except the region directly below the electrode branches in a width direction. More specifically, the spread of inverted regions in a width direction is restrained by providing the ferroelectricity deteriorated regions between the stripe-shaped electrode branches, making it possible to form short-periodic domain-inverted regions.

On the other hand, according to the present invention, in order to uniformize the shape of the domain-inverted regions to be formed in the substrate, a voltage is applied between the electrodes after the electrodes formed on the substrate are covered with insulators. The electrode being covered with the insulating films restrain free charges from moving in the periphery of the electrodes. Thus, since the domain-inverted regions can be restrained from spreading out to the periphery of the electrodes in a horizontal direction, a uniform domain-inverted structure is obtained.

In a formation process for forming the two electrodes which are separated from each other in a domain direction of the ferroelectric crystal and subsequently for applying an electric field to the two electrodes so as to cause the domain inversion, domain inversion nuclei are first formed by applying the electric field. Then, the domain inverted regions grow in a domain direction from the domain inversion nuclei (forward growth), and then spread out in the periphery of the domain inversion nuclei (horizontal growth). However, since the domain-inverted regions spread out to the periphery of the electrode pattern, it becomes difficult to form a domain inversion pattern having a fine structure. In the case where the periodic domain-inverted layer is formed, in particular, it becomes difficult to form short-periodic domain-inverted layer. Moreover, since the horizontal growth of the domain inverted region in the periphery of the electrode is poor in uniformity, it is difficult to manufacture the structure of the domain-inverted regions in accordance with the electrode pattern.

As the result of various examinations on the phenomenon of the spread of the domain-inverted regions, the inventors of the present invention found that the state of the surface of crystal where domain inversion nuclei are generated affects the formation of domain inversion. Specifically, it was found that the movement of surface free charges present in the surface of ferroelectric induces distribution of the electric field applied to the ferroelectric to be ununiform and the electric field to be generated in the periphery of the electrode, resulting in promotion of the horizontal growth of the domain-inverted regions. In other words, the present inventors found the following mechanism: the surface free charges present in the surface of the crystal move to the periphery of the electrode by applying a voltage to induce the electric field not only directly below the electrodes but also in the periphery thereof, whereby domain inversion spreads out to the periphery of the electrode.

Therefore, in order to inhibit the horizontal growth of the domain-inverted regions, a method for restraining the surface free charges from moving to the periphery of the electrode by covering the electrode with an insulator is proposed. In order words, by covering the electrodes formed in a domain direction of the ferroelectric with insulating films, it is possible to inhibit the domain-inverted regions from spreading out to the periphery of the electrode, making it possible to form a uniform domain-inverted layer.

The same method can be used for forming periodic domain-inverted layers which are necessary for the optical waveguide conversion device. More specifically, when the periodic domain-inverted layers are formed by applying a voltage between the comb-shaped electrode formed on the surface of ferroelectric and the planar electrode formed on the bottom face thereof, the domain-inverted regions can be restrained from spreading out to the periphery of stripe-shaped electrodes constituting the comb-shaped electrode by covering the comb-shaped electrode having a fine pattern with an insulating film. As a result, a uniform short-periodic domain-inverted layer can be formed.

As another method for forming an optical wavelength conversion device with high efficiency, the surface free charges are restrained from moving by removing the surface of crystal between the stripe-shaped electrodes constituting the comb-shaped electrode. As the result of this, the domain-inverted regions are restrained from spreading out to the periphery of the comb-shaped electrode, making it possible to form a uniform short-periodic domain-inverted layers.

Furthermore, the use of thus formed uniform short-periodic domain inverted layers makes it possible to manufacture an optical wavelength conversion device with high efficiency.

As described above, according to the present invention, a comb-shaped electrode and a planar electrodes are formed on a +C face and a −C face of a substrate. Then, a DC electric field on which a pulse electric field is superimposed is applied to the substrate via the both electrodes. As a result, an electric field having uniform intensity distribution can bs applied to the substrate, whereby domain-inverted regions having a uniform periodic structure can be formed. Moreover, an optical wavelength conversion device with high efficiency can be manufactured by forming an optical waveguide on the formed periodic domain-inverted regions or by using the formed periodic domain-inverted regions as a bulk.

The domain-inverted regions should be inhibited from spreading out in a horizontal direction from directly below the comb-shaped electrode to form short-periodic domain-inverted regions. With respect to this problem, the gaps between the stripe-shaped electrodes constituting the comb-shaped electrode are subjected to proton exchange so as to deteriorate the ferroelectricity of the gaps, thereby inhibiting the domain-inverted regions from spreading out in a horizontal direction. Consequently, domain-inverted regions are formed with short periods. As a result, an optical wavelength conversion device with high efficiency is manufactured.

Alternatively, by applying a pulse electric field between a comb-shaped electrode and a planar electrode each being covered with an insulating film, which are respectively formed on the surface and the bottom face of a ferroelectric crystal, the movement of free charges in the surface of the substrate is restrained. Therefore, an electric field having uniform intensity distribution can be applied to the crystal. As a result, domain-inverted regions having a uniform periodic structure is formed.

Moreover, after grooves are formed by removing the surface of the crystal between the stripe-shaped electrode branches constituting the comb-shaped electrode and then an insulating film is formed on the surface of crystal, an electric field is applied to the substrate. As a result, domain-inverted regions having a uniform periodic structure can be formed.

Furthermore, by forming an optical waveguide in the formed periodic domain-inverted regions, an optical wavelength conversion device with high efficiency can be manufactured.

To form short-periodic domain-inverted regions, the domain-inverted regions should be restrained from spreading out in a horizontal direction directly below the comb-shaped electrode. Surface free charges of a ferroelectric substrate such as $LiTaO_3$, $LiNbO_3$ or the like moves in the surface of crystal during application of an electric field, whereby electric field distribution is rendered ununiform in the periphery of the electrode. The fact that the ununiform electric field distribution promotes the horizontal spread of domain-inverted region is found by the present inventors' examination. Therefore, the entire comb-shaped electrode formed on the surface where domain inversion nuclei are generated is covered with an insulating film so as to restrain the movement of surface free charges as described above, thereby inhibiting the horizontal spread of the domain-inverted regions. As a result, domain-inverted regions are formed with short periods, making it possible to manufacture an optical wavelength conversion device with high efficiency.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for manufacturing a domain-inverted region, comprising the steps of:
    forming a first electrode and a second electrode on a ferroelectric crystal substrate, the first and second electrodes being separated in a domain direction of the ferroelectric crystal substrate;
    applying a DC voltage between the first electrode and the second electrode; and
    inverting a domain of a predetermined region in the ferroelectric crystal substrate by applying a combined voltage of the DC voltage and a pulse voltage, the combined voltage obtainable by superimposing the pulse voltage on the DC voltage.

2. A method according to claim 1, wherein a level of the DC voltage is smaller than a voltage level at which domain inversion occurs, and a level of the combined voltage is substantially equal to or larger than the voltage level at which the domain inversion occurs.

3. A method according to claim 1, wherein at least one of the first electrode and the second electrode is a comb-shaped electrode.

4. A method according to claim 3, wherein the comb-shaped electrode is formed on a +C face of the ferroelectric crystal substrate.

5. A method according to claim 1, wherein the domain direction of the ferroelectric crystal substrate is perpendicular to a surface of the substrate.

6. A method according to claim 5, wherein the ferroelectric crystal substrate is made of a material selected from a group consisting of $LiNb_{(1-x)}Ta_xO_3$ ($0 \leq x \leq 1$) and $KTiOPO_4$.

7. A method according to claim 1, further comprising the steps of:
    removing the first electrode and the second electrode; and
    thermally treating the ferroelectric crystal substrate at 580° C. or lower.

8. A method according to claim 1, further comprising the step of: deteriorating ferroelectricity of the ferroelectric crystal substrate in a periphery of at least one of the first electrode and the second electrode prior to the step of applying the DC voltage.

9. A method according to claim 1, wherein the first electrode is formed on a first face of the ferroelectric crystal substrate and the second electrode is formed on a second face of the ferroelectric crystal substrate which is opposite to the first face, the domain direction of the ferroelectric crystal substrate being perpendicular to the first and second faces of the ferroelectric crystal substrate.

10. A method for manufacturing a domain-inverted region, comprising the steps of:
    forming a first electrode and a second electrode on a ferroelectric crystal substrate, the first and second electrodes being separated from each other in a domain direction of the ferroelectric crystal substrate;
    deteriorating ferroelectricity of the ferroelectric crystal substrate in a periphery of at least one of the first electrode and the second electrode; and
    inverting a domain of a predetermined region in the ferroelectric crystal substrate by applying a predetermined voltage between the first electrode and the second electrode,
    wherein at least one of the first electrode and the second electrode is a comb-shaped electrode, and the ferroelectricity is deteriorated in a gap between at least two electrode branches of the comb-shaped electrode.

11. A method according to claim 10, wherein the step of deteriorating the ferroelectricity employs a proton exchange treatment.

12. A method according to claim 10, wherein the ferroelectric crystal substrate is a C plate substrate which is cut along a face perpendicular to a C axis of a crystal, and the first electrode and the second electrode are a comb-shaped electrode formed on a first face of the C plate substrate and a planar electrode formed on a second face of the C plate substrate, respectively.

13. A method according to claim 12, wherein a nucleus for domain inversion is generated in a vicinity of the first face.

14. A method according to claim 12, wherein a width of each electrode branch included in the comb-shaped electrode is equal to or smaller than a half of an interval between the electrode branches.

15. A method according to claim 12, further comprising the step of removing a vicinity of at least one of the first face and the second face of the C plate substrate to a predetermined depth.

16. A method according to claim 12, wherein the C plate substrate is made of a material selected from a group consisting of $LiNb_{(1-x)}Ta_xO_3$ ($0 \leq x \leq 1$) and $KTiOPO_4$, and the first face is a +C face and the second face is a −C face.

17. A method according to claim 16, wherein the step of deteriorating the ferroelectricity employs a proton exchange treatment.

18. A method according to claim 16, further comprising the steps of:

removing the first electrode and the second electrode; and annealing the ferroelectric crystal substrate at 500° C. or lower.

19. A method according to claim 10, wherein the predetermined voltage is a pulse voltage.

20. A method according to claim 10, wherein the predetermined voltage is a combined voltage obtainable by superimposing a pulse voltage on a DC voltage.

21. A method according to claim 10, wherein at least one of the first electrode and the second electrode is a comb-shaped electrode.

22. A method according to claim 10, the ferroelectric crystal substrate is made of a material selected from a group consisting of $LiNb_{(1-x)}Ta_xO_3$ ($0 \leq x \leq 1$) and $KTiOPO_4$.

23. A method according to claim 10, wherein the ferroelectric crystal substrate is a C plate substrate which is cut along a face perpendicular to a C axis of a crystal, and the first electrode and the second electrode are a comb-shaped electrode formed on a first face of the C plate substrate and a planar electrode formed on a second face of the C plate substrate, respectively.

24. A method according to claim 23, wherein a nucleus for domain inversion is generated in a vicinity of the first face.

25. A method according to claim 23, wherein a width of each electrode branch included in the comb-shaped electrode is equal to or smaller than a half of an interval between the electrode branches.

26. A method according to claim 23, wherein the C plate substrate is made of a material selected from a group consisting of $LiNb_{(1-x)}Ta_xO_3$ ($0 \leq x \leq 1$) and $KTiOPO_4$, and the first face is a +C face and the second face is a −C face.

27. A method according to claim 10, wherein the first electrode is formed on a first face of the ferroelectric crystal substrate and the second electrode is formed on a second face of the ferroelectric crystal substrate which is opposite to the first face, the domain direction of the ferroelectric crystal substrate being perpendicular to the first and second faces of the ferroelectric crystal substrate.

28. A method for manufacturing a domain-inverted region, comprising the steps of:

forming a first electrode and a second electrode on a ferroelectric crystal substrate, the first and second electrodes being separated from each other in a domain direction of the ferroelectric crystal substrate;

shaving off a surface of the ferroelectric crystal substrate in a vicinity of at least one of the first electrode and the second electrode; and inverting a domain of a predetermined region in the ferroelectric crystal substrate by applying a predetermined voltage between the first electrode and the second electrode, wherein at least one of the first electrode and the second electrode is a comb-shaped electrode, and the surface of the ferroelectric crystal substrate is shaved off in a gap between at least two electrode branches of the comb-shaped electrode.

29. A method according to claim 28, further comprising the step of covering at least one of the first electrode and the second electrode with an insulating film.

30. A method according to claim 29, wherein the insulating film is a dielectric film.

31. A method according to claim 29, wherein a resistivity of the insulating film is larger than $10^{15}$ Ω/cm.

32. A method according to claim 28, wherein the predetermined voltage is a pulse voltage.

33. A method according to claim 28, wherein the predetermined voltage is a combined voltage obtainable by superimposing a pulse voltage on a DC voltage.

34. A method according to claim 28, wherein the ferroelectric crystal substrate is made of a material selected from a group consisting of $LiNb_{(1-x)}Ta_xO_3$ ($0 \leq x \leq 1$) and $KTiOPO_4$.

35. A method according to claim 28, wherein a width of each electrode branch included in the comb-shaped electrode is equal to or smaller than half of an interval between the electrode branches.

36. A method according to claim 28, wherein the ferroelectric crystal substrate is a C plate substrate which is cut along a face perpendicular to a C axis of a crystal, the first electrode and the second electrode are a comb-shaped electrode formed on a first face of the C plate substrate and a planar electrode formed on a second face of the C plate substrate, respectively, and a surface of the ferroelectric crystal substrate is shaved off in a gap between electrode branches of the comb-shaped electrode.

37. A method according to claim 36, wherein a nucleus for domain inversion is generated in a vicinity of the first face.

38. A method according to claim 36, wherein the C plate substrate is made of a material selected from a group consisting of $LiNb_{(1-x)}Ta_xO_3$ ($0 \leq x \leq 1$) and $KTiOPO_4$, and the first face is a +C face and the second face is a −C face.

39. A method according to claim 28, wherein the first electrode is formed on a first face of the ferroelectric crystal substrate and the second electrode is formed on a second face of the ferroelectric crystal substrate which is opposite to the first face, the domain direction of the ferroelectric crystal substrate being perpendicular to the first and second faces of the ferroelectric crystal substrate.

40. A method for manufacturing a domain-inverted region, comprising the steps of:

forming a first electrode and a second electrode on a ferroelectric crystal substrate, the first and second electrodes being separated from each other in a domain direction of the ferroelectric crystal substrate; and inverting a domain of a predetermined region in the ferroelectric crystal substrate by applying a predetermined magnetic field between the first electrode and the second electrode.

41. A method according to claim 40, wherein the predetermined magnetic field is a pulse magnetic field.

42. A method according to claim 40, wherein the ferroelectric crystal substrate is a C plate substrate which is cut along a face perpendicular to a C axis of a crystal.

43. A method according to claim 42, wherein the ferroelectric crystal substrate is made of a material selected from a group consisting of $LiNb_{(1-x)}Ta_xO_3$ ($0 \leq x \leq 1$) and $KTiOPO_4$.

44. A method according to claim 40, further comprising the step of covering at least one of the first electrode and the second electrode with an insulating film.

45. A method according to claim 40, wherein at least one of the first electrode and the second electrode is a comb-shaped electrode.

46. A method according to claim 45, further comprising the step of deteriorating ferroelectricity of the ferroelectric crystal substrate in a GaP between electrode branches of the comb-shaped electrode.

47. A method according to claim 45, further comprising the step of shaving off a surface of the ferroelectric crystal substrate in a gap between electrode branches of the comb-shaped electrode.

48. A method according to claim 45, further comprising the step of deteriorating ferroelectricity of the ferroelectric crystal substrate in a gap of electrode branches of the comb-shaped electrode.

49. A method according to claim 45, further comprising the step of shaving off a surface of the ferroelectric crystal substrate in a gap of electrode branches of the comb-shaped electrode.

50. A method according to claim 40, wherein the ferroelectric crystal substrate is a C plate substrate which is cut along a face perpendicular to a C axis of a crystal, and the first electrode and the second electrode are a comb-shaped electrode formed on a first face of the C plate substrate and a planar electrode formed on a second face of the C plate substrate, respectively.

51. A method according to claim 50, wherein a nucleus for domain inversion is generated in a vicinity of the first face.

52. A method according to claim 50, wherein a width of each electrode branch included in the comb-shaped electrode is equal to or smaller than half of an interval between the electrode branches.

53. A method according to claim 50, further comprising the step of shaving off a surface of the ferroelectric crystal substrate in a vicinity of at least one of the comb-shaped electrode and the planar electrode.

54. A method according to claim 50, further comprising the step of covering at least one of the comb-shaped electrode and the planar electrode with an insulating film.

55. A method according to claim 50, wherein the C plate substrate is made of a material selected from a group consisting of $LiNb_{(1-x)}Ta_xO_3$ ($0 \leq x \leq 1$) and $KTiOPO_4$, and the first face is a +C face and the second face is a -C face.

56. A method according to claim 40, wherein the first electrode is formed on a first face of the ferroelectric crystal substrate and the second electrode is formed on a second face of the ferroelectric crystal substrate which is opposite to the first face, the domain direction of the ferroelectric crystal substrate being perpendicular to the first and second faces of the ferroelectric crystal substrate.

57. A method for manufacturing a domain-inverted region, comprising the steps of:
    forming a comb-shaped electrode on a first face of a ferroelectric crystal substrate serving as a C plate substrate which is cut along a face perpendicular to a C axis of a crystal;
    attaching another substrate to the comb-shaped electrode formed on the first face;
    reducing a thickness of the ferroelectric crystal substrate from a side of a second face which is opposite to the first face;
    forming a planar electrode on the second face of the ferroelectric crystal substrate; and
    inverting a domain of a predetermined region in the ferroelectric crystal substrate by applying a predetermined voltage between the comb-shaped electrode and the planar electrode.

58. A method according to claim 57, wherein the predetermined voltage is a pulse voltage.

59. A method according to claim 57, wherein the predetermined voltage is a combined voltage obtainable by superimposing a pulse voltage on a DC voltage.

60. A method according to claim 57, wherein the ferroelectric crystal substrate is made of a material selected from a group consisting of $LiNb_{(1-x)}Ta_xO_3$ ($0 \leq x \leq 1$) and $KTiOPO_4$.

61. A method according to claim 57, wherein a width of each electrode branch included in the comb-shaped electrode is equal to or smaller than half of an interval between the electrode branches.

62. A method according to claim 57, wherein a nucleus for domain inversion is generated in a vicinity of the first face.

63. A method according to claim 57, further comprising the step of deteriorating ferroelectricity of the ferroelectric crystal substrate in a gap between electrode branches of the comb-shaped electrode.

64. A method according to claim 57, further comprising the step of shaving off a surface of the ferroelectric crystal substrate in a gap between electrode branches of the comb-shaped electrode.

65. A method according to claim 57, further comprising the step of covering at least one of the comb-shaped electrode and the planar electrode with an insulating film.

66. A method for manufacturing a domain-inverted region, comprising the steps of:
    growing a ferroelectric crystal on a surface of a substrate;
    forming a first electrode and a second electrode on one of the group consisting of the ferroelectric crystal and the substrate, the first and second electrodes being separated from each other in a domain direction of the ferroelectric crystal; and
    inverting a domain of a predetermined region in the ferroelectric crystal by applying a predetermined voltage between the first electrode and the second electrode, wherein the predetermined voltage is a combined voltage obtained by superimposing a pulse voltage on a DC voltage.

67. A method according to claim 66, wherein the ferroelectric crystal is made of a material selected from a group consisting of $LiNb_{(1-x)}Ta_xO_3$ ($0 \leq x \leq 1$) and $KTiOPO_4$.

68. A method according to claim 66, wherein the ferroelectric crystal grows in a C axis direction, and a comb-shaped electrode and a planar electrode are formed on a surface of the ferroelectric crystal and a bottom face of an optical substrate as the first electrode and the second electrode.

69. A method according to claim 66, wherein a nucleus for domain inversion is generated in a vicinity of a surface of the ferroelectric crystal.

70. A method according to claim 66, wherein the domain inverted region in the ferroelectric crystal reaches from the surface on which the electrode is formed to an interface with the substrate.

71. A method according to claim 66, wherein the first electrode is formed on a surface of the ferroelectric crystal and the second electrode is formed on a bottom surface of the substrate which is opposite to the surface of the ferroelectric crystal, the domain direction of the ferroelectric crystal being perpendicular to the surface of the ferroelectric crystal.

72. A method for manufacturing a domain-inverted region, comprising the steps of:
    forming a first electrode and a second electrode on a ferroelectric crystal substrate, the first and second electrodes being separated from each other in a domain direction of the ferroelectric crystal substrate;
    inverting a domain throughout the ferroelectric crystal substrate by applying a first voltage which is opposite to the domain direction between the first electrode and the second electrode; and
    reinverting the domain in at least part of the ferroelectric crystal substrate by applying a second voltage which is opposite to the inverted domain direction between the first electrode and the second electrode.

73. A method according to claim 72, wherein the first voltage and the second voltage are applied at room temperature.

74. A method according to claim 72, wherein the first voltage is a pulse voltage.

75. A method according to claim 72, wherein the first voltage is a combined voltage obtainable by superimposing a pulse voltage on a DC voltage.

76. A method according to claim 72, wherein the ferroelectric crystal substrate is made of a material selected from a group consisting of $LiNb_{(1-x)}Ta_xO_3$ ($0 \leq x \leq 1$) and $KTiOPO_4$.

77. A method according to claim 72, further comprising the step of covering at least one of the first electrode and the second electrode with an insulating film.

78. A method according to claim 72, wherein the first electrode is formed on a first face of the ferroelectric crystal substrate and the second electrode is formed on a second face of the ferroelectric crystal substrate which is opposite to the first face, the domain direction of the ferroelectric crystal substrate being perpendicular to the first and second faces of the ferroelectric crystal substrate.

* * * * *